(12) United States Patent
Zhang et al.

(10) Patent No.: US 10,200,719 B2
(45) Date of Patent: Feb. 5, 2019

(54) MODIFICATION OF TRANSFORM COEFFICIENTS FOR NON-SQUARE TRANSFORM UNITS IN VIDEO CODING

(71) Applicant: QUALCOMM Incorporated, San Diego, CA (US)

(72) Inventors: Li Zhang, San Diego, CA (US); Xiang Li, San Diego, CA (US); Jianle Chen, San Diego, CA (US); Wei-Jung Chien, San Diego, CA (US); Xin Zhao, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 121 days.

(21) Appl. No.: 15/359,568

(22) Filed: Nov. 22, 2016

(65) Prior Publication Data

US 2017/0150183 A1 May 25, 2017

Related U.S. Application Data

(60) Provisional application No. 62/310,271, filed on Mar. 18, 2016, provisional application No. 62/260,103, filed on Nov. 25, 2015.

(51) Int. Cl.
*H04N 19/60* (2014.01)
*H04N 19/119* (2014.01)
(Continued)

(52) U.S. Cl.
CPC ......... *H04N 19/649* (2014.11); *G06F 17/147* (2013.01); *H04N 19/105* (2014.11);
(Continued)

(58) Field of Classification Search
None
See application file for complete search history.

(56) References Cited

U.S. PATENT DOCUMENTS

2013/0039417 A1 2/2013 Wang et al.
2013/0136175 A1 5/2013 Wang et al.
(Continued)

FOREIGN PATENT DOCUMENTS

| WO | 2013023005 A1 | 2/2013 |
|---|---|---|
| WO | 2016090568 A1 | 6/2016 |
| WO | 2016155641 A1 | 10/2016 |

OTHER PUBLICATIONS

Wien, et al., "Adaptive Block Transforms," VCEG-M62, Apr. 2001.*

(Continued)

*Primary Examiner* — Michael J Hess
(74) *Attorney, Agent, or Firm* — Shumaker & Sieffert, P.A.

(57) ABSTRACT

As part of a process of encoding video data, a video encoder applies a transform to a non-square residual block to generate a block of transform coefficients. Furthermore, the video encoder modifies the transform coefficients such that each respective transform coefficient of the block of transform coefficients is based on the respective dequantized transform coefficient multiplied by a factor of $\sqrt{2}$ or an approximation of $\sqrt{2}$. As part of a process of decoding video data, a video decoder applies, by the video decoder, a dequantization process to transform coefficients of a non-square transform block. The video decoder modifies the dequantized transform coefficients such that each respective dequantized transform coefficient of the dequantized transform coefficients is based on the respective dequantized transform coefficient divided by a factor of $\sqrt{2}$ or an approximation of $\sqrt{2}$.

24 Claims, 35 Drawing Sheets

CURRENT CU
116

REFERENCE BLOCK OF
PU1 IN LIST0
114

● NEIGHBORING SAMPLES OF CURRENT CU
▨ NEIGHBORING SAMPLES OF THE REFERENCE BLOCK

(51) Int. Cl.

| | | |
|---|---|---|
| *H04N 19/61* | (2014.01) | |
| *H04N 19/91* | (2014.01) | |
| *H04N 19/176* | (2014.01) | |
| *H04N 19/587* | (2014.01) | |
| *H04N 19/124* | (2014.01) | |
| *H04N 19/13* | (2014.01) | |
| *H04N 19/186* | (2014.01) | |
| *H04N 19/573* | (2014.01) | |
| *H04N 19/59* | (2014.01) | |
| *H04N 19/96* | (2014.01) | |
| *G06F 17/14* | (2006.01) | |
| *H04N 19/597* | (2014.01) | |
| *H04N 19/105* | (2014.01) | |
| *H04N 19/122* | (2014.01) | |
| *H04N 19/593* | (2014.01) | |
| *H04N 19/132* | (2014.01) | |
| *H04N 19/82* | (2014.01) | |
| *H04N 19/42* | (2014.01) | |
| *H04N 19/625* | (2014.01) | |

(52) U.S. Cl.
CPC ......... *H04N 19/119* (2014.11); *H04N 19/122* (2014.11); *H04N 19/124* (2014.11); *H04N 19/13* (2014.11); *H04N 19/132* (2014.11); *H04N 19/176* (2014.11); *H04N 19/186* (2014.11); *H04N 19/42* (2014.11); *H04N 19/573* (2014.11); *H04N 19/587* (2014.11); *H04N 19/59* (2014.11); *H04N 19/593* (2014.11); *H04N 19/597* (2014.11); *H04N 19/61* (2014.11); *H04N 19/625* (2014.11); *H04N 19/82* (2014.11); *H04N 19/91* (2014.11); *H04N 19/96* (2014.11)

(56) References Cited

U.S. PATENT DOCUMENTS

| | | | |
|---|---|---|---|
| 2013/0188883 | A1 | 7/2013 | Gisquet et al. |
| 2014/0056362 | A1* | 2/2014 | Mrak ............... H04N 19/176 375/240.18 |
| 2016/0119631 | A1 | 4/2016 | Kawamura et al. |
| 2016/0156926 | A1 | 6/2016 | Hashimoto et al. |
| 2016/0219290 | A1 | 7/2016 | Zhao et al. |
| 2016/0277762 | A1 | 9/2016 | Zhang et al. |
| 2016/0366416 | A1 | 12/2016 | Liu et al. |
| 2017/0150156 | A1 | 5/2017 | Zhang et al. |
| 2017/0150176 | A1 | 5/2017 | Zhang et al. |
| 2017/0150186 | A1 | 5/2017 | Zhang et al. |

OTHER PUBLICATIONS

Chen et al., "Algorithm Description of Joint Exploration Test Model 3", 3rd Meeting, May 26 through Jun. 1, 2016, Geneva, CH; (Joint Video Exploration Team (JVET) of ITU-T SG 16 WP 3 and ISO/IEC JTC 1/SC 29/WG 11); JVET-C1001_v3, Jul. 6, 2016, 37 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Sullivan et al., "Overview of the High Efficiency Video Coding (HEVC) Standard", IEE Transactions on Circuits and Systems for Video Technology,vol. 22, No. 12, Dec. 2012, 20 pp.
Chen et al., "Coding tools investigation for the next generation video coding based on HEVC", ResearchGate, URL: https://www.researchgate.net/publication/ 300345997_Coding_tools_investigation_for next_generation_video_coding_based_on_HEVC, Sep. 2015, 10 pp.
Karczewicz M., et al., "Study of Coding Efficiency Improvements beyond HEVC," 113. MPEG Meeting; Oct. 19 through 23, 2015; Geneva, CH; (Motion Picture Expert Group or ISO/IEC JTC1/SC29/WG11),, No. M37102, Oct. 15, 2015, XP030065470, 13 pp.
Chen et al., "Further Improvements to HMKTA-1.0", 52nd Meeting, Jun. 19 through 26, 2015, Warsaw, PL; (ITU—Telecommunications Standardization Sector Study Group 16 Question 6 Video Coding Experts Group (VCEG)), VCEG-AZ07, Jun. 19, 2015, 8 pp.
Alshina et al., "Known tools performance investigation for next generation video coding", 52nd Meeting, Jun. 19 through 26, 2015, Warsaw, PL; (ITU—Telecommunications Standardization Sector Study Group 16 Question 6 Video Coding Experts Group (VCEG)), VCEG-AZ05, Jun. 18, 2015, 5 pp.
Chien et al., "Extension of Advanced Temporal Motion Vector Predictor (ATMVP)", 52nd Meeting, Jun. 19 through 26, 2015, Warsaw, PL; (ITU—Telecommunications Standardization Sector Study Group 16 Question 6 Video Coding Experts Group (VCEG)), VCEG-AZ10, Jun. 18, 2015, 4 pp.
Liu et al., "Local Illumination Compensation", 52nd Meeting, Jun. 19 through 26, 2015, Warsaw, PL; (ITU—Telecommunications Standardization Sector Study Group 16 Question 6 Video Coding Experts Group (VCEG)), VCEG-AZ06, Jun. 18, 2015, 4 pp.
Lan et al., "Enhancement of HEVC using Signal Dependent Transform (SDT)", 52nd Meeting, Jun. 19 through 26, 2015, Warsaw, PL; (ITU—Telecommunications Standardization Sector Study Group 16 Question 6 Video Coding Experts Group (VCEG)), VCEG-AZ08, Jun. 21, 2015, 7 pp.
Rosewarne et al., "High Efficiency Video Coding (HEVC) Test Model 16 (HM 16) Improved Encoder Description Update 4", 22nd Meeting, Oct. 15 through 21, 2015, Geneva, CH; (Joint Collaborative Team on Video Coding (JCT-VC) of ITU-T SG16 WP3 and ISO/IEC JTC1/SC29/WG11), JCTVC-V1002, Feb. 12, 2016, 62 pp.
Suehring et al., "JVET common test conditions and software reference configurations", 2nd Meeting, Feb. 20 through 26, 2016, San Diego, CA, USA; (Joint Video Exploration Team (JVET) of ITU-T SG16 WP3 and ISO/IEC JTC1/SC29/WG11), JVET-V1010, Mar. 29, 2016, 4 pp.
Chen et al., "Algorithm Description of Joint Exploration Test Model 2", 2nd Meeting, Feb. 20 through 26, 2016, San Diego, CA, USA; (Joint Video Exploration Team (JVET) of ITU-T SG 16 WP 3 and ISO/IEC JTC 1/SC 29/WG 11), JVET-B1001_v1, Mar. 8, 2016, 31 pp.
Budagavi et al., "Core Transform Design in the High Efficiency Video Coding (HEVC) Standard", IEEE Journal of Selected Topics in Signal Processing, vol. 7, No. 6, Dec. 2013, 13 pp.
Chen et al., "Further Improvements to HMKTA-1.0", 52nd Meeting, Jun. 19 through 26, 2015, Warsaw, PL; (ITU—Telecommunications Standardization Sector Study Group 16 Question 6 Video Coding Experts Group (VCEG)), VCEG-AZ07_v2, Jun. 23, 2015, 9 pp.
Cao et al., "Short Distance Intra Coding Scheme for HEVC", 2012 Picture Coding Symposium, May 7-9, 2012, Kraków, PL, IEEE Xplore, Jun. 8, 2012, 4 pp.
Yuan et al., "Non-Square Quadtree Transform Structure for HEVC", 2012 Picture Coding Symposium, May 7-9, 2012, Kraków, PL, IEEE Xplore, Jun. 8, 2012, 4 pp.
Marpe et al., "Transform Coding Using the Residual Quadtree", Fraunhofer Heinrich Hertz Institute, URL: https://www.hhi.fraunhofer.de/en/departments/vca/research-groups/image-video-coding/research-topics/transform-coding-using-the-residual-quadtree-rqt.html, downloaded on Nov. 21, 2016, 5 pp.
Boyce et al., "Draft high efficiency video coding (HEVC) version 2, combined format range extensions (RExt), scalability (SHVC), and multi-view (MV-HEVC) extensions", 18th Meeting, Jun. 30 through Jul. 9, 2014, Sapporo, JP; (Joint Collaborative Team on Video Coding (JCT-VC) of ITU-T SG 16 WP 3 and ISO/IEC JTC 1/SC 29/WG 11), JCTVC-R1013_v6, Oct. 1, 2014, 545 pp.
Wang et al., "High Efficiency Video Coding (HEVC) Defect Report", 14th Meeting, Jul. 25 through Aug. 3, 2013, Vienna, AT; (Joint

(56) References Cited

OTHER PUBLICATIONS

Collaborative Team on Video Coding (JCT-VC) of ITU-T SG 16 WP 3 and ISO/IEC JTC 1/SC 29/WG 11), JCTVC-N1003_v1, Sep. 27, 2013, 312 pp.

Liu et al., "Rectangular (2NxN and Nx2N) Intra Prediction", 7th Meeting, Nov. 21 through 30, 2011, Geneva, CH; (Joint Collaborative Team on Video Coding (JCT-VC) of ITU-T SG16 WP3 and ISO/IEC JTC1/SC29/WG11), Nov. 24, 2011, 6 pp.

Liu et al., "3D-CE1.h related: Illumination Compensation for Inter-View Prediction", 1st Meeting, Jul. 16 through 20, 2012, Stockholm, SE; (Joint Collaborative Team on 3D Video Coding Extension Development of ITU-T SG 16 WP 3 and ISO/IEC JTC 1/SC 29/WG 11); JCT2-A0086, Jul. 13, 2012, 20 pp.

Cao et al., "CE6.b1 Report on Short Distance Intra Prediction Method", 5th Meeting, Mar. 16 through 23, 2011, Geneva, CH; (Joint Collaborative Team on Video Coding (JCT-VC) of ITU-T SG16 WP3 and ISO/IEC JTC1/SC29/WG11), JCTVC-E278, Mar. 23, 2011, 7 pp.

Cao et al., "CE6.b1 Report on Short Distance Intra Prediction Method", 5th Meeting, Mar. 16 through 23, 2011, Geneva, CH; (Joint Collaborative Team on Video Coding (JCT-VC) of ITU-T SG16 WP3 and ISO/IEC JTC1/SC29/ WG11), JCTVC-E278 Powerport , Mar. 23, 2011, 16 pp.

Chen et al., "CE6.a: Chroma intra prediction by reconstructed luma samples", 5th Meeting, Mar. 16 through 23, 2011, Geneva, CH; (Joint Collaborative Team on Video Coding (JCT-VC) of ITU-T SG16 WP3 and ISO/IEC JTC1/SC29/WG11), JCTVC-E266, Mar. 11, 2011, 7 pp.

Zhao et al., "Video Coding with Rate-Distortion Optimizer Transform", IEEE Transactions on Circuits and Systems for Video Technology, vol. 22, No. 1, Jan. 2012, 14 pp.

Chiu et al., "Cross-channel techniques to improve intra chroma prediction", 6th meeting, Jul. 14 through 22, 2011, Torino, IT; (Joint Collaborative Team on Video Coding (JCT-VC) of ITU-T SG16 WP3 and ISO/IEC JTC1/SC29/ WG11), JCTVC-F502, Jul. 2, 2011, 6 pp.

IEEE Std 802.11-2012 (Revision of IEEE Std 802.11-2007), IEEE Standard for Information technology—Telecommunications and information exchange between systems Local and metropolitan area network—Specific requirements Part 11: Wireless LAN Medium Access Control (MAC) and Physical Layer (PHY) Specifications, Mar. 29, 2012, 2793 pp.

IEEE 802.15.1-2005, Part 15.1: Wireless medium access control (MAC) and physical layer (PHY) specifications for wireless personal area networks (WPANs), Jun. 14, 2005, 600 pp.

Ford A., et al., "Colour Space Conversions", University of Westminster, London, Tech. Rep., Aug. 11, 1998, 31 pp.

Said et al., "Position dependent intra prediction combination", ISO/IEC JTC1/SC29/WG11 MPEG2015/M37502, Geneva, CH, Oct. 2015, 4 pp.

Choi et al., "Information on coding efficiency improvements over HEVC for 4K content", ISO/IEC JTC1/SC29/WG11 MPEG2015/M37043, Geneva, CH, Oct. 2015, 10 pp.

Lin et al., "Affine transform prediction for next generation video coding", ISO/IEC JTC1/SC29/WG11 MPEG2015/m37525, Genva, CH, Oct. 2015, 10 pp.

Kawamura et al., "Non-RC1: Chroma intra prediction with mode-dependent reduced reference", 14th meeting, Jul. 25 through Aug. 2, 2013, Vienna, AT; (Joint Collaborative Team of Video Coding (JCT-VC) of ITU-T SG 16 WP 3 and ISO/IEC JTC 1/SC 29/WG 11), JCTVC-N0368, Jul. 27, 2013, 5 pp.

Liu et al., "3D-CE1.h related: Illumination Compensation for Inter-View Prediction", 1st Meeting, Jul. 16 through 20, 2012, Stockholm, SE; (Joint Collaborative Team on 3D Video Coding Extension Development of ITU-T SG 16 WP 3 and ISO/IEC JTC 1/SC 29/WG 11); JCT2-A0086, Jul. 11, 2012, 7 pp.

Sato et al., "Complexity Reduction of Chroma Intra Prediction by Reconstructed Luma Samples", 6th Meeting, Jul. 14 through 22, 2011, Torino, IT; (Joint Collaborative Team on 3D Video Coding Extension Development of ITU-T SG 16 WP 3 and ISO/IEC JTC 1/SC 29/WG 11), JCTVC-F431, Jul. 1, 2011, 3 pp.

Chen, et al., "Chroma Intra Prediction by Scaled Luma Samples Using Integer Operations", JCT-VC Meeting; MPEG Meeting; Oct. 7-15, 2010; (Joint Collaborative Team on Video Coding of ISO/IEC JTC1/SC29/WG11 and ITU-T SG.16, No. JCTVC-C2062; Oct. 2, 2010, URL:HTTP://WFTP3.ITU.INT/AV-ARCH/JCTVC-SITE/, 7 pp.

International Search Report and Written Opinion from International Application No. PCT/US2016/063672, dated Mar. 14, 2017, 17 pp.

Kim, et al., "RCE1: EXP1/4 The Performance of Extended Chroma Mode for Non 4:2:0 Format", JCT-VC Meeting, Jul. 25-Aug. 2, 2013, Vienna, (Joint Collaborative Team on Video Coding of ISO/IEC JTC1/SC29/WG11 and ITU-TSG.16 ), No. JCTVC-N0227, Jul. 16, 2013, 8 pp.

Mediatek Inc., "Block Partitioning Structure for Next Generation Video Coding", ITU, Telecommunication Standardization Sector, COM 16—C 966 R3—E, Sep. 2015, 8 pp.

Reznik et al., "Efficient fixed-point approximations of the 8x8 Inverse Discrete Cosine Transform", Applications of Digital Image Processing, Sep. 24, 2007, pp. 669617-1-669617-17, vol. 6696, Proceedings of SPIE.

Wien, "Adaptive Block Transforms (ABT)" Joint Video Team (JVT) of ISO/IEC MPEG & ITU-T VCEG(ISO/IEC JTC1/SC29/WG11 and ITU-T SG16 Q6), No. VCEG-M62, Mar. 28, 2001, XP030003232, 7 pp.

Wien, "Variable Block-Size Transforms for Hybrid Video Coding", Dissertation Der Rheinisch-Westfaelischen Technischen Hochschule Aachen, Feb. 3, 2004, 183 pp. [uploaded in parts].

Yuan, et al., "CE2: Non-Square Quadtree Transform for Symmetric and Asymmetric Motion Partition," Joint Collaborative Team on Video Coding of ITU-T SG16 WP3 and ISO/IEC JTC/SC29/WG11, JCTVC-F412, 6th Meeting, Torino, Jul. 14-22, 2011, 7 pp.

An J., et al., "Block partitioning structure for next generation video coding", MPEG doc. m37524 and ITU-T SG16 Doc.COM16-C966-E, Oct. 2015, pp. 1-7.

International Preliminary Report on Patentability—PCT/US2016/063672, The International Bureau of WIPO—Geneva, Switzerland, dated Jun. 7, 2018.

* cited by examiner

MODIFICATION OF TRANSFORM COEFFICIENTS FOR NON-SQUARE TRANSFORM UNITS IN VIDEO CODING

This application claims the benefit of U.S. Provisional Patent Application 62/260,103, filed Nov. 25, 2015, and U.S. Provisional Patent Application 62/310,271, filed Mar. 18, 2016, the entire content of each of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

This disclosure is related to intra and inter prediction partitions, non-square transforms, intra and inter coding modes for non-square blocks, and associated entropy coding. Techniques of this disclosure may be used in the context of advanced video codecs, such as extensions of HEVC or the next generation of video coding standards. In one example, a quantization process is adapted for use with non-square transform units.

In one example, this disclosure describes a method of decoding encoded video data, the method comprising: receiving, by a video decoder, a bitstream that comprises an encoded representation of the video data; applying, by the video decoder, a dequantization process to transform coefficients of a non-square transform unit (TU) of a coding unit (CU) of the video data; after applying the dequantization process to the transform coefficients, modifying, by the video decoder, the dequantized transform coefficients such that each respective dequantized transform coefficient of the dequantized transform coefficients is based on the respective dequantized transform coefficient divided by an approximation of $\sqrt{2}$; applying, by the video decoder, an inverse transform to the modified dequantized transform coefficients to reconstruct a residual block; and reconstructing, by the video decoder, samples of a coding block by adding samples of a predictive block to corresponding samples of the residual block for the TU of the CU.

In another example, this disclosure describes a method of encoding video data, the method comprising: receiving, by a video encoder, the video data; generating, by the video encoder, a residual block for a non-square transform unit (TU) of a coding unit (CU) such that each residual sample of the residual block indicates a difference between corresponding samples of a coding block of the CU and a predictive block of a prediction unit (PU) of the CU; applying, by the video encoder, a transform to the residual block to generate a block of transform coefficients; modifying, by the video encoder, the transform coefficients such that each respective transform coefficient of the block of transform coefficients is based on the respective transform coefficient multiplied by an approximation of $\sqrt{2}$; after modifying the transform coefficients, applying, by the video encoder, a quantization process to the modified transform coefficients of the non-square TU of the CU; and including, by the video encoder, in a bitstream comprising an encoded representation of the video data, data based on the quantized transform coefficients.

In another example, this disclosure describes an apparatus for decoding video data, the apparatus comprising: a memory configured to store the video data; and a video decoder implemented using circuitry, software, or a combination thereof, the video decoder configured to: apply a dequantization process to transform coefficients of a non-square transform unit (TU) of a coding unit (CU) of the video data; after applying the dequantization process to the transform coefficients, modify the dequantized transform coefficients such that each respective dequantized transform coefficient of the dequantized transform coefficients is based on the respective dequantized transform coefficient divided by an approximation of $\sqrt{2}$; apply an inverse transform to the modified dequantized transform coefficients to reconstruct a residual block; and reconstruct samples of a coding block by adding samples of a predictive block to corresponding samples of the residual block for the TU of the CU.

In another example, this disclosure describes an apparatus for encoding video data, the apparatus comprising: a memory configured to store the video data; and a video encoder implemented using circuitry, software, or a combination thereof, the video encoder configured to: generate a residual block for a non-square transform unit (TU) of a coding unit (CU) such that each residual sample of the residual block indicates a difference between corresponding samples of a coding block of the CU and a predictive block of a prediction unit (PU) of the CU; apply a transform to the residual block to generate a block of transform coefficients; modify the transform coefficients such that each respective transform coefficient of the block of transform coefficients is based on the respective transform coefficient multiplied by an approximation of $\sqrt{2}$; after modifying the transform coefficients, apply a quantization process to the modified transform coefficients of the non-square TU of the CU; and include, in a bitstream comprising an encoded representation of the video data, data based on the quantized transform coefficients.

In another example, this disclosure describes an apparatus for decoding video data, the apparatus comprising: means for receiving a bitstream that comprises an encoded representation of the video data; means for applying a dequantization process to transform coefficients of a non-square transform unit (TU) of a coding unit (CU) of the video data; means for modifying, after applying the dequantization process to the transform coefficients, the dequantized transform coefficients such that each respective dequantized transform coefficient of the dequantized transform coefficients is based on the respective dequantized transform coefficient divided by an approximation of $\sqrt{2}$; means for applying an inverse transform to the modified dequantized transform coefficients to reconstruct a residual block; and means for reconstructing samples of a coding block by adding samples of a predictive block to corresponding samples of the residual block for the TU of the CU.

In another example, this disclosure describes an apparatus for encoding video data, the apparatus comprising: means for receiving the video data; means for generating a residual block for a non-square transform unit (TU) of a coding unit (CU) such that each residual sample of the residual block indicates a difference between corresponding samples of a coding block of the CU and a predictive block of a prediction unit (PU) of the CU; means for applying a transform to the residual block to generate a block of transform coefficients; means for modifying the transform coefficients such that each respective transform coefficient of the block of transform coefficients is based on the respective transform coefficient multiplied by an approximation of $\sqrt{2}$; means for applying, after modifying the transform coefficients, a quantization process to the modified transform coefficients of the non-square TU of the CU; and means for including, in a bitstream comprising an encoded representation of the video data, data based on the quantized transform coefficients.

In another example, this disclosure describes a computer-readable medium having instructions stored thereon that, when executed, configure an apparatus for decoding video data to: receive a bitstream that comprises an encoded representation of the video data; apply a dequantization process to transform coefficients of a non-square transform unit (TU) of a coding unit (CU) of the video data; after applying the dequantization process to the transform coefficients, modify the dequantized transform coefficients such that each respective dequantized transform coefficient of the dequantized transform coefficients is based on the respective dequantized transform coefficient divided by an approximation of $\sqrt{2}$; apply an inverse transform to the modified dequantized transform coefficients to reconstruct a residual block; and reconstruct samples of a coding block by adding samples of a predictive block to corresponding samples of the residual block for the TU of the CU.

In another example, this disclosure describes a computer-readable medium having instructions stored thereon that, when executed, configure an apparatus for encoding video data to: receive the video data; generate a residual block for a non-square transform unit (TU) of a coding unit (CU) such that each residual sample of the residual block indicates a difference between corresponding samples of a coding block of the CU and a predictive block of a prediction unit (PU) of the CU; apply a transform to the residual block to generate a block of transform coefficients; modify the transform coefficients such that each respective transform coefficient of the block of transform coefficients is based on the respective transform coefficient multiplied by an approximation of $\sqrt{2}$; after modifying the transform coefficients, apply a quantization process to the modified transform coefficients of the non-square TU of the CU; and include, in a bitstream comprising an encoded representation of the video data, data based on the quantized transform coefficients.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
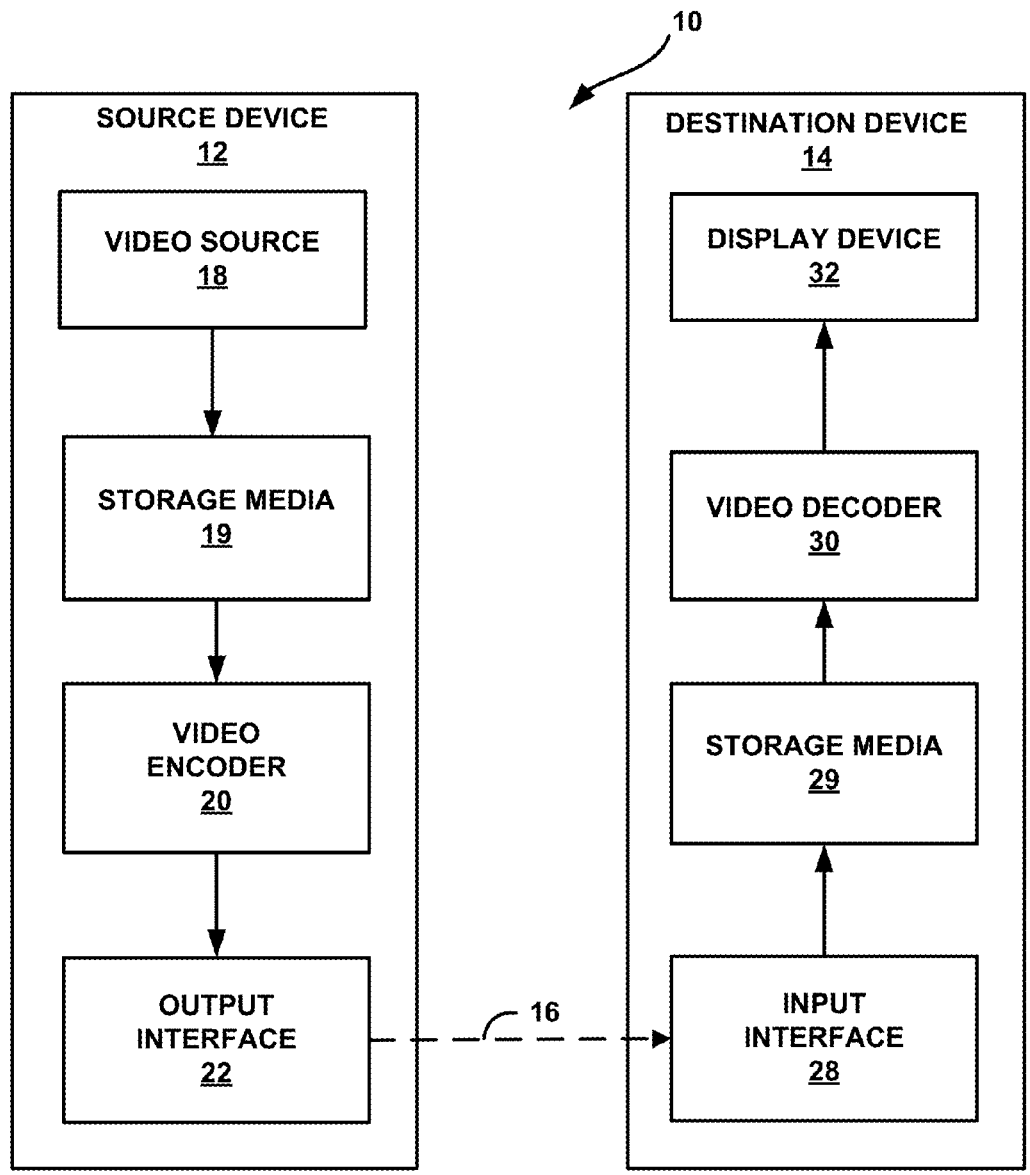
FIG. 1 is a block diagram illustrating an example video encoding and decoding system configured to implement techniques of the disclosure.

In general, this disclosure is related to intra and inter prediction partitions, non-square transforms, intra and inter coding modes for non-square blocks, and associated entropy coding. Techniques of this disclosure may be used in the context of advanced video codecs, such as extensions of High Efficiency Video Coding (HEVC) or the next generation of video coding standards.

In HEVC, a video coder (i.e., a video encoder or a video decoder) partitions a coding unit (CU) of a picture into one or more prediction units (PUs). The video coder uses intra prediction or inter prediction to generate predictive blocks for each PU of the CU. The residual data of the CU represents differences between the predictive blocks for the PUs of the CU and an original coding block of the CU. In instances where the CU is intra predicted (i.e., the predictive blocks for the PUs of the CU are generated using intra prediction), the residual data of the CU may be partitioned into one or more square-shaped transform units (TUs). However, in instances where the CU is inter predicted (i.e., the predictive blocks for the PUs of the CU are generated using inter prediction), the residual data of the CU may be partitioned into one or more square or non-square TUs. In this disclosure, references to shapes of units (e.g., CUs, PUs, TUs) may refer to the shapes of corresponding blocks. Thus, a non-square PU may be interpreted as referring to a non-square prediction block, a non-square TU may be interpreted as referring to a non-square transform block, and vice versa. Furthermore, it is noted that a prediction block need not be tied to the concept of a PU as PU is defined in HEVC, but rather have the meaning of a block of samples on which a prediction (e.g., inter prediction, intra prediction) is performed. Similarly, a transform block need not be tied to the concept of a TU as TU is defined in HEVC, but rather have the meaning of a block of samples on which a transform is applied.

As described below, the introduction of non-square TUs may introduce certain problems when used with particular coding tools.

For example, linear modeling (LM) prediction mode is a technique for reducing cross-component correlation that was studied during development of HEVC. When a video coder uses the LM prediction mode, the video coder predicts chroma samples of a PU based on reconstructed luma samples of a PU of a CU. The chroma samples of a PU are chroma samples of a chroma predictive block of the PU. Example types of chroma samples include Cb samples and Cr samples. The video coder may generate the reconstructed luma samples of the PU by summing samples of a luma predictive block of the PU with corresponding luma residual samples of the PU.

In particular, when a video coder uses the LM prediction mode, the video coder may determine a predicted chroma sample of the PU at position $(i, j)$ as $\alpha \cdot rec_L(i,j)+\beta$, where $rec_L(i,j)$ is a reconstructed luma sample of the PU at position $(i, j)$ and $\alpha$ and $\beta$ are parameters. In some cases, such as in the 4:2:0 color format, one M×K chroma block corresponds to an 2M×2K luma block, in this case, $rec_L(i,j)$ indicates the value located at $(i,j)$ of a down-sampled version (with M×K) of the 2M×2K luma block. The video coder determines the value of $\alpha$ and $\beta$ based on the values of reconstructed luma reference samples and reconstructed chroma reference samples. The reconstructed luma reference samples and the reconstructed chroma reference samples are samples along the top and left sides of the PU. The formulas for determining $\beta$ involve a division operation by the total number of reference samples (denoted I, which is equal to the summation of M and K). In typical cases, M and K are equal and can be represented by $2^l$, in HEVC, l is a positive integer value. So long as the prediction block is square, I is equal to $2^m$, where m may vary for different prediction block sizes. Thus, instead of performing a division operation to divide by I, the video coder may perform a right shift operation when calculating the value of $\beta$. Right shift operations are significantly faster and less complex to implement than division operations. In this disclosure, references to sizes of various types of blocks, such as CUs, TUs, and PUs, refer to the sizes of coding blocks, transform blocks, and prediction blocks of the CUs, TUs, and PUs, respectively. Furthermore, in this disclosure, references to the sides of various types of video coding units, such as CUs, TUs, and PUs, refer to sides of blocks (e.g., coding blocks, transform blocks, prediction/predictive blocks) corresponding to the various types of blocks.

However, if a luma block (e.g., a luma prediction block of a PU) is not square (e.g., M is equal to 12 and K is equal to 16), I is not always equal to $2^m$. Hence, if the luma block is not square, it may not be possible to use a right shift operation in place of the division operation when calculating the value of β. Thus, the video coder may need to implement a costly division operation to calculate the value of β.

This disclosure describes a technique that may eliminate the need to implement a division operation when calculating the value of β when using the LM prediction mode for a non-square blocks. In some cases, even for a square PU wherein M is equal to K but M is not a power of 2, the technique described here may also be applicable. In accordance with an example of this technique, a video coder may reconstruct a set of luma reference samples and a set of chroma reference samples. The set of luma reference samples may comprise luma samples neighboring a top side of a non-square luma block of a current picture of the video data and luma samples neighboring a left side of the non-square luma block. The non-square luma block may be a luma prediction block of a PU. Hence, the PU may be a considered a non-square PU. The set of chroma reference samples may comprise chroma samples neighboring the top side of a non-square chroma block and chroma samples neighboring the left side of the non-square chroma block. The non-square chroma block may be a chroma prediction block of the PU. Additionally, the video coder may reconstruct luma samples of the non-square prediction block. Furthermore, the video coder may sub-sample the set of luma reference samples such that a total number of luma reference samples in the set of luma reference samples that neighbor a longer side of the non-square luma block is the same as a total number of luma reference samples of the set of luma reference samples that neighbor a shorter side of the non-square luma block. The video coder may determine a first parameter equal to:

$$\alpha = \frac{I \sum x_i \cdot y_i - \sum x_i \cdot \sum y_i}{I \sum x_i \cdot x_i - \sum x_i \cdot \sum x_i}$$

where I is a total number of reference samples in the set of the luma reference samples, $x_i$ is a luma reference sample in the set of luma reference samples, and $y_i$ is a chroma reference sample in the set of chroma reference samples. Additionally, the video coder may determine a second parameter equal to:

$$\beta = (\Sigma y_i - \alpha \cdot \Sigma x_i)/I$$

For each respective chroma sample of a predictive chroma block, the video coder may determine a value of the respective chroma sample such that the value of the respective chroma sample is equal to α multiplied by a respective reconstructed luma sample corresponding to the respective chroma sample, plus β. The predictive chroma block may be a predictive chroma block for the non-square PU. The video coder may reconstruct, based in part on the predictive chroma block, a coding block.

In the example above, by sub-sampling the set of luma reference samples such that the total number of luma reference samples that neighbor the longer side of the non-square luma block is the same as the total number of luma reference samples that neighbor a shorter side of the non-square luma block, the video coder may ensure that the total number of reference samples in the set of luma reference samples is a power of 2. Hence, the video coder may be able to use a right shift operation instead of a division operation when calculating the value of β. Therefore, a video coder implementing the example above may be less complex and/or faster than a video decoder forced to use a division operation when calculating the value of β. It is noted however that a video coder may perform the actions described in the example above using a division operation instead of a shift operation, although such a video coder may not have the advantages of using the shift operation instead of the division operation. In some examples, the reference samples that neighbor a short or long side of the non-square prediction block may be unavailable, in this case, there may be no need to perform the sub-sampling process to available reference samples located at the other side.

In HEVC, a video encoder applies a transform to blocks of residual data (i.e., transform blocks) to convert the blocks of residual data into blocks of transform coefficients. At a high level, the video encoder may generate a block of transform coefficients (i.e., a transform coefficient block), by first generating a block of intermediate values by applying a N-point 1-dimension DCT transform to columns of the transform block. N is equal to the height and width of the transform block. The video encoder may then generate the block of transform coefficients by applying the same N-point 1-dimensional DCT transform to the rows of the block of intermediate values. A video decoder inverses the transform in a similar way to recover the transform block.

As one can see from the discussion above, the process of applying the transform in HEVC is reliant on transform blocks being square. However, it may be desirable to have non-square transform blocks. For instance, compression performance may be reduced when the boundaries of transform blocks cross boundaries of inter or intra predictive blocks. The use of non-square predictive blocks may be valuable to capture objects that do not fall into square areas. Therefore, non-square predictive blocks and/or non-square transforms may be useful in terms of coding performance improvement. A transform matrix coefficient is defined with a denominator equal to $\sqrt{N}$ if the transform matrix coefficient is a N-point 1-dimension DCT transform. Previous to this disclosure, the denominator $\sqrt{N}$ was considered as the normalization factor and implemented by a right shift in a quantization process. Taking a 2-dimension DCT transform into consideration, for example, a K×L transform, the normalization factor would be ($\sqrt{K}*\sqrt{L}$). If N is defined by the one satisfying the equation log 2(N*N)=((log 2(K)+log 2(L))>>1)<<1), the ratio of utilized normalization factor (sqrt(N)*sqrt(N)) and the real normalization factor ($\sqrt{K}*\sqrt{L}$) would be 1/$\sqrt{2}$. Directly applying a square transform (e.g., a N-point transform applied to both columns and rows) to a non-square transform block may change the total energy (i.e., the sum of squares of all transformed coefficients after quantization) in the resulting transform coefficient block due to the increased normalization factor, which results in reduced compression performance.

As described in detail elsewhere in this disclosure, for a transform block of size K×L, the video encoder multiplying the transform coefficients by $\sqrt{2}$ when (log 2(K)+log 2(L)) is odd, and the video decoder dividing the transform coefficients by $\sqrt{2}$ when (log 2(K)+log 2(L)) is odd may address this problem.

3D-HEVC is an extension of HEVC for 3-dimensional (3D) video data. 3D-HEVC provides for multiple views of the same scene from different viewpoints. The standardization efforts for 3D-HEVC include the standardization of a multi-view video codec based on HEVC. In 3D-HEVC, inter-view prediction based on reconstructed view components (i.e., reconstructed pictures) from different views is enabled. Furthermore, 3D-HEVC implements inter-view motion prediction and inter-view residual prediction.

The pictures of each view that represent the same time instance of video include similar video content. However, the video content of views may be displaced spatially relative to one another. In particular, the video content of the views may represent different perspectives on the same scene. For example, a video block in a picture in a first view may include video content that is similar to a video block in a picture in a second view. In this example, the location of the video block in the picture in the first view and the location of the video block in the picture in the second view may be different. For example, there may be some displacement between the locations of the video blocks in the different views.

A disparity vector for a video block provides a measure of this displacement. For example, a video block of a picture in a first view may be associated with a disparity vector that indicates the displacement of a corresponding video block in a picture in a second view.

Because of different camera settings or different distances from light sources, pictures corresponding to the same time instance, but in different views, may contain nearly the same image, but objects in one of the pictures may be brighter than corresponding objects in the other picture. Illumination compensation (IC) is a technique implemented in 3D-HEVC for compensating for such differences in illumination between views when performing inter-view prediction. In 3D-HEVC, a video coder determines a disparity vector for a current PU of a current CU of a current picture. In addition, the video coder may calculate two IC parameters for the current CU. This disclosure denotes the IC parameters as a and b. Additionally, for each respective sample of a luma predictive block of the current PU, the video coder calculates:

$$p(i,j)=a*r(i+dv_x,j+dv_y,+b)$$

In the equation above, p(i,j) is the respective sample of the luma predictive block of the current PU, (i,j) are coordinates indicating a location of the respective sample relative to a top-left corner of the current picture, $dv_x$ is a horizontal component of the disparity vector for the current PU, $dv_y$ is a vertical component of the disparity vector for the current PU, and a and b are the IC parameters.

As described in greater detail elsewhere in this disclosure, the formula defining the IC parameter b in 3D-HEVC involves a division operation by the number of reference samples neighboring the current CU's top and left sides. In 3D-HEVC, the number of reference samples neighboring the current CU's top and left sides is always a power of 2. Consequently, the division operation in the formula defining the IC parameter b may be implemented using a right-shift operation. As described elsewhere in this disclosure, a right-shift operation may be significantly less complicated to implement than a division operation and may be significantly faster than implementing a division operation.

Figure 20:
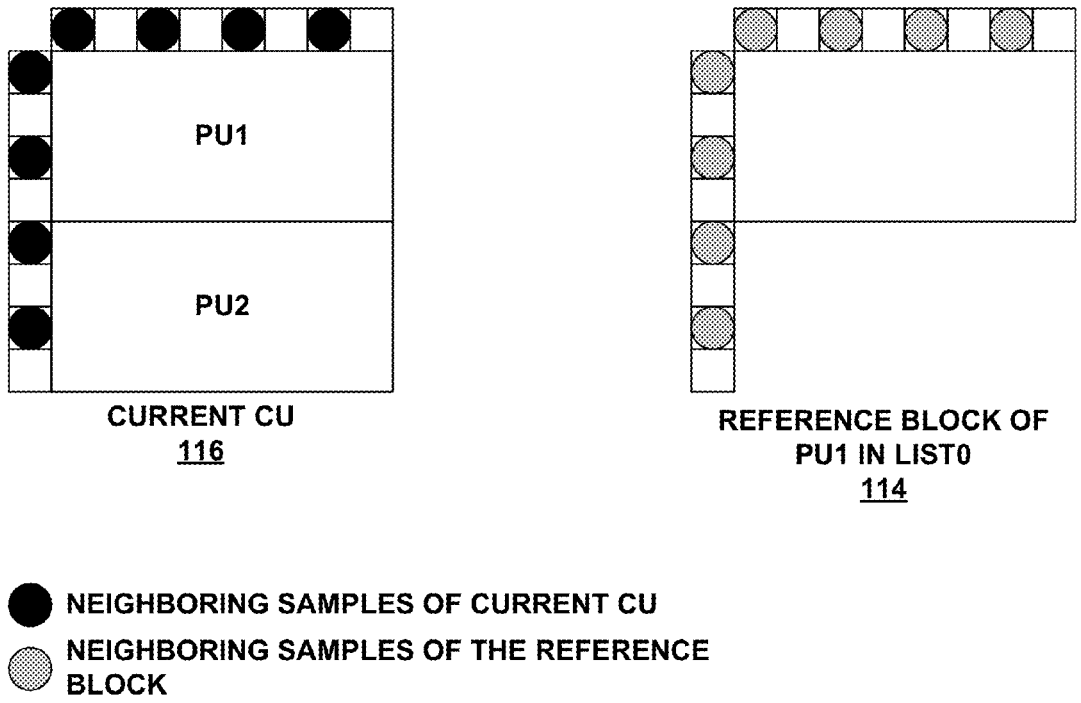
FIG. 20 is a conceptual diagram illustrating example neighboring pixels used to estimate parameters in an IC model, in which a reference block of a current coding unit is found by using a current prediction unit's disparity or motion vector.

For 2-dimension video coding, as described in H. Liu, "Local Illumination Compensation," ITU—Telecommunications Standardization Sector, Study Group 16 Question 6, Video Coding Experts Group (VCEG), 52$^{nd}$ Meeting, 19-26 Jun. 2015, Warsaw, Poland, document VCEG-AZ06 (hereinafter, "VCEG-AZ06"), Local Illumination Compensation (LIC) is enabled or disabled adaptively for each inter-mode coded coding unit (CU), and LIC is based on a linear model for illumination changes, using a scaling factor a and an offset b. When LIC applies for a CU, for each PU/sub-PU belonging to the CU, LIC parameters are derived in a way that uses subsampled (2:1 subsampling) neighboring samples of the CU and the corresponding pixels (identified by motion information of the current PU/sub-PU) in the reference picture. For a CU with size equal to N×N, the total number of boundary pixels used in parameter calculation is N instead of 2N. An example is illustrated in FIG. 20. The LIC parameters are derived and applied for each prediction direction separately. A least square error method is employed to derive the parameters a and b based on the abovementioned neighboring samples.

IC was only used when a CU only has a single PU. However, it may be desirable to use IC in instances where a CU has multiple PUs, including instances where the CU is partitioned into 2 or 3 PUs and/or the CU is partitioned asymmetrically. In such instances, the number of reference samples neighboring the current CU's top and left sides may no longer be a power of 2. Therefore, it may not be possible to calculate the IC parameter b using a right-shift operation. Rather, the video coder may need to use a slower and more complicated division operation to calculate the IC parameter b.

To address this issue, a video coder may sub-sample a first set of reference samples to generate a first sub-sampled set of reference samples that includes a total of $2^m$ reference samples, where m is an integer. In this disclosure, the terms sub-sampling indicates selection of one or more samples from a set of samples and down-sampling indicates a filtering process wherein several reference samples may be used together to derive a filtered sample. The set of reference samples may comprise samples outside the non-square predictive block of a PU along a left side and a top side of the non-square predictive block. Hence, the reference samples may also be referred to herein as neighbor samples or neighboring samples. Additionally, the video coder may sub-sample a second set of reference samples to generate a second sub-sampled set of reference samples that includes a total of $2^m$ reference samples, where m is an integer. The second set of reference samples may comprise samples outside a reference block (e.g., an inter-view reference block or temporal reference block) along a left side and a top side of the reference block. The video coder may then determine at least the IC parameter b based on the first sub-sampled set of reference samples and the second sub-sampled set of reference samples. Because the first sub-sampled set of reference samples and the second sub-sampled set of reference samples each include $2^m$ samples, the video coder may use the right shift operation to calculate the IC parameter b instead of a division operation. In this way, the techniques of this disclosure may decrease complexity of the video coder and/or accelerate video coding.

As mentioned above, the introduction of non-square TUs may introduce certain problems. For example, previous techniques of partitioning a CU into TUs followed a quad-tree splitting pattern, even if the PUs of the CU are not square. In this disclosure, a quad-tree may also be referred to as a quarter-tree. Always using a quad-tree splitting pattern may result in sub-optimal video data compression performance, especially if the quad-tree splitting pattern does not align the sides of the TUs with sides of the PUs of the CU.

Hence, in accordance with a technique of this disclosure, a transform tree of a CU is not restricted to the quad-tree splitting pattern. Rather, a node in the transform tree may have two child nodes. Thus, in one example, a video decoder may determine a CU is partitioned into TUs based on a tree structure. In this example, the video decoder may determine that a node in the tree structure has exactly two child nodes in the tree structure. In this example, a root node of the tree structure corresponds to a coding block of the CU, each respective non-root node of the tree structure corresponds to a respective block that is a partition of a block that corresponds to a parent node of the respective non-root node, and leaf nodes of the tree structure correspond to the TUs of the CU. In some examples, nodes in the transform tree may have 2 or 4 child nodes. The flexibility of a node to have 2 or 4 child nodes may increase video coding compression performance.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication.

In the example of FIG. 1, source device 12 includes a video source 18, a storage medium 19 configured to store video data, a video encoder 20, and an output interface 22. Destination device 14 includes an input interface 28, a storage medium 29 configured to store video data, a video decoder 30, and a display device 32. In other examples, a source device and a destination device may include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. In some cases, source device 12 and destination device 14 may form so-called camera phones or video phones. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 22 may then output the encoded video information onto computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and/or decoded video data.

In some examples, output interface 22 may output encoded data to a storage device. Similarly, input interface 28 may access encoded data from the storage device. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms.

Input interface 28 of destination device 14 receives information from computer-readable medium 16. Input interface 28 may comprise various types of components or devices. For example, input interface 28 may comprise a wireless receiver, a modem, a wired networking component (e.g., an Ethernet card), or another physical component. In examples where input interface 28 comprises a wireless receiver, input interface 28 may be configured to receive data, such as the bitstream, modulated according to a cellular communication standard, such as 4G, 4G-LTE, LTE Advanced, 5G, and the like. In some examples where input interface 28 comprises a wireless receiver, input interface 28 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 28 may be integrated into circuitry of video decoder 30 and/or other components of destination device 14. For example, video decoder 30 and input interface 28 may be parts of a system on a chip (SoC). The SoC may also include other components, such as a general purpose microprocessor, a graphics processing unit, and so on.

The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 may display the decoded video data to a user. For instance, destination device 14 or video decoder 30 may output, for display by display device 32, reconstructed pictures of the video data. Such reconstructed pictures may comprise reconstructed blocks. Display device 32 may comprise any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). Wang et al, "High Efficiency Video Coding (HEVC) Defect Report," Joint Collaborative Team in Video Coding (JCT-VC) of ITU-T SG 16 WP 3 and ISO/IEC JTC 1/SC 29/WG 11, 14th Meeting, Vienna, AT, 25 Jul.-2 Aug. 2013, document JCTVC-N1003_v1 (hereinafter, "JCTVC-N1003") is a draft of the HEVC standard. JCTVC-N1003 is available from http://phenix.int-evry.fr/j ct/do-c_end_user/documents/14_Vienna/wg11/JCTVC-N1003-v1.zip.

In HEVC and other video coding specifications, a video sequence typically includes a series of pictures. Pictures may also be referred to as "frames." A picture may include one or more sample arrays. Each respective sample array of a picture may comprise an array of samples for a respective color component. In HEVC, a picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to as a "coded picture" or an "encoded picture."

To generate an encoded representation of a picture, video encoder 20 may generate a set of coding tree units (CTUs). Each of the CTUs may comprise a CTB of luma samples, two corresponding CTBs of chroma samples, and syntax structures used to code the samples of the CTBs. In monochrome pictures or pictures having three separate color planes, a CTU may comprise a single CTB and syntax structures used to code the samples of the CTB. A CTB may be an N×N block of samples. A CTU may also be referred to as a "tree block" or a "largest coding unit" (LCU). A syntax structure may be defined as zero or more syntax elements present together in the bitstream in a specified order. A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions.

In HEVC, to generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may encode CUs of a picture of the video data. As part of encoding a CU, video encoder 20 may partition a coding block of the CU into one or more prediction blocks. A prediction block is a rectangular (i.e., square or non-square) block of samples on which the same prediction is applied. A prediction unit (PU) may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Thus, in general, a PU may comprise one or more prediction blocks of samples and syntax structures used to predict the prediction blocks. In some example codecs, such as HEVC, a PU may be a sub-unit of a CU. In other example codecs, there may be no distinction between a CU and a PU. In some examples, other terms may be used for PU.

Video encoder 20 may use intra prediction or inter prediction to generate a predictive block of a PU. If video encoder 20 uses intra prediction to generate a predictive block of a PU, video encoder 20 may generate the predictive block of the PU based on decoded samples of the picture that includes the PU. If video encoder 20 uses inter prediction to generate a predictive block of a PU of a current picture, video encoder 20 may generate the predictive block of the PU based on decoded samples of a reference picture (i.e., a picture other than the current picture).

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

To reiterate, in HEVC, the largest coding unit in a slice is called a CTU. Each picture is divided into CTUs, which may be coded in raster scan order for a specific tile or slice. A CTU is a square block and represents the root of a quadtree, i.e., the coding tree. A CTU contains a quad-tree, the nodes of which are CUs. In some instances, the size of a CTU can range from 16×16 to 64×64 in the HEVC main profile (although technically 8×8 CTU sizes can be supported). In some instances, the CTU size may range from 8×8 to 64×64 luma samples, but typically 64×64 is used. Each CTU can be further split into smaller square blocks called CUs. A CU can be the same size of a CTU, although a CU can be as small as 8×8. Each CU is coded with one mode. For instance, a CU may be inter coded or intra coded. When a CU is inter coded, the CU may be further partitioned into 2 or 4 PUs or may become just one PU when further partition does not apply. When two PUs are present in one CU, the two PUs can be half size rectangles or two rectangle sizes with ¼ or ¾ size of the CU. When a CU is inter coded, one set of motion information is present for each PU. In addition, each PU is coded with a unique inter-prediction mode to derive the set of motion information. In other words, each PU may have its own set of motion information.

Furthermore, video encoder 20 may decompose the residual blocks of a CU into one or more transform blocks. For instance, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied.

A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. In some examples, the one or more transforms convert the transform block from a pixel domain to a frequency domain.

In some examples, video encoder 20 does not apply the transform to the transform block. In other words, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), video encoder 20 may quantize the coefficient block. In some examples, video encoder 20 does not quantize the coefficient block. In examples where video encoder 20 does not apply the transform to the transform block, video encoder 20 may or may not quantize residual samples of the transform block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients or residual samples. For example, video encoder 20 may perform Context-Adaptive Binary Arithmetic Coding (CABAC) on the syntax elements indicating the quantized transform coefficients or residual samples. In some examples, video encoder 20 uses palette-based coding to encode CUs. Thus, an encoded block (e.g., an encoded CU) may include the entropy encoded syntax elements indicating the quantized transform coefficients.

Video encoder 20 may output a bitstream that includes a sequence of bits that forms a representation of encoded pictures of the video data and associated data (i.e., data associated with the encoded pictures). Thus, the bitstream comprises an encoded representation of the video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that are encapsulated within a NAL unit. In some instances, an RB SP includes zero bits.

Video decoder 30 may receive a bitstream generated by video encoder 20. In addition, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, to reconstruct a picture of the video data, video decoder 30 may decode blocks, such as CUs, of the picture based on syntax elements obtained from the bitstream and/or data from external sources.

In some examples, as part of decoding a current CU of the picture, video decoder 30 may use inter prediction or intra prediction to generate one or more predictive blocks for each PU of the current CU. When using inter prediction, video decoder 30 may use motion vectors of PUs to determine predictive blocks for the PUs of a current CU. In addition, video decoder 30 may, in some examples, inverse quantize coefficient blocks of TUs of the current CU. Video decoder 30 may, in some examples, perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding decoded samples (e.g., residual samples) of the transform blocks of the TUs of the current CU. By reconstructing the coding blocks for each CU of a picture, video decoder 30 may reconstruct the picture.

Moreover, in HEVC, the option to partition a picture into rectangular regions called tiles has been specified. The main purpose of tiles is to increase the capability for parallel processing rather than provide error resilience. Tiles are independently decodable regions of a picture that are encoded with some shared header information. Tiles can additionally be used for the purpose of spatial random access to local regions of video pictures. A typical tile configuration of a picture consists of segmenting the picture into rectangular regions with approximately equal numbers of CTUs in each tile. Tiles provide parallelism at a more coarse level of granularity (picture/subpicture), and no sophisticated synchronization of threads is necessary for their use.

Figure 2B:
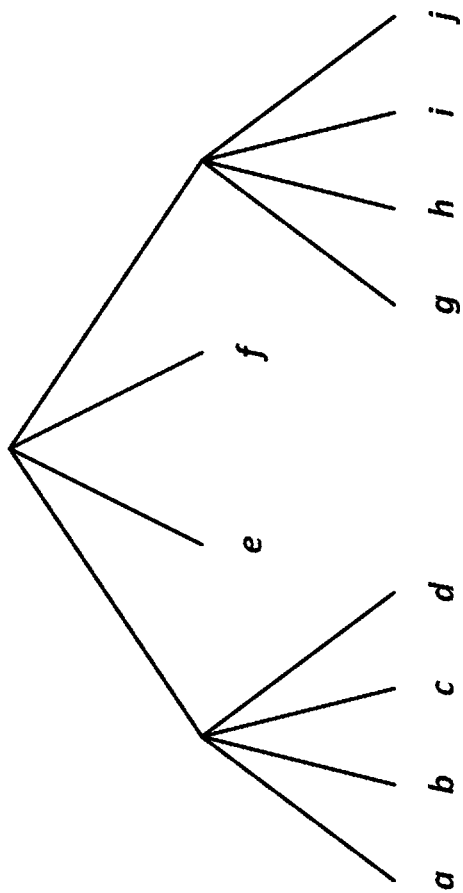
FIG. 2B is a conceptual diagram illustrating a residual quadtree for the coding unit of FIG. 2A.
Figure 2A:
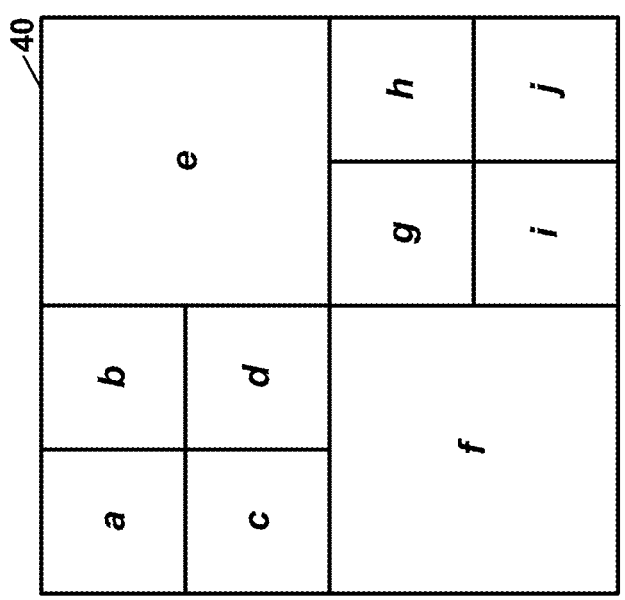
FIG. 2A is a conceptual diagram illustrating an example transform scheme based on a residual quadtree in High Efficiency Video Coding (HEVC).

To adapt the various characteristics of the residual blocks, a transform coding structure using the residual quadtree (RQT) is applied in HEVC, which is briefly described in Marpe et al., "Transform Coding Using the Residual Quadtree (RQT)," Fraunhofer Heinrich Hertz Institute, available at http://www.hhi.fraunhofer.de/fields-of-competence/image-processing/researchgroups/image-video-coding/hevc-high-efficiency-video-coding/transform-coding-using-the-residual- quadtree-rqt.html. After the CTU is split recursively into CUs, each CU is further divided into PUs and TUs. The partitioning of a CU into TUs is carried out recursively based on a quadtree approach, therefore the residual signal of each CU is coded by a tree structure, namely, the residual quadtree (RQT). The RQT allows TU sizes from 4×4 up to 32×32 luma samples. FIG. 2A and FIG. 2B are conceptual diagrams illustrating an example transform scheme based on a residual quadtree in HEVC. Particularly, FIG. 2A shows an example where a CU 40 includes ten TUs, labeled with the letters a to j, and the corresponding block partitioning. FIG. 2B is a conceptual diagram illustrating an RQT for the CU of FIG. 2A.

A video coder may process the individual TUs in a depth-first tree traversal order, which is illustrated in FIG. 2A in alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by an encoder mode decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and selects the coding mode with least rate-distortion cost as the best mode.

Three parameters are defined in the RQT: the maximum depth of the tree, the minimum allowed transform size and the maximum allowed transform size. In HEVC, the minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CTU cannot be split any further if each included TU reaches the maximum allowed transform size, e.g., 32×32. In HEVC, larger size transforms, e.g., 64×64 transform were not adopted mainly due to their limited benefit considering and relatively high complexity for relatively smaller resolution videos.

Figure 3:
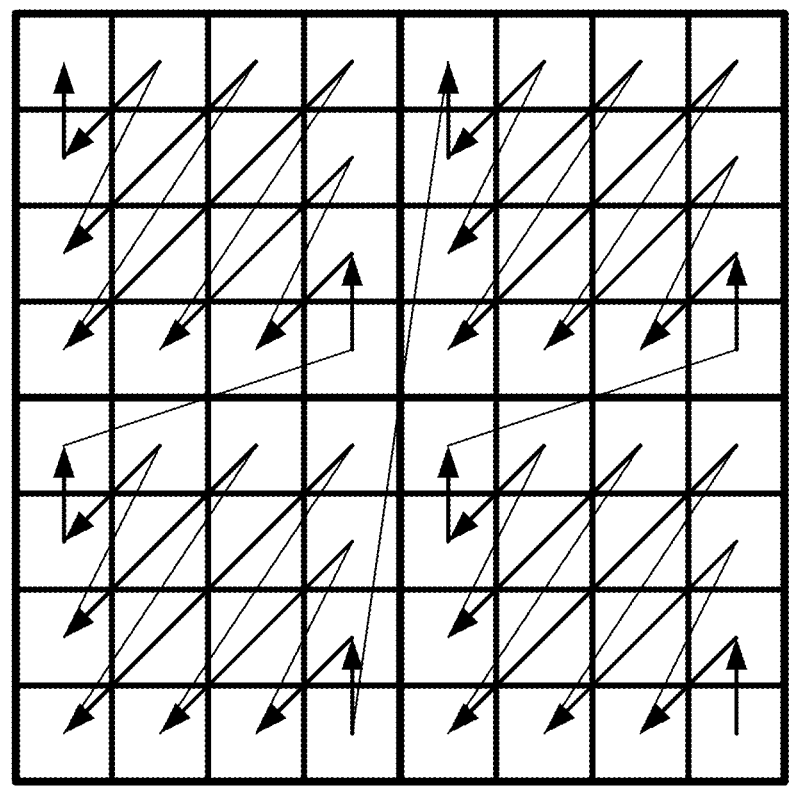
FIG. 3 is a conceptual diagram illustrating an example coefficient scan based on coefficient groups in HEVC.

In HEVC, regardless of the size of a TU, the residual of the TU (e.g., a coefficient block of the TU) is coded with non-overlapped coefficient groups (CG). Each of the CGs contains the coefficients of a 4×4 block of the TU. For example, a 32×32 TU has a total of 64 CGs, and a 16×16 TU has a total of 16 CGs. The CGs of a TU are coded according to a certain pre-defined scan order. When coding each CG, the coefficients inside the current CG are scanned and coded according to a certain pre-defined scan order for 4×4 block. FIG. 3 is a conceptual diagram illustrating an example coefficient scan based on coefficient groups in HEVC. Particularly, FIG. 3 illustrates the coefficient scan for an 8×8 TU containing four 4×4 CGs.

Figure 4:
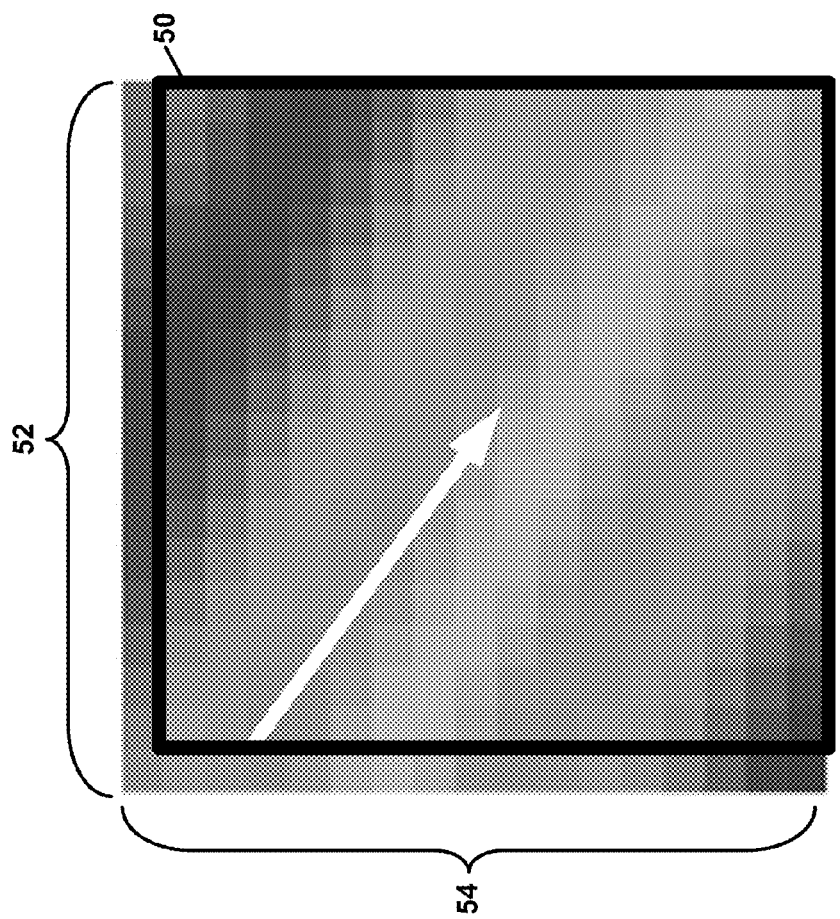
FIG. 4 is a conceptual diagram illustrating an example of intra prediction for a 16×16 block.

As noted above, video encoder 20 and video decoder 30 may perform intra prediction to generate a predictive block. Intra prediction performs image block prediction using its spatially neighboring reconstructed image samples. FIG. 4 is a conceptual diagram illustrating an example of intra prediction for a 16×16 block. In FIG. 4, a block square contains a 16×16 block 50. In FIG. 4, block 50 is predicted by the above and left neighboring reconstructed samples 52, 54 (i.e., reference samples) along a selected prediction direction. In FIG. 4, the samples outside the black box are the reference samples. The white arrow in FIG. 4 indicates the selected prediction direction.

Figure 5:
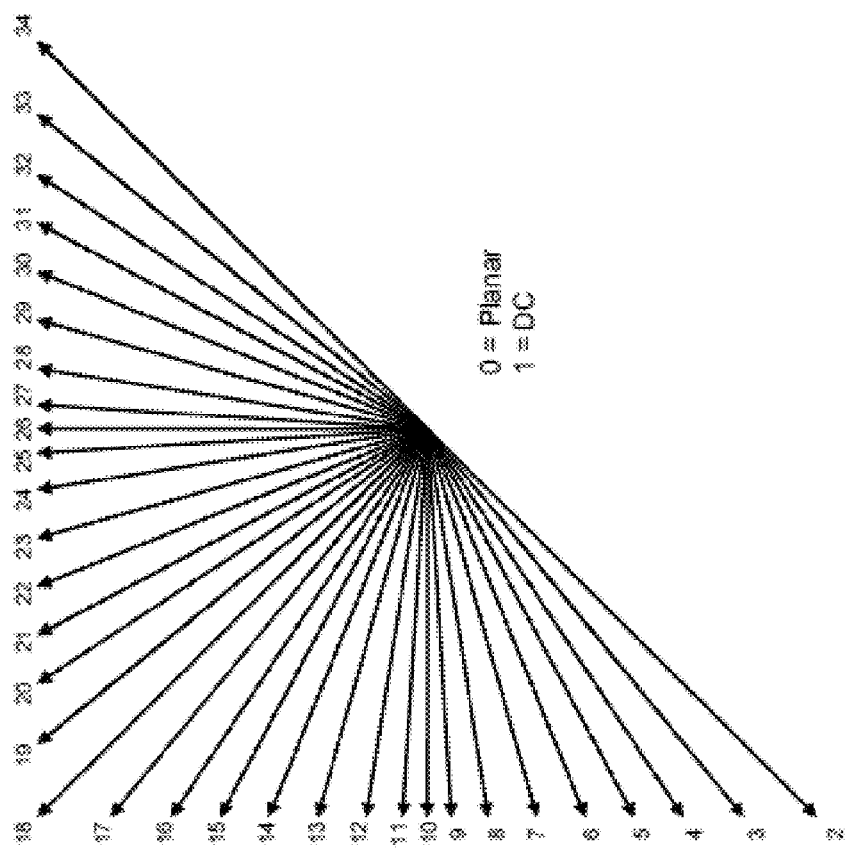
FIG. 5 is a conceptual diagram illustrating an example of 35 intra prediction modes defined in HEVC.

FIG. 5 is a conceptual diagram illustrating an example of 35 intra prediction modes defined in HEVC. As indicated in FIG. 5, HEVC defines 35 modes (including the Planar mode, DC mode and 33 angular modes) for the intra prediction of a luma block. The 35 modes of the intra prediction defined in HEVC are indexed as shown in the table below:

TABLE 1

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

HEVC intra coding supports two types of PU division, 2N×2N and N×N. 2N×2N splits a CU into one PU. In other words, the CU has one PU with the same size as the CU. N×N splits a CU into four equal-size PUs. However, the four regions specified by the partitioning type PART N×N can be also represented by four smaller CUs with the partitioning type PART 2N×2N. Due to this, HEVC allows an intra CU to be split into four PUs only at the minimum CU size.

Figure 6:
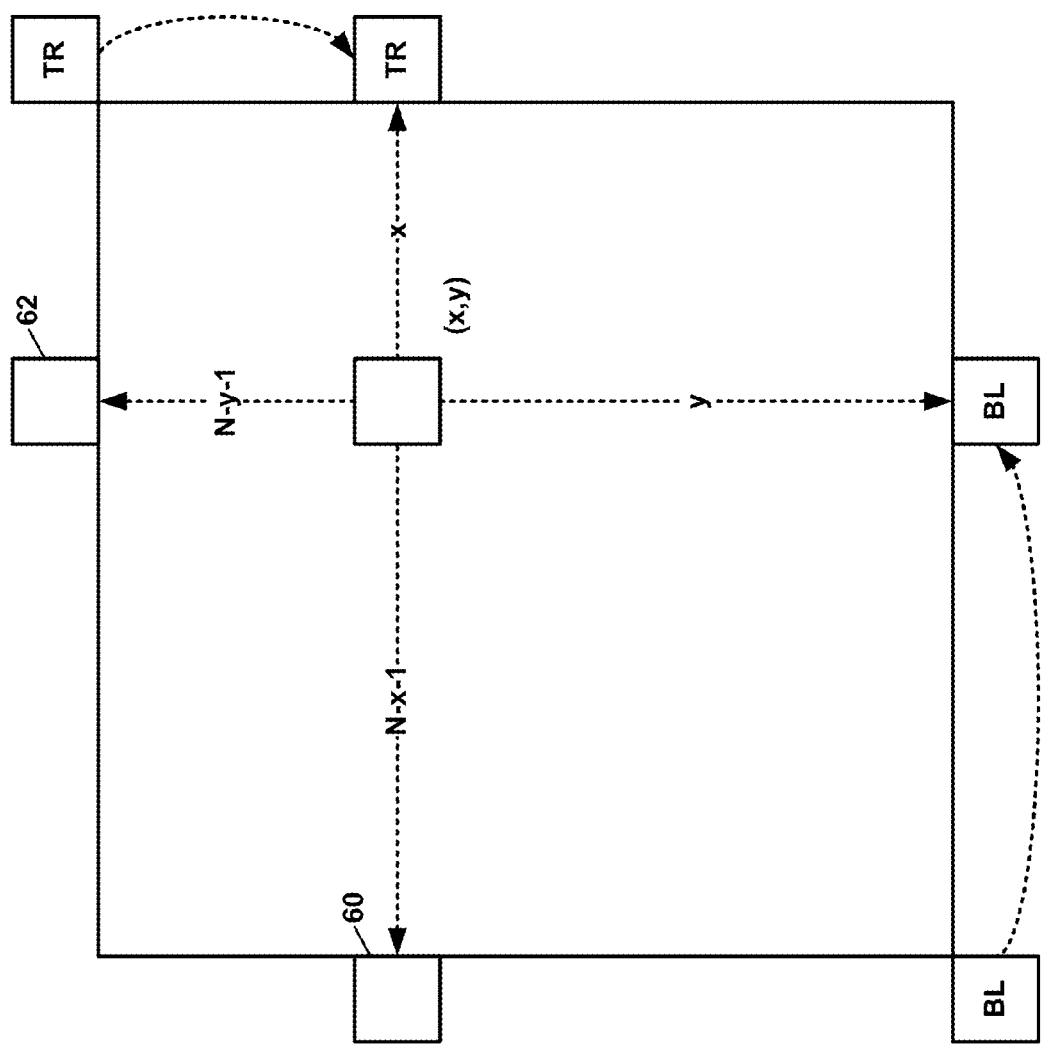
FIG. 6 is a conceptual diagram illustrating a planar mode defined in HEVC.

FIG. 6 is a conceptual diagram illustrating a planar mode defined in HEVC. Planar mode is typically the most frequently used intra prediction mode. To perform Planar prediction for an N×N block, for each sample $p_{xy}$ located at (x, y), the prediction value is calculated using four specific neighboring reconstructed samples, i.e., reference samples, with a bilinear filter. The four reference samples include a top-right reconstructed sample TR, a bottom-left reconstructed sample BL, and two reconstructed samples 60, 62 located in the same column ($r_{x,-1}$) and row ($r_{-1,y}$) as the current sample. The planar mode can be formulated as below:

$$p_{xy}=((N-1-x) \cdot L+(x+1) \cdot TR+(N-1-y) \cdot T+(y+1) \cdot BL+N)>>(\text{Log } 2(N)+1) \quad (1)$$

In formula (1) above, L corresponds to reconstructed sample 60 and T corresponds to reconstructed sample 62. For DC mode, the prediction block is simply filled with the average value of the neighboring reconstructed samples. Generally, both Planar and DC modes are applied for modeling smoothly varying and constant image regions.

Figure 7:
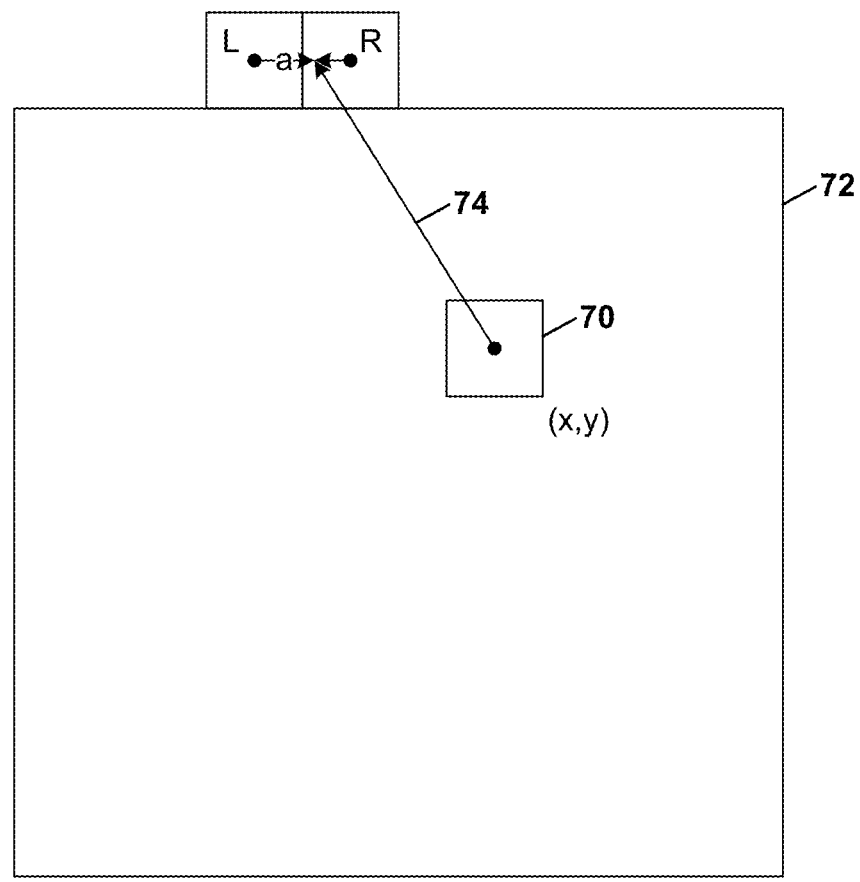
FIG. 7 is a conceptual diagram of an example angular mode defined in HEVC.

FIG. 7 is a conceptual diagram of an example angular mode defined in HEVC. The intra prediction process for angular intra prediction modes in HEVC is described as follows. For each given angular intra prediction mode, the intra prediction direction can be identified accordingly. For example, the given angular intra prediction mode may be identified according to FIG. 5. As shown in FIG. 5, intra mode 18 corresponds to a pure horizontal prediction direction, and intra mode 26 corresponds to a pure vertical prediction direction. Given a specific intra prediction direction, for each respective sample of a prediction block, coordinates (x, y) of the respective sample are first projected to a row or column of neighboring reconstructed samples along the prediction direction. For instance, as shown in the example of FIG. 7, coordinates (x,y) of a sample 70 of a prediction block 72 are projected along a specific intra prediction direction 74. Suppose (x,y) is projected to the fractional position a between two neighboring reconstructed samples L and R. Then, a prediction value for (x, y) is calculated using a two-tap bi-linear interpolation filter, formulated as follows:

$$p_{xy}=(1-a) \cdot L+a \cdot R.$$

In HEVC, to avoid floating point operations, the above calculation is approximated using integer arithmetic as:

$$p_{xy}=((32-a) \cdot L+a \cdot R+16)>>5,$$

where a is an integer equal to 32*α.

Figure 8:
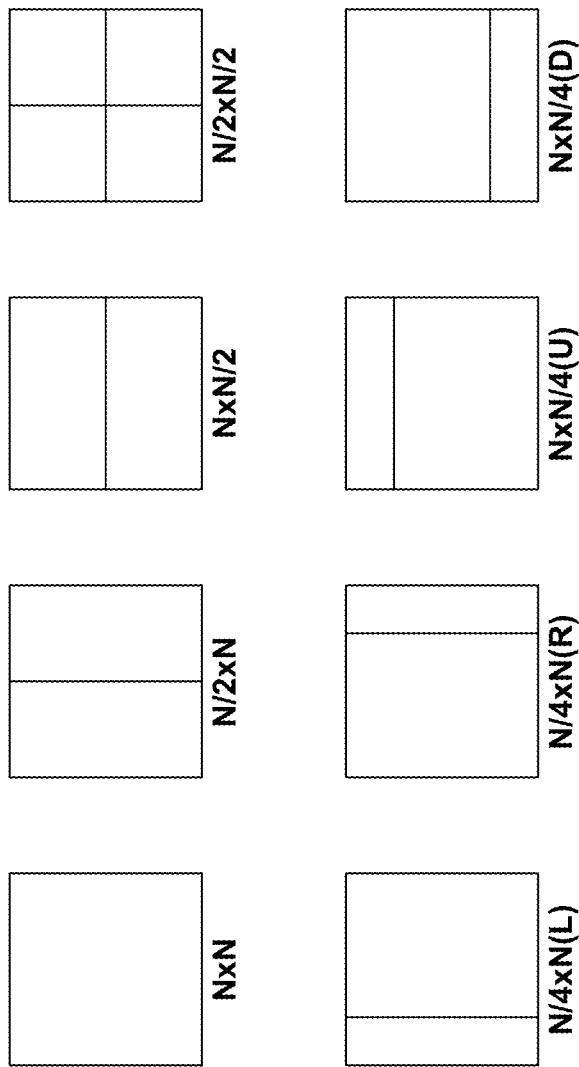
FIG. 8 is a conceptual diagram of partition modes for splitting a coding unit for inter prediction in HEVC.

FIG. 8 is a conceptual diagram of partition modes for splitting a CU for inter prediction in HEVC. As shown in FIG. 8, in HEVC, an inter-coded CU can be split into one, two, or four partitions and various types of this splitting are possible. The partitioning possibilities for inter-predicted coding blocks are depicted in FIG. 8. The upper four partition types illustrate the cases of not splitting the CU of size N×N, of splitting the CU into two partitions of size N×N/2 or N/2×N, and of splitting the CU into four partitions of size N/2×N/2, respectively. The lower four partition types in FIG. 8 are referred to as asymmetric motion partitioning (AMP). One partition of the AMP mode has the height or width N/4 and width or height N, respectively, and the other partition fills the rest of the CU by having a height or width of 3N/4 and width or height N. Each inter-coded partition is assigned one or two motion vectors and reference picture indices.

For intra slices, only intra prediction mode is allowed. Therefore, there is no need to signal the prediction mode. However, for inter slices (P or B slice), both intra and inter prediction mode are allowed. Thus, in HEVC, for each CU, one flag pred_mode_flag is signaled for non-skip mode. A partial listing of the syntax and semantics defined in HEVC for a CU are presented below:

7.3.8.5 Coding Unit Syntax

| | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA || log2CbSize = = MinCbLog2SizeY ) | |
|       part_mode | ae(v) |
| ... | |
| } | | cu_skip_flag[x0][y0] equal to 1 specifies that for the current coding unit, when decoding a P or B slice, no more syntax elements except the merging candidate index merge_idx[x0][y0] are parsed after cu_skip_flag[x0][y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture. When cu_skip_flag[x0][y0] is not present, cu_skip_flag[x0][y0] is inferred to be equal to 0.

pred_mode_flag equal to 0 specifies that the current coding unit is coded in inter prediction mode. pred_mode_flag equal to 1 specifies that the current coding unit is coded in intra prediction mode. The variable CuPredMode [x][y] is derived as follows for x=x0 . . . x0+nCbS−1 and y=y0 . . . y0+nCbS−1:

If pred_mode_flag is equal to 0, CuPredMode[x][y] is set equal to MODE_INTER.

Otherwise (pred_mode_flag is equal to 1), CuPredMode [x][y] is set equal to MODE_INTRA.

When pred_mode_flag is not present, the variable CuPredMode[x][y] is derived as follows for x=x0 . . . x0+nCbS−1 and y=y0 . . . y0+nCbS−1:

If slice type is equal to I, CuPredMode[x][y] is inferred to be equal to MODE_INTRA.

Otherwise (slice type is equal to P or B), when cu_skip_flag[x0][y0] is equal to 1, CuPredMode[x][y] is inferred to be equal to MODE_SKIP.

Various proposals have been made to enhance HEVC during and after the process of developing HEVC. For example, Jianle Chen et al., "Further improvements to HMKTA-1.0", Document: VCEG-AZ07_v2, 52$^{nd}$ Meeting: 19-26 June 2015, Warsaw, Poland, (hereinafter, "VCEG-AZ07"), describes a short distance intra coding scheme. Unlike traditional block partition methods which always produce square blocks for intra prediction, the short distance intra prediction (SDIP) scheme of VCEG-AZ07 employs non-square block splitting under the quadtree based block structure of HEVC. As described in VCEG-AZ07, a block is split into four non-square blocks with quarter width or height, and each non-square block is treated as a basic unit for prediction. The non-square blocks are coded and reconstructed in order, and can provide reference pixels for intra prediction for the next neighboring block. Therefore, the distance between reference pixels and local pixels can be reduced, and the precision of intra prediction can be much improved.

Figure 9:
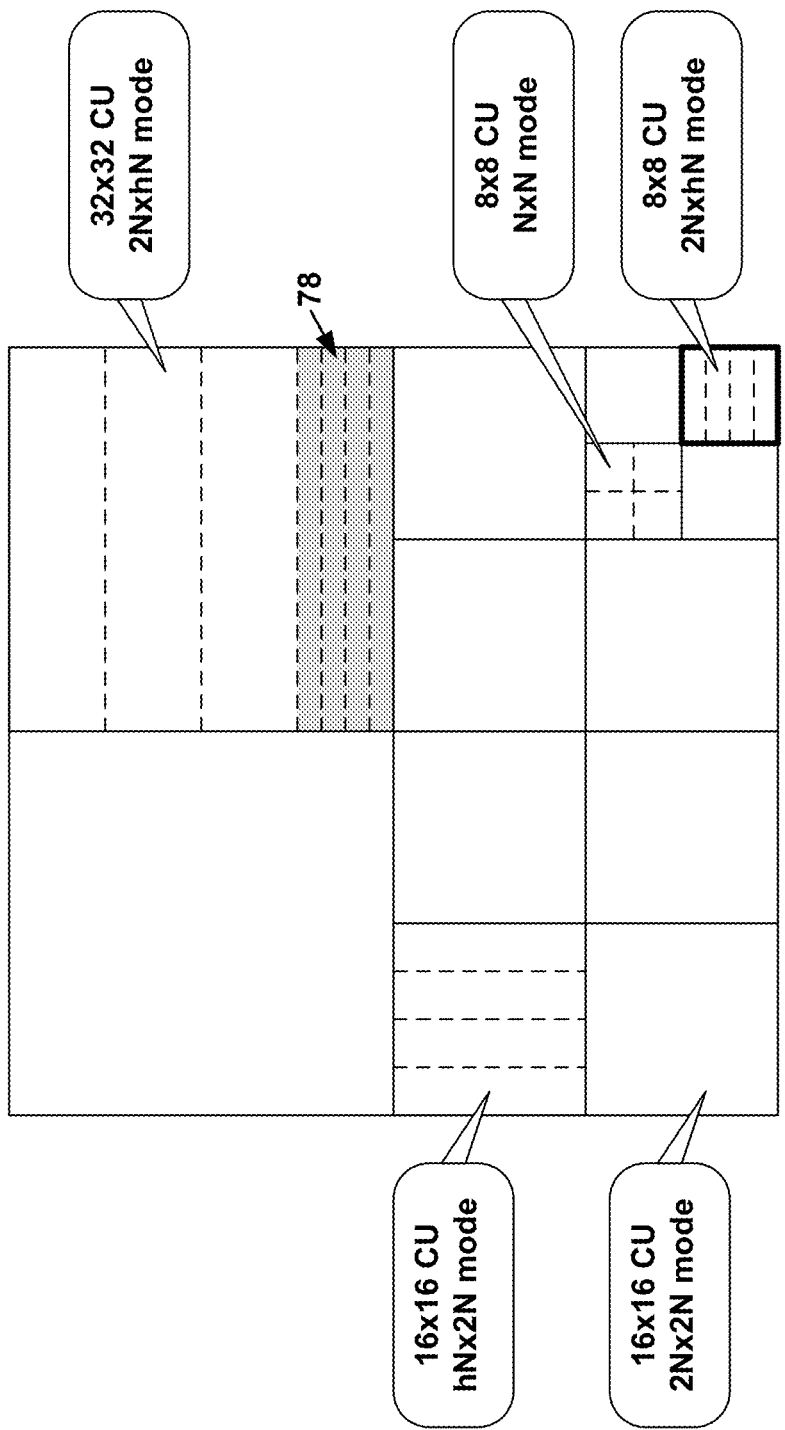
FIG. 9 is a conceptual diagram of short distance intra prediction (SDIP) unit partitions.

FIG. 9 is a conceptual diagram of SDIP unit partitions. In the SDIP scheme, a CU that is smaller than 64×64 can be split into four vertical or horizontal rectangular PUs with sizes N/2×2N or 2N×N/2 (these partition modes may be referred to in this disclosure as hN×2N and 2N×hN, where h means half). The four PUs are coded and reconstructed in order, from left to right in the hN×2N mode, and top to bottom in the 2N×hN mode. In FIG. 9, dotted lines represent PU/TU splitting, and the shaded region 78 denotes a 32×8 TU to be split into 4 32×2 TUs in the RQT structure. The upper right 32×32 CU with partition mode 2N×hN is split into four 32×8 PUs, the lower left 16×16 CU with mode hN×2N is split into four 4×16 PUs, the lower right 8×8 CU is split into 8×2 PUs, and so on. The square splitting of CUs in HEVC may also exist, such as the lower left 16×16 CU in the 2N×2N mode and the lower right 8×8 CU in the N×N mode.

Furthermore, in an SDIP scheme, a M×N (M>N) TU can be split into four TUs with size M×N/4, or M/4×N when M<N. In other words, a split in the SDIP scheme should always be carried out along the same direction (vertical or horizontal) in a CU. Table 2, below, lists all the non-square units existing in the SDIP scheme and the corresponding RQT depth.

TABLE 2

List of units in SDIP scheme and the corresponding RQT depth

| CU Size | Unit Size when depth = 1 (equal to PU size) | Unit Size when depth = 2 |
|---|---|---|
| 32 × 32 | 32 × 8 | 32 × 2 |
| | 8 × 32 | 2 × 32 |
| 16 × 16 | 16 × 4 | — |
| | 4 × 16 | — |
| 8 × 8 | 8 × 2 | — |
| | 2 × 8 | — |

In Xiaoran Cao et al "CE6.b1 Report on Short Distance Intra Prediction Method," Doc. JCTVC-E0278, Joint Collaborative Team on Video Coding (JCT-VC) of ITU-T SG16 WP3 and ISO/IEC JTC1/SC29/WG11, 5th Meeting: Geneva, 16-23 March, 2011 (hereinafter, "Cao 1"), partitions like 1×N and N×1 are further included and the corresponding RQT depth and transform sizes are listed in Table 3, below:

TABLE 3

List of transform sizes in SDIP in Cao 1

| CU Size | Unit Size when depth = 1 (equal to PU size) | Unit Size when depth = 2 |
|---|---|---|
| 32 × 32 | 32 × 8 | 32 × 2 |
| | 8 × 32 | 2 × 32 |
| 16 × 16 | 16 × 4 | 16 × 1 |
| | 4 × 16 | 1 × 16 |
| 8 × 8 (2N × 2N) | 8 × 2 | — |
| | 2 × 8 | — |
| 8 × 8 (N × N) | 4 × 4 | 4 × 1 |
| | | 1 × 4 |

Furthermore, some SDIP schemes use non-square transform and entropy coding. For example, an n×m transform is used for a non-square block. For an n×m (n>m) block, the forward transform is described as follows:

$$C_{n \times m} = T_m \cdot B_{n \times m} \cdot T_n^T \qquad (1).$$

Figure 10:
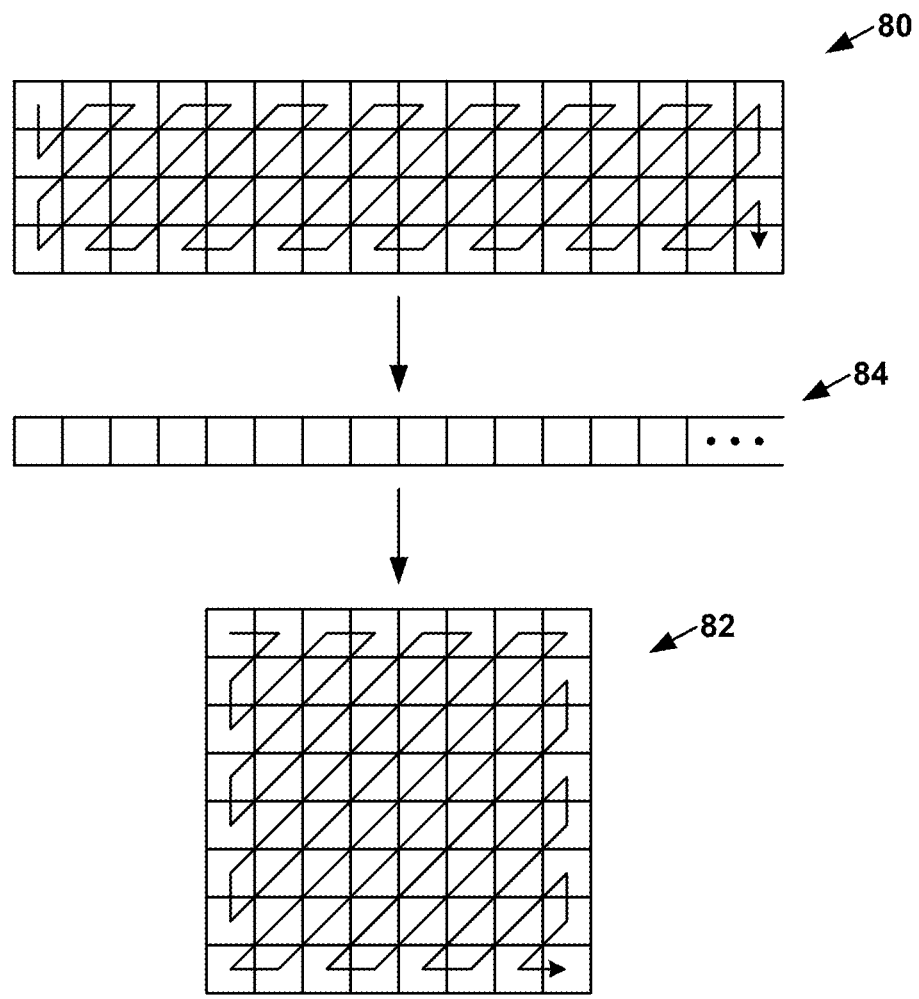
FIG. 10 is a conceptual diagram of a 16×4 coefficient matrix scanned and reorganized into an 8×8 matrix.

In the equation above, $B_{n \times m}$ denotes a block with n rows and m columns, $T_n$ and $T_m$ are the transform matrices of size n×n and m×m respectively, and $C_{n \times m}$ denotes the transformed block. $T_n$ and $T_m$ are the same as the transform matrices in HEVC. Thus, for a hardware implementation, the transform part can be reused for non-square blocks. For an n×m (n<m) block, the block is transposed into an m×n (m>n) block first and then transformed as in equation (1). For entropy coding, to avoid duplicate implementations, the coefficient coding of a square block is also reused. For example, FIG. 10 is a conceptual diagram of a 16×4 coefficient matrix 80 scanned and reorganized into an 8×8 matrix 82. In this example, the coefficients of coefficient matrix 80 are first scanned from high frequency to low frequency into a 1D buffer 84, as shown in FIG. 10, and then reorganized into an 8×8 matrix 82 in zigzag order, which is coded using the existing method in HEVC.

In another example of a proposed enhancement to HEVC, Liu et al., "Rectangular (2N×N, N×2N) Intra Prediction," Doc. JCTVC-G135, Joint Collaborative Team on Video Coding (JCT-VC) of ITU-T SG16 WP3 and ISO/IEC JTC1/SC29/WG11, 7th Meeting: Geneva, 21-30 Nov. 2011, (hereinafter, "JCTVC-G135"), describes extending the use of the 2N×N and N×2N partition sizes for inter coding to intra coding. The additional PU sizes and corresponding TUs are given in Table 2, below. In JCTVC-G135, the conventional transform quadtree structure is employed.

TABLE 2

List of transform sizes in JCTVC-G135

| CU Size | PU size | Unit Size when depth = 1 | Unit Size when depth = 2 |
|---|---|---|---|
| 32 × 32 | 32 × 16 | 32 × 8 | 32 × 2 |
|  | 16 × 32 | 8 × 32 | 2 × 32 |
| 16 × 16 | 16 × 8 | 16 × 4 | — |
|  | 8 × 16 | 4 × 6 | — |
| 8 × 8 | 8 × 4 | 8 × 2 | — |
|  | 4 × 8 | 2 × 8 | — |

Figure 11:
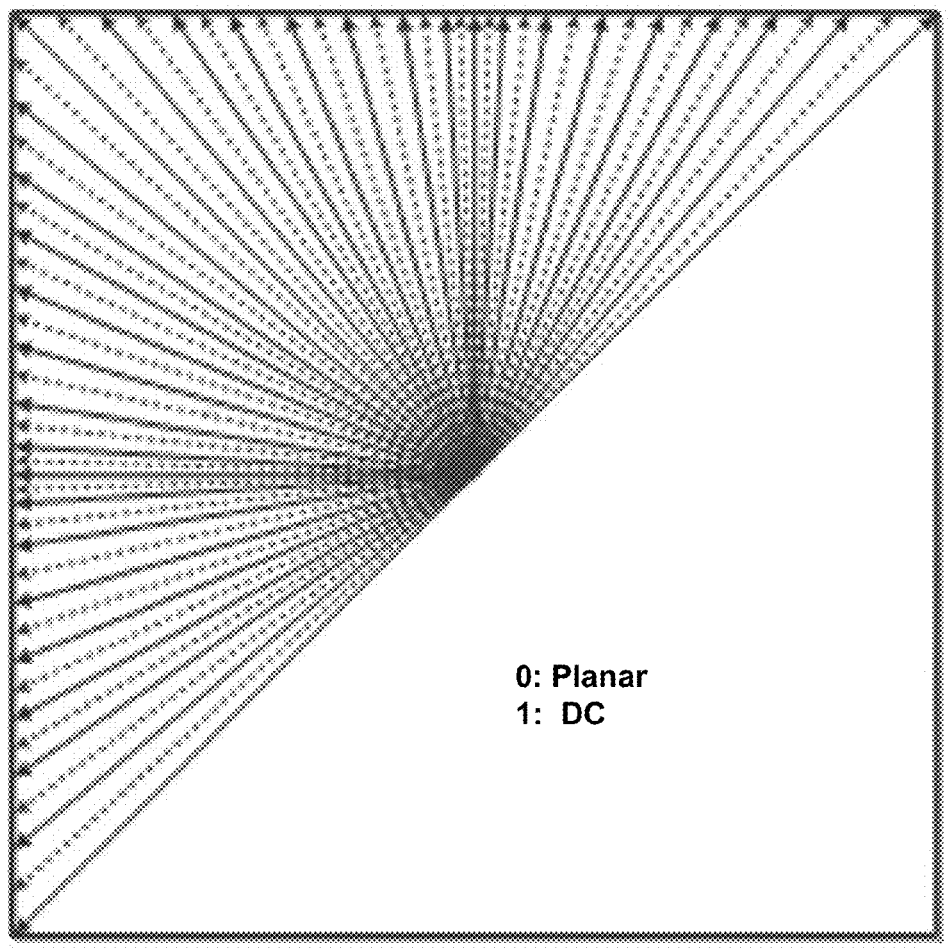
FIG. 11 is a conceptual diagram of 64 intra prediction modes.

The following techniques were described in VCEG-AZ07. To capture finer edge directions presented in natural videos, VCEG-AZ07 proposed extending the directional intra modes from 33, as defined in HEVC, to 65. FIG. 11 is a conceptual diagram illustrating proposed 67 intra prediction modes. The directional modes described in VCEG-AZ07 are indicated as dotted arrows in FIG. 11, and the Planar and DC modes remain the same. The denser directional intra prediction modes proposed in VCEG-AZ07 apply for all PU sizes and both luma and chroma intra predictions.

To accommodate the increased number of directional intra modes, VCEG-AZ07 proposed an improved Intra mode coding method, using 6 Most Probable Modes (MPMs). Two major technical aspects are involved: 1) the derivation of 6 MPMs, and 2) entropy coding of 6 MPMs. When deriving the set of 6 MPMs, VCEG-AZ06 changed the definition of the left and above neighboring intra modes. Instead of using the intra modes from top and left neighboring blocks directly as in HEVC, the most frequently used intra mode along the top neighboring row and along the left neighboring column are computed, and then used as the left and above neighboring modes, respectively.

Furthermore, as described in VCEG-AZ07, four-tap intra interpolation filters are utilized to improve the accuracy of directional intra prediction. For instance, as described above with respect to FIG. 7, HEVC uses a two-tap linear interpolation filter to generate an intra prediction block in the directional prediction modes (i.e., intra prediction modes excluding Planar and DC predictors). Particularly, in the example of FIG. 7, a video coder applies a two-tap filter to samples L and R to determine a predictive value for sample 50. In contrast to the approach of HEVC, which applies a filter to two reference samples to determine a predictive value for a sample of a prediction block, VCEG-AZ07 applies a filter to four reference samples to determine a predictive value for a sample of a prediction block. In VCEG-AZ07, two types of four-tap interpolation filters are used: Cubic interpolation filters for 4×4 and 8×8 blocks, and Gaussian interpolation filters for 16×16 and larger blocks. In VCEG-AZ07, the parameters of the filters are fixed according to block size, and the same filter is used for all predicted pixels, in all directional modes.

In HEVC, after an intra prediction block has been generated for vertical and horizontal intra modes, a left-most column and a top-most row of prediction samples (i.e., samples of a predictive block) are further adjusted, respectively. Boundary samples up to four columns or rows are further adjusted using a two-tap (for intra modes 2 and 34) or a three-tap filter (for intra modes 3-6 and 30-33).

Figure 12A:
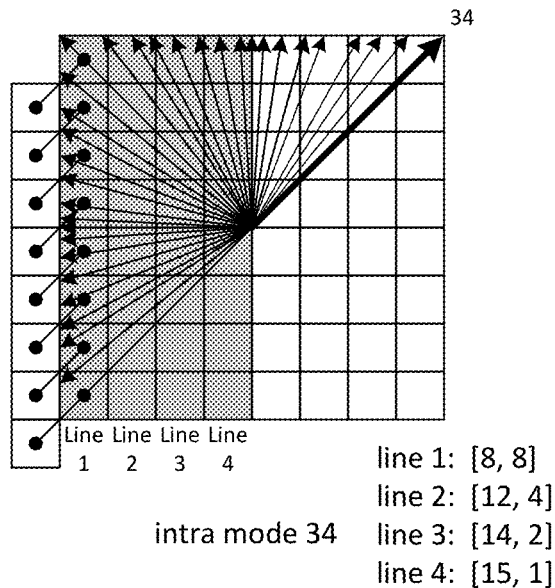
FIG. 12A is a conceptual diagram of boundary filters for intra mode 34.
Figure 12B:
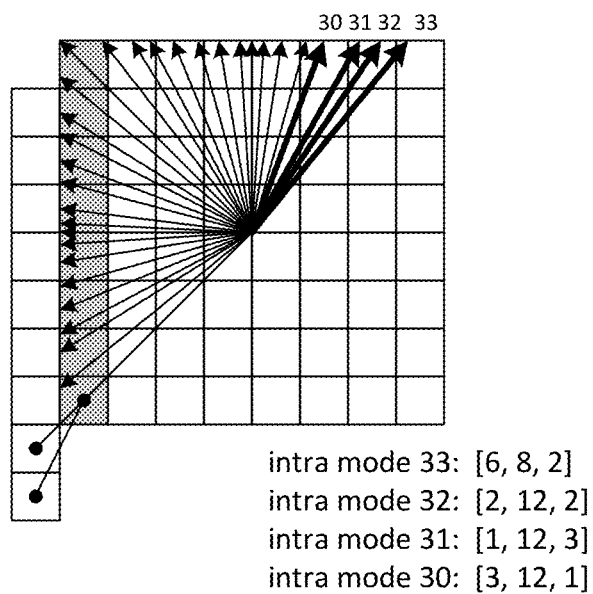
FIG. 12B is a conceptual diagram of boundary filters for intra mode 30-33.

FIG. 12A and FIG. 12B is a conceptual diagram of boundary filters for intra modes 30-34. Particularly, FIG. 12A is a conceptual diagram of boundary filters for intra mode 34. FIG. 12B is a conceptual diagram of boundary filters for intra mode 30-33. In FIG. 12A and FIG. 12B, the leftmost column of blocks is a set of reference samples and the rest of the blocks are samples of an intra predicted block. A video coder may generate the samples of the intra predictive block in the conventional manner. However, for intra prediction modes 30-34, the video encoder may apply one or more additional filters to the shaded pixels. Thus, examples of the boundary prediction filters for intra mode 34 and 30-33 are shown in FIG. 12A and FIG. 12B, and the boundary prediction filters for intra modes 2 and 3-6 are similar.

Particularly, in FIG. 12A, for intra mode 34, the video coder generates each respective sample of the intra predictive block based on reference samples above and right of the respective sample. However, this may ignore information available from the left reference samples. Accordingly, the video coder may apply four different filters to the four leftmost columns. For each respective sample in lines 1-4 of the intra predictive block, the video coder applies a filter based on the respective sample and a reference sample in the opposite direction of intra mode 34 (i.e., left and down). For line 1, the resulting sample may be calculated as $(8*a+8*b)/16$, where a is the respective sample and b is the reference sample. For line 2, the resulting sample may be calculated as $(12*a+4*b)/16$, where a is the respective sample and b is the reference sample. In the example of FIG. 12B, the directions for intra prediction modes 30-33 do not align with full integer position pixels. Rather, for each sample of the predictive block, the directions for intra prediction modes 30-33 intersect with the reference samples at fractional positions between two of the reference samples. Hence, when applying the boundary filter for intra prediction modes 30-33, there are two reference samples for each sample of the leftmost column of the predictive block. In the example of FIG. 12B, for each respective sample of the leftmost column of the predictive block, when the intra prediction mode is 33, a video coder may calculate the value of the respective sample as $(8*a+8*b+2*c)$, where a is the respective sample, b is one of the reference samples and c is the other of the reference samples.

Video coding may be performed based on color space and color format. For example, color video plays an essential role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used, as described in A. Ford and A. Roberts, "Colour space conversions," University of Westminster, London, Tech. Rep., August 1998.

YCbCr can be easily converted from RGB color space via a linear transformation and the redundancy between different components, namely the cross-component redundancy, is significantly reduced in the YCbCr color space. One advantage of YCbCr is the backward compatibility with black and white TV as Y signal conveys the luminance information. In addition, chrominance bandwidth can be reduced by sub-sampling the Cb and Cr components in 4:2:0 chroma sampling format with significantly less subjective impact than sub-sampling in RGB. Because of these advantages, YCbCr has been the major color space in video compression. There are also other color spaces, such as YCoCg, used in video compression. In this disclosure, regardless of the actual color space used, the YCbCr color space is used to represent the three color components in the video compression scheme.

Although the cross-complement redundancy is significantly reduced in the YCbCr color space, correlation between the three-color components still exists. Various techniques have been studied to improve video coding performance by further reducing the correlation between the three color components.

For example, Xiaoran Cao et al., "Short distance intra coding scheme for HIEVC", 2012 Picture Coding Symposium (PCS), pp. 501-504, May 7-9, 2012, Krakow, Poland, (hereinafter. "Cao 2") describes a short distance intra coding scheme. Cao 2 describes a method in 4:2:0 chroma video coding named Linear Model (LM) prediction mode, which was studied during development of the HEVC standard. See e.g., J. Chen et al., "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, 16-23 Mar. 2011, and referred as JCTVC-E266 hereafter. In 4:2:0 sampling, each of the two chroma arrays has half the height and half the width of the luma array. With the LM prediction mode, chroma samples are predicted based on reconstructed luma samples of the same block by using a linear model as follows:

$$\text{pred}_c(i,j) = \alpha^* \text{rec}_L(i,j) + \beta \tag{2}$$

where $\text{pred}_C(i, j)$ represents a prediction of chroma samples in a current block and $\text{rec}_L(i, j)$ represents a down-sampled reconstructed luma samples of the current block. Parameters $\alpha$ and $\beta$ are derived from causal reconstructed samples around the current block. Causal samples of a block are samples that occur prior to the block in a decoding order. If the chroma block size is denoted by N×N, then both i and j are within the range [0, N).

Parameters $\alpha$ and $\beta$ in equation (2) are derived by minimizing regression error between the neighboring reconstructed luma and chroma samples around the current block.

$$E(\alpha, \beta) = \sum_i (y_i - (\alpha \cdot x_i + \beta))^2 \tag{3}$$

The parameters $\alpha$ and $\beta$ are solved as follows $$\alpha = \frac{I \sum x_i \cdot y_i - \sum x_i \cdot \sum y_i}{I \sum x_i \cdot x_i - \sum x_i \cdot \sum x_i} \tag{4}$$

$$\beta = \left(\sum y_i - \alpha \cdot \sum x_i\right) / I \tag{5}$$

In the equations above, $x_i$ is a down-sampled reconstructed luma reference sample where the color format is not 4:4:4 (i.e., the color format is one in which one chroma sample corresponds to multiple luma samples), $y_i$ is reconstructed chroma reference samples without down-sampling, and I is the number of reference samples. In other words, the video coder may down-sample the reconstructed luma reference samples based on the color format not being 4:4:4, but refrain from down-sampling the reconstructed luma reference samples based on the color format being 4:4:4. For a target N×N chroma block, when both left and above causal samples are available, the total number of involved samples I is equal to 2N. When only left or above causal samples are available, the total number of involved samples I is equal to N. Here, N is always equal to $2^m$ (wherein m may be different for different CU sizes). Therefore, to reduce the complexity, shifting operations can be used to implement the division operations in equations (4) and (5).

Figure 13:
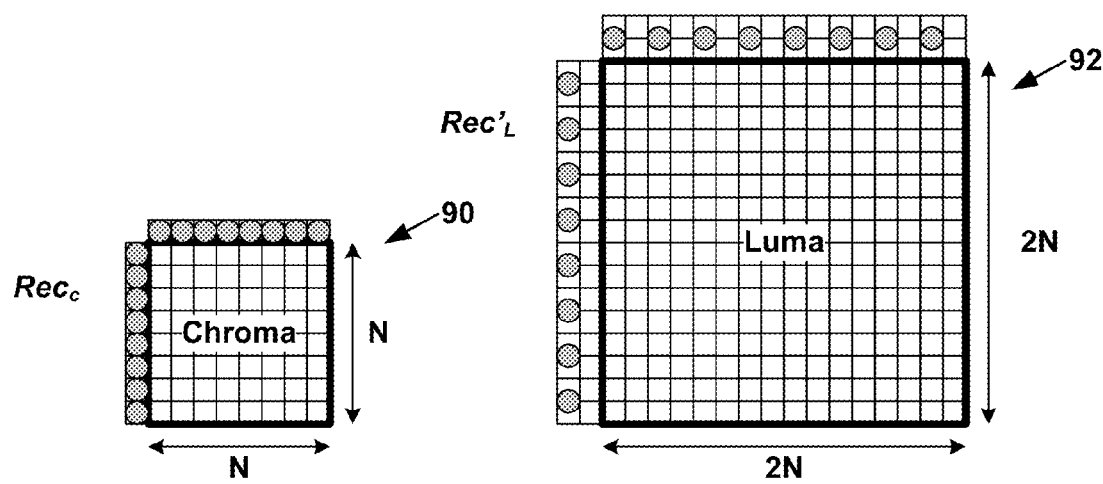
FIG. 13 is a conceptual diagram illustrating example locations of samples used for derivation of Linear Model (LM) parameters a and ft.

FIG. 13 is a conceptual diagram illustrating example locations of samples used for derivation of $\alpha$ and $\beta$. Particularly, FIG. 13 illustrates a chroma predictive block 90 of a PU and a luma predictive block 92 of the same PU. Because chroma samples are down-sampled relative to luma samples, the width and height of chroma predictive block 90 (i.e., N) is half the width and height of luma predictive block 92 (i.e., 2N). In the example of FIG. 13, the small squares outside the large dark square are reference samples. In the example of FIG. 13, the small circles indicate sample values used for determining the LM parameters $\alpha$ and $\beta$. As shown in the example of FIG. 13, the chroma sample values used for determining the LM parameters $\alpha$ and $\beta$ are the same as the reference samples for chroma predictive block 90. However, the luma sample values used for determining the LM parameters $\alpha$ and $\beta$ are interpolated from luma reference samples. The total number of the resulting set of luma samples used for determining the LM parameters $\alpha$ and $\beta$ is the same as the number of chroma samples used for determining the LM parameters $\alpha$ and $\beta$.

In general, when the LM prediction mode is applied for a current PU, a video coder may perform the following steps. First, the video coder may reconstruct a luma block for the current PU. As part of reconstructing the luma block for the current PU, the video coder may perform intra prediction to determine a luma predictive block of the current PU. Furthermore, as part of reconstructing the luma block for the current PU, the video coder may add residual data to the luma predictive block of the current PU to reconstruct the luma block for the current PU. Second, the video coder may down-sample reference luma samples that neighbor the top and left sides of the current PU. Third, the video coder may use equations (4) and (5) above to derive linear parameters (i.e., $\alpha$ and $\beta$) based on chroma reference samples that neighbor the top and left sides of the current PU and the down-sampled luma reference samples. This disclosure may also refer to the linear parameter as "scaling factors." Fourth, the video coder may down-sample the reconstructed luma block for the current PU. Fifth, the video coder may use equation (2) above to predict chroma samples (e.g., derive a predictive chroma block) from the down-sampled luma block for the current PU and the linear parameters.

As noted above, a video coder may down-sample a reconstructed luma block of a current PU. The video coder may down-sample the reconstructed luma block of the current PU in various ways. For example, since the typical sampling ratio of chroma components is half of that of luma components and has 0.5 sample phase difference in vertical direction in 4:2:0 sampling, reconstructed luma samples of the current PU are down-sampled in the vertical direction and sub-sampled in the horizontal direction to match the size and phase of the chroma signal. For instance, for each value i from 0 to the width of the predictive chroma block of the current PU minus 1 and each value j from 0 to the height of the predictive chroma block of the current PU minus 1, a video coder may calculate:

$$rec_L(i,j) = (Rec_{LOrig}[2i, 2j] + Rec_{LOrig}[2i, 2j+1]) >> 1 \quad (6)$$

In the equation above, $rec_L(i, j)$ is a luma sample corresponding to position (i,j) relative to a top-left corner of the down-sampled reconstructed luma block of the current PU. $Rec_{LOrig}[2i, 2j]$ and $Rec_{LOrig}[2i, 2j+1]$ are reconstructed luma samples at positions (2i, 2j) and (2i, 2j+1) relative to a top-left corner of the original reconstructed luma block of the current PU. Thus, in equation (6), a luma sample at position (i, j) of the down-sampled reconstructed luma block of the current PU is the mean of a luma sample at position (2i, 2j) of the original reconstructed luma block of the current PU and a luma sample at position (2i, 2j+1) of the original reconstructed luma block of the current PU.

Figure 14:
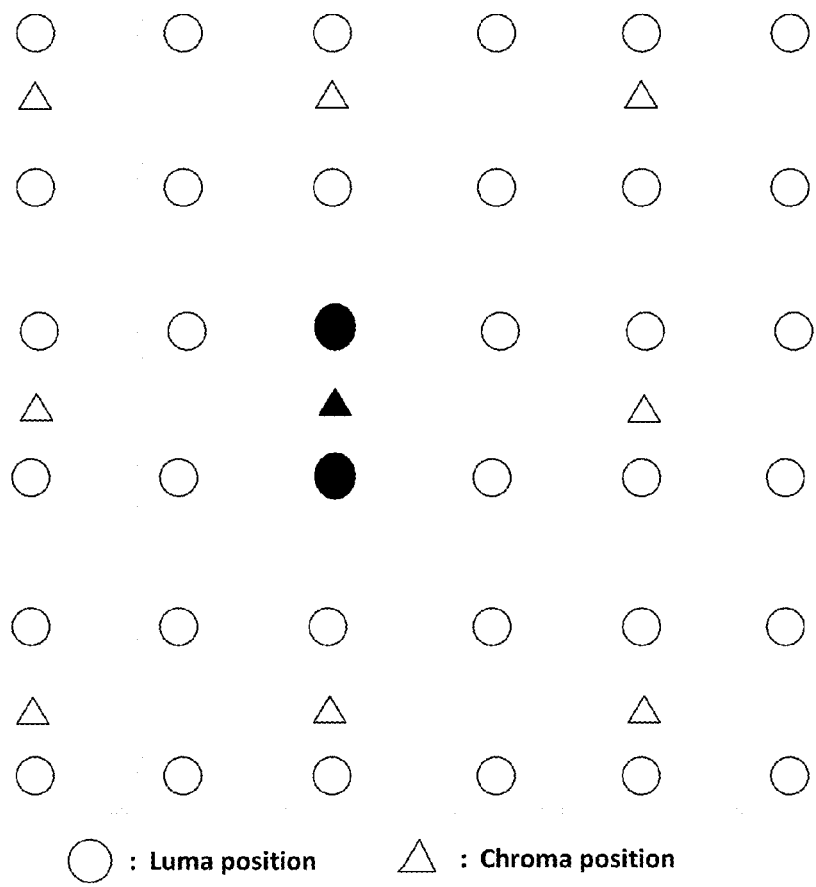
FIG. 14 is a conceptual diagram illustrating an example of luma positions and chroma positions for down-sampling samples of a reconstructed luma block of a current prediction unit (PU).

FIG. 14 is a conceptual diagram illustrating an example of luma positions and chroma positions for down-sampling samples of a reconstructed luma block of a current PU. FIG. 14 depicts chroma samples as triangles and luma samples as circles. A video coder predicts the value of a current chroma sample (represented in FIG. 14 by the filled-in triangle) from two luma samples (represented in FIG. 14 by the two filled-in circles), by applying a [1, 1] filter. The [1, 1] filter is one example of a 2-tap filter. In a [1, 1] filter the two taps are equally weighted. For each respective triangle in FIG. 14, a video coder may apply equation (6) to samples represented by the circles above and below the respective triangle to determine a respective luma value for the sample represented by respective triangle.

Furthermore, as noted above, a video coder may down-sample luma reference samples. The video coder may down-sample the luma reference samples in various ways. As shown in FIG. 14, the columns of a predictive chroma block of a current PU are aligned with columns of the predictive luma block of the current PU. In one example using the 4:2:0 color format, the down-sampled luma reference samples that neighbor a top side of the current luma block may consist of each luma reference sample at an even indexed position in the set of luma reference samples. Thus, for each respective value of i ranging from 0 to the width of the predictive chroma block of the current PU minus 1, the down-sampling process may be defined as:

$$rec_L(i,-1) = Rec_{LOrig}[2i,-1] \quad (7)$$

In the equation above, $rec_L(i, -1)$ is a down-sampled luma reference sample at position (i, -1) relative to a top-left corner of the chroma predictive block of the current PU. $Rec_{LOrig}[2i, -1]$ is a luma reference sample at position (2i, -1) relative to a top-left corner of the original predictive luma block of the current PU.

As shown in FIG. 14, the rows of a predictive chroma block of a current PU are not aligned with rows of a predictive luma block of the current PU in the 4:2:0 color format. However, equations (4) and (5) for calculating the parameters α and β for LM-based prediction are predicated on there being one luma reference sample for each chroma reference sample. Accordingly, for a respective row of the predictive chroma block for the current PU, the video coder may calculate an average of the luma reference sample in a row of the predictive luma block of the current PU above and the luma reference sample in a row of the predictive luma block of the current PU below the row of the predictive chroma block. For instance, for each value j ranging from 0 to the number of rows in the predictive chroma block minus 1, the video coder may calculate the value of a left-neighboring luma reference sample as:

$$rec_L(-1,j) = (Rec_{LOrig}[-2, 2j] + Rec_{LOrig}[-2, 2j+1]) >> 1 \quad (8)$$

In the equation above, $rec_L(-1,j)$ is a down-sampled luma reference sample at position (-1, j) relative to a top-left corner of the predictive chroma block of the current PU. $Rec_{LOrig}[-2, 2j]$ and $Rec_{LOrig}[-2, 2j+1]$ are original luma samples at positions (-2, 2j) and (-2, 2j+1) relative to a top-left corner of the original predictive luma block of the current PU.

Other down-sampling techniques have also been proposed. For instance, in Yi-Jen Chiu et al., "Cross-channel techniques to improve intra chroma prediction", Joint Collaborative Team on Video Coding (JCT-VC) of ITU-T SG16 WP3 and ISO/IEC JTC1/SC29/WG11, JCTVC-F502, 6th Meeting: Torino, IT, 14-22 Jul. 2011 (referred to herein as "JCTVC-F502"), instead of using a two-tap filter, a video coder applies 2-dimensional 6-tap filtering to both a current luma block and a neighboring luma block. The 2-dimensional filter coefficient set is:

$$\begin{bmatrix} 1 & 2 & 1 \\ 1 & 2 & 1 \end{bmatrix} / 8 \quad (9)$$

The down-sampled luma samples are derived by equation (10):

$$rec_L(i, j) = (Rec_{LOrig}[2i, 2j] * 2 + Rec_{LOrig}[2i, 2j+1] + \quad (10)$$
$$Rec_{LOrig}[2i, 2j-1] + Rec_{LOrig}[2i+1, 2j] * 2 +$$
$$Rec_{LOrig}[2i+1, 2j+1] + Rec_{LOrig}[2i+1, 2j-1]) >> 3$$

In the equation above, $rec_L(i,j)$ is a reconstructed luma sample at position (i,j) relative to a top-left corner of the down-sampled reconstructed luma block of the current PU and $Rec_{LOrig}[\ldots]$ are reconstructed luma samples of the original reconstructed luma block of the current PU at positions relative to a top-left corner of the original reconstructed luma block of the current PU.

For instance, a video coder may perform the operations of equation (10) to determine the down-sampled luma block. Equation (10) includes a built in 6-tap filter, as represented by [1, 2, 1; 1, 2, 1] with $Rec_{LOrig}[2i, 2j]$, $Rec_{LOrig}[2i, 2j+1]$, $Rec_{LOrig}[2i, 2j-1]$, $Rec_{LOrig}[2i+1, 2j]$, $Rec_{LOrig}[2i-1, 2j-1]$, and $Rec_{LOrig}[2i+1, 2j-1]$ as 6 input samples. A tap number of a filter indicates how many input samples are used for applying the filter. For instance, in equation (10), the video coder uses six values from the reconstructed luma block to generate the down-sampled luma block.

Figure 15:
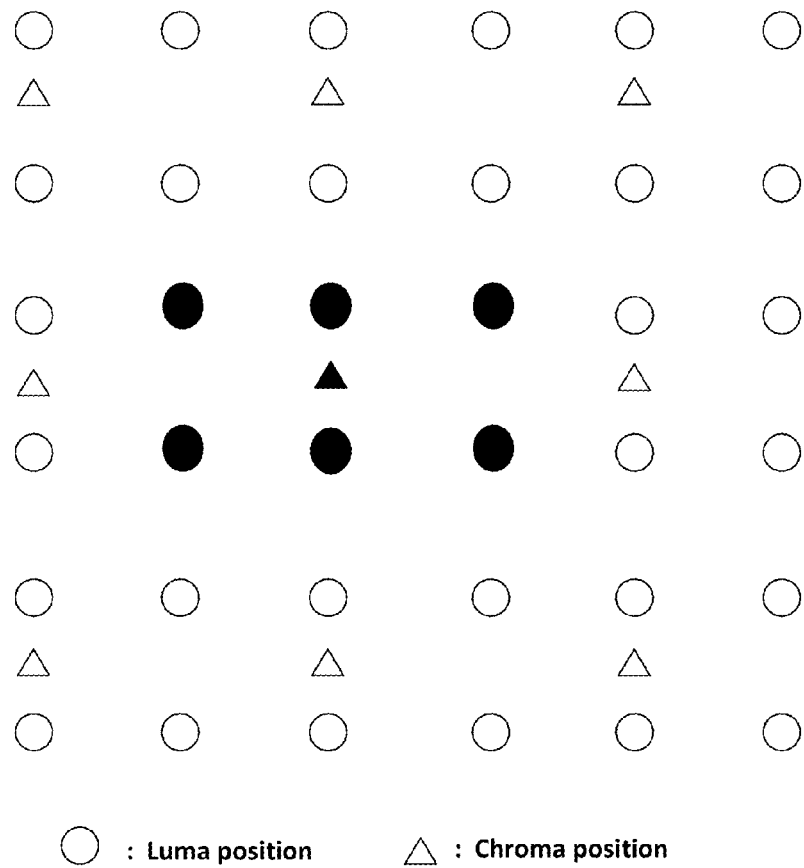
FIG. 15 is a conceptual diagram illustrating an example of luma positions and chroma positions for down-sampling samples of a luma block for generating a predictive block.

FIG. 15 is a conceptual diagram illustrating an example of luma positions and chroma positions for down-sampling samples of a luma block for generating a predictive block. As depicted in FIG. 15, a video coder predicts a chroma sample, represented by the filled-in triangle, from six luma samples, represented by the six filled-in circles, by applying a 6-tap filter. Since a predictor of a chroma sample is derived using a linear function, as defined in equation (2), it could be seen that when the 6-tap filter is applied, the predictor of one chroma sample relies on the six neighboring luma samples. When combining equations (2) and (10), the result is the following equation (11):

$$pred_C(i, j) = \alpha \cdot (Rec_{LOrig}[2i, 2j]*2 + Rec_{LOrig}[2i, 2j+1] + \qquad (11)$$
$$Rec_{LOrig}[2i, 2j-1] + Rec_{LOrig}[2i+1, 2j]*2 + Rec_{LOrig}[$$
$$2i+1, 2j+1] + Rec_{LOrig}[2i+1, 2j-1]) >> 3) + \beta$$

The following text refers to the down-sampled reconstructed luma sample $rec_L(i, j)$ as the corresponding down-sampled luma sample for the chroma sample located at (i, j). For example, because of 4:2:0 sampling, a 2N×2N luma block corresponds to an N×N chroma block. With down-sampling, the 2N×2N luma blocks becomes an N×N down-sampled luma block. This N×N down-sampled luma block is referred to as $rec_L(i, j)$ and corresponds to the N×N chroma block.

Furthermore, although the above examples are described with respect to 4:2:0 sampling, the techniques described in this disclosure are not so limited. For instance, the techniques described in this disclosure may also be applicable to 4:2:2 sampling. Accordingly, the examples with respect to 4:2:0 are provided merely to assist with understanding.

Furthermore, in some examples, the techniques described in this disclosure may be applicable to 4:4:4 sampling as well. For example, in 4:4:4 sampling, the chroma block is not sub-sampled relative to the luma block. However, it may be possible to determine a predictive block for the chroma block in such examples as well. For example, the luma block may be filtered and the filtered block may be used as a predictive block for the chroma block. In these examples, down-sampling of the luma block may not be needed. As explained in more detail, the example techniques describe selection of a filter applied to samples of the luma block based on a location of the chroma block. The techniques for selecting a filter applied to samples of the luma block may be extended to examples where down-sampling is not needed for LM prediction, such as for 4:4:4 sampling. In such examples, the filter may not include any down-sampling so that the 4:4:4 sampling is preserved. Accordingly, the description for 4:2:0 sampling is an example, and the techniques are applicable to 4:4:4 sampling as well.

For example, rather than being limited to using only a two-tap filter or a six-tap filter to down-sample the luma block, a video coder (e.g., video encoder 20 or video decoder 30) may determine a filter from a set of filters that is used for down-sampling the luma block. As an example, there may be a number X of different filters that the video coder can use for down-sampling. For instance, there may be a one-tap filter, a two-tap filter, a three-tap filter, and so forth. Moreover, for each filter the specific taps might be different (e.g., the luma samples used for a first two-tap filter are different than the luma samples used for a second two-tap filter). In some of the examples described in this disclosure, the set of filters includes two filters; however, more than two filters from which the video coder determines which filter to apply for down-sampling the luma block are possible.

The video coder may use various criteria to determine which filter to apply. As one example, the video coder determines which filter from the set of filters to apply based on a location of the chroma block. If the chroma block borders a left boundary of the picture, CU, PU, or TU (e.g., the left boundary of the picture, CU, PU, or TU is the same as chroma block edge), the video coder may use a first filter for down-sampling luma samples of the luma block that correspond to the chroma samples of the chroma block that are on the left boundary. Samples of the chroma block that are on the left boundary refer to the samples of the chroma block that are closest to the left boundary including samples that are directly on the boundary. The first filter may be applied to the N samples closest to the boundary (e.g., sample closest to the boundary, one next to that sample, and N such samples).

In some cases, the video coder may apply the first filter for all luma samples of the luma block, rather than just those samples that correspond to chroma samples that neighbor the left boundary. However, the techniques described in this disclosure are not so limited. For all other cases, the video coder may use a second, different filter for down-sampling the luma block.

For instance, in 4:2:0 sampling, four luma samples correspond to one chroma sample. Accordingly, the video coder may determine which chroma sample corresponds to which luma samples. When filters with larger tap numbers are used, one chroma sample may correspond to more than four luma samples. For the luma samples that correspond to a chroma sample on a left boundary (immediately adjacent or within a number of samples), the video coder may apply a first filter to the corresponding luma samples to down-sample the luma block, and for the luma samples that correspond to a chroma sample that is not on a left boundary (not immediately adjacent or not within a number of samples), the video coder may apply a second filter to corresponding luma samples to down-sample the luma block.

In some examples, the first filter may include fewer taps (e.g., number of samples that the filter extends over) than the second filter. As one example, the first filter is the two-tap filter and the second filter is the six-tap filter. In this example, the video coder may perform the operations of equation (6) to determine the down-sampled luma samples of a luma block in the case that the corresponding chroma samples of the chroma block are on the left boundary, and may perform the operations of equation (10) to determine the down-sampled luma samples of the luma block in the case that the corresponding chroma samples of the chroma block are not on the left boundary. Accordingly, during the derivation process of corresponding down-sampled luma samples of chroma samples, the video coder may apply a different filter to the luma samples of a luma block that correspond to chroma samples of a chroma block located at the left picture boundary, or left boundary (i.e., side) of CU/PU/TU, compared to the filter applied to other samples of the luma block that correspond to chroma samples that are not at the left picture boundary or left boundary of CU, PU, or TU. Chroma samples that are at the left boundary refer to chroma samples immediately adjacent to the left boundary or within a certain number of samples from the left boundary.

Using different filters allows the video coder to properly use available sample values. For instance, using a six-tap filter for luma samples that correspond to chroma samples at the left boundary of picture, CU, PU, or TU may result in requiring the video coder to use luma sample values that are not part of the luma block for down-sampling and may result in the video coder having to perform some additional processing to address the lack of luma samples (e.g., padding luma sample values to generate values for samples that are not part of a luma block). However, using a two-tap filter at the left boundary may not require the video coder to use luma sample values that are not part of the luma block for down-sampling. Accordingly, although two-tap and six-tap filters are described, other sized filters for down-sampling may be possible with consideration to avoid needing to require luma samples that are not part of the luma block (e.g., to avoid the need to pad luma samples on the left boundary).

As one example, during the derivation process of corresponding down-sampled luma samples of chroma samples, the video coder applies a different filter to luma samples that correspond to chroma samples located at the left picture boundary compared to the filter applied to other luma samples that correspond to chroma samples not located at the left picture boundary. In one example, the length (e.g., tap) of the filter (i.e., the number of samples that the filter extends over) for deriving the corresponding down-sampled luma samples of chroma samples at the left picture boundary is smaller than the length of the filter for deriving the corresponding down-sampled luma samples of chroma samples not at the left picture boundary (e.g., two-tap for the left boundary and six-tap for all others).

As one example, during the derivation process of corresponding down-sampled luma samples of chroma samples, the video coder applies a different filter for luma samples of chroma samples located at the left CU boundary compared to the filter applied to other luma samples within current CU. In one example, the length (e.g., taps) of the filter (i.e., number of samples that the filter extends over) for deriving the corresponding down-sampled luma samples of chroma samples at the left CU boundary is smaller than the length of the filter for deriving the corresponding down-sampled luma samples of chroma samples not at the left CU boundary (e.g., two-tap for the left boundary and six-tap for all others).

As one example, during the derivation process of corresponding down-sampled luma samples of chroma samples, the video coder applies a different filter for chroma samples located at the left PU boundary compared to the filter applied to other samples within current PU. In one example, the length (e.g., taps) of the filter (i.e., the number of samples that the filter extends over) for deriving the corresponding down-sampled luma samples of chroma samples at the left PU boundary is smaller than the length of the filter for deriving the corresponding down-sampled luma samples of chroma samples not at the left PU boundary (e.g., two-tap for the left boundary and six-tap for all others).

As one example, during the derivation process of corresponding down-sampled luma samples of chroma samples, the video coder may apply a different filter for chroma samples located at the left TU boundary compared to the filter applied to other samples within current TU. In one example, the length (e.g., taps) of the filter (i.e., the number of samples that the filter extends over) for deriving the corresponding down-sampled luma samples of chroma samples at the left TU boundary is smaller than the length of the filter for deriving the corresponding down-sampled luma samples of chroma samples not at the left TU boundary (e.g., two-tap for the left boundary and six-tap for all others).

In some cases, there may not be corresponding luma samples in the same picture. The following describes some example techniques to address such situations. For instance, although avoiding padding may be beneficial in some cases, in some instances, it may not be possible to avoid padding. For example, because some luma samples are unavailable (e.g., because off picture), the video coder may substitute padding sample values for these unavailable samples and perform down-sampling with these padding sample values (e.g., down-sample using the actual luma sample values for the available luma samples and padding sample values for the unavailable luma samples). The padding sample values may be default values (e.g., $2^{bitdepth}$ wherein bitdepth indicates the bit depth of luma component), values determined by video encoder 20 and signaled to video decoder 30, or values determined based on some implicit technique that does not require signaling of information. Adding padding sample values may reduce complexity because there may not be a need for separate filters.

During the derivation process of corresponding down-sampled luma samples of chroma samples, when the luma samples are outside of a picture, or a CU/PU/TU needs to be involved in the down-sampling process, the video coder may first apply a padding operation, followed by a down-sampling process. In the padding of samples, the video coder may substitute those samples that are off screen with padding sample values.

As one example, during the derivation process of corresponding down-sampled luma samples of chroma samples, the video coder may pad the luma samples (e.g., only the luma samples) which are located outside of the current picture. For all other positions, the reconstructed samples are used. As one example, during the derivation process of corresponding down-sampled luma samples of chroma samples, the video coder may pad the luma samples which are located outside of the current CU. For all other positions, the reconstructed samples are used. As one example, during the derivation process of corresponding down-sampled luma samples of chroma samples, the video coder may pad the luma samples which are located outside of the current PU. For all other positions, the reconstructed samples are used. As one example, during the derivation process of corresponding down-sampled luma samples of chroma samples, the video coder may pad the luma samples which are located outside of the current TU. For all other positions, the reconstructed samples are used. In above examples for padding, the same down-sampling process is applied to all positions.

When the position of luma reconstructed samples used in LM prediction mode is located outside the current slice or current tile, the video coder may mark such samples as unavailable (e.g., the video coder may determine such samples as unavailable). When the sample is marked as unavailable, the video coder may perform one or more of the following.

The unavailable samples, if used in a down-sampling process for a neighboring luma block, are not used in the down-sampling process for a neighboring luma block. Alternatively or additionally, the filter may be different from the filter used for other samples. The unavailable samples, if used in a down-sampling process for a current luma block, are not used in the down-sampling process for a current luma block. Alternatively or additionally, the filter may be different from the filter used for other samples. The unavailable samples are re-marked as available; however, the sample value is modified to be the padded sample value or a default value. Alternatively or additionally, the filter is kept the same as the filter used for other samples. In one example, the default value is dependent on the bit-depth. In another example, the padding could be from the left/right/above/below sample which is marked as available.

In general, for luma samples that are in another tile, the video coder may mark pixels outside the tile boundary as unavailable and not include them in the down-sampling process. In some examples, the video coder may mark the luma samples in another tile as available but use padded pixels for such luma samples in another tile. As another example, the video coder may use padded "extended" values (e.g., one half possible value based on bit depth, so 8 bit, use 128) for luma samples in another tile, rather than marking the samples as unavailable.

In some examples, the video coder may apply different filters to different chroma color components (Cb or Cr). In some examples, when LM prediction mode is enabled, one or more sets of the down-sampling filter may be further signaled in either a sequence parameter set (SPS), picture parameter set (PPS), or slice header. Alternatively or additionally, a Supplemental Enhancement Information (SEI) message syntax is introduced to describe the down-sampling filter. Alternatively or additionally, furthermore, a default down-sampling filter is defined, e.g., the 6-tap filter [1, 2, 1; 1, 2, 1] without signaling. Alternative or additionally, one PU/CU/largest CU may signal an index of the filter that is used in LM prediction mode. Alternatively or additionally, the usage of the filter tap may be derived on-the-fly by video decoder 30 without signaling. There may be other ways to provide filter support as well.

In one example, furthermore, a constraint is applied that $\alpha_i$ is equal to $\alpha_{(i+3)}$. In one example, furthermore, a constraint is applied that $\alpha_i$ is equal to $\alpha_{(i+2)}$ with i being equal to 0 or 3. In one example, this example technique may only be enabled for larger coded CUs, e.g., CU size larger than 16×16. In one example, one or more of the parameters is restricted to be 0.

Moreover, the video coder may apply one or more of the above techniques also for cross component residual prediction, in which the down-sampled luma residual is used to predict the chroma residual. In this case, the down-sampling process is applied to reconstructed luma residual, as one example.

The following is an example manner in which techniques described in this disclosure may be implemented by a video coder. The example implementation technique should not be considered limiting.

Below is an example for applying different down-sampling processes for samples at the left picture boundary. The down-sampling process for a current luma block is defined as follows:

if the chroma sample is not located at the left boundary of picture, 6-tap filter, e.g. [1 2 1; 1 2 1] is applied to derive the corresponding down-sampled luma sample:

$$rec_L(i, j) = \\ (Rec_{LOrig}[2i, 2j] * 2 + Rec_{LOrig}[2i, 2j+1] + Rec_{LOrig}[2i, 2j-1] + \\ Rec_{LOrig}[2i+1, 2j] * 2 + Rec_{LOrig}[2i+1, 2j+1] + \\ Rec_{LOrig}[2i+1, 2j-1] + offset\ 0) >> 3 \quad (13)$$

Otherwise, if the chroma sample is located at the left boundary of the picture, 2-tap filter, e.g., [1; 1] is applied to derive the corresponding down-sampled luma sample:

$$rec_L(i,j)=(Rec_{LOrig}[2i,2j]+Rec_{LOrig}[2i,2j+1]+ \\ offset1)>>1 \quad (14)$$

In one example, offset0 and offset1 are both set equal to 0. In another example, offset0 is set equal to 4 and offset1 is set equal to 1.

Figure 16:
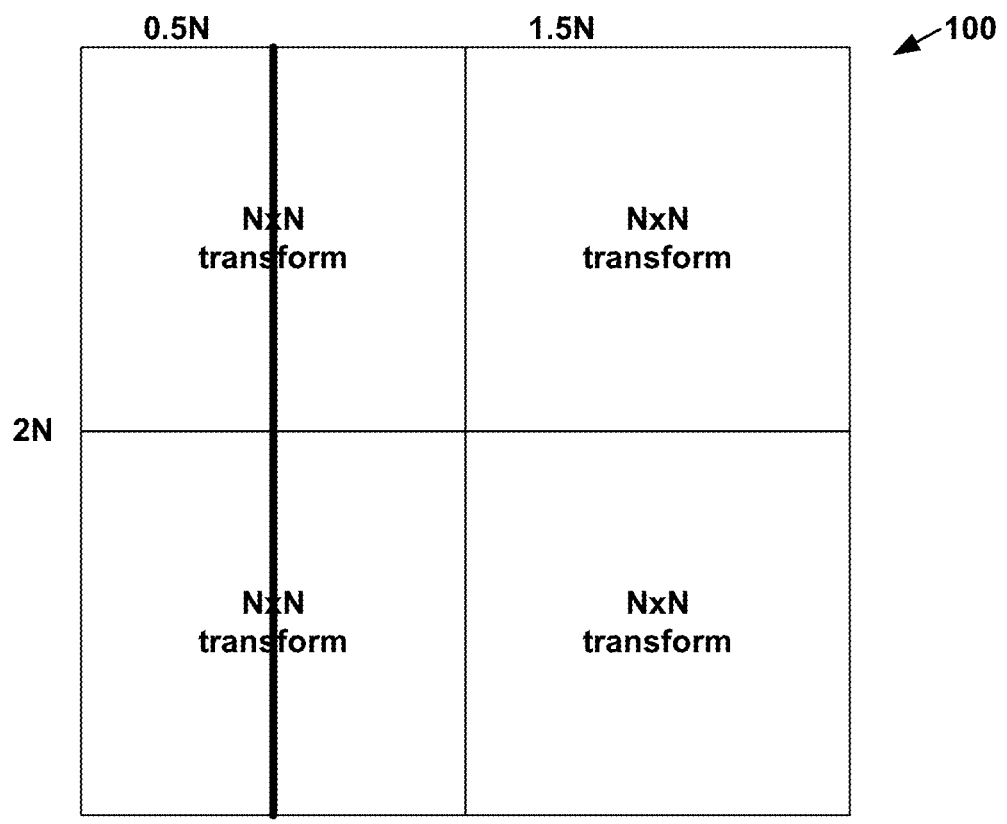
FIG. 16 is a conceptual diagram illustrating an nR×2N prediction mode with an N×N transform.

In HEVC, a square transform is always applied, even for rectangular PUs. For example, FIG. 16 is a conceptual diagram illustrating nR×2N prediction mode with N×N transform. In the example of FIG. 16, the nR×2N prediction mode partitions a coding block 100 with a 2N×2N block size into two prediction blocks with sizes of 0.5N×2N and 1.5N×2N, respectively. However, in the example of FIG. 16, the transform block size is N×N.

Figure 17:
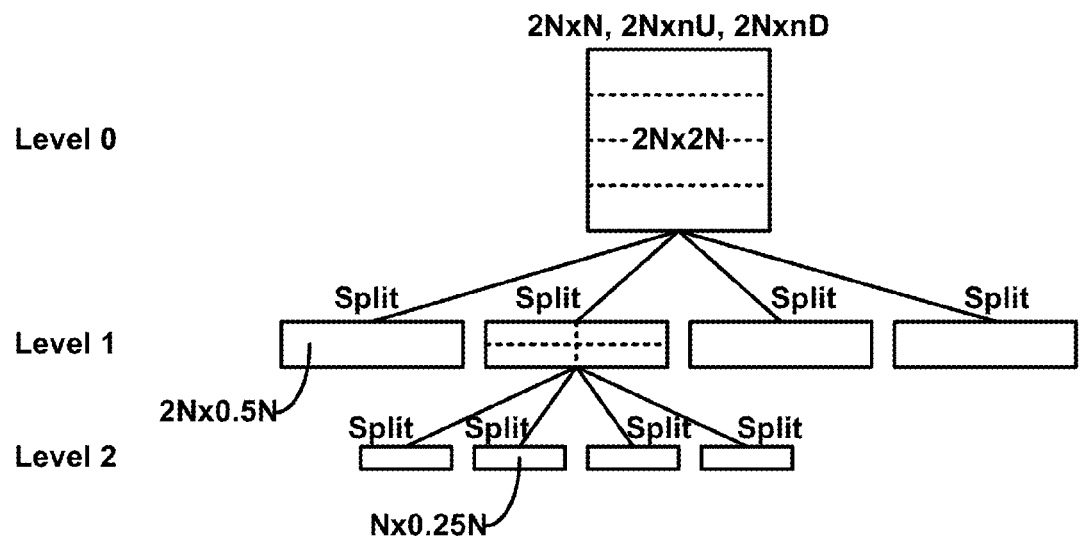
FIG. 17 is a conceptual diagram illustrating a non-square quadtree (NSQT) for 2N×N, 2N×nD, and 2N×nU prediction modes.
Figure 18:
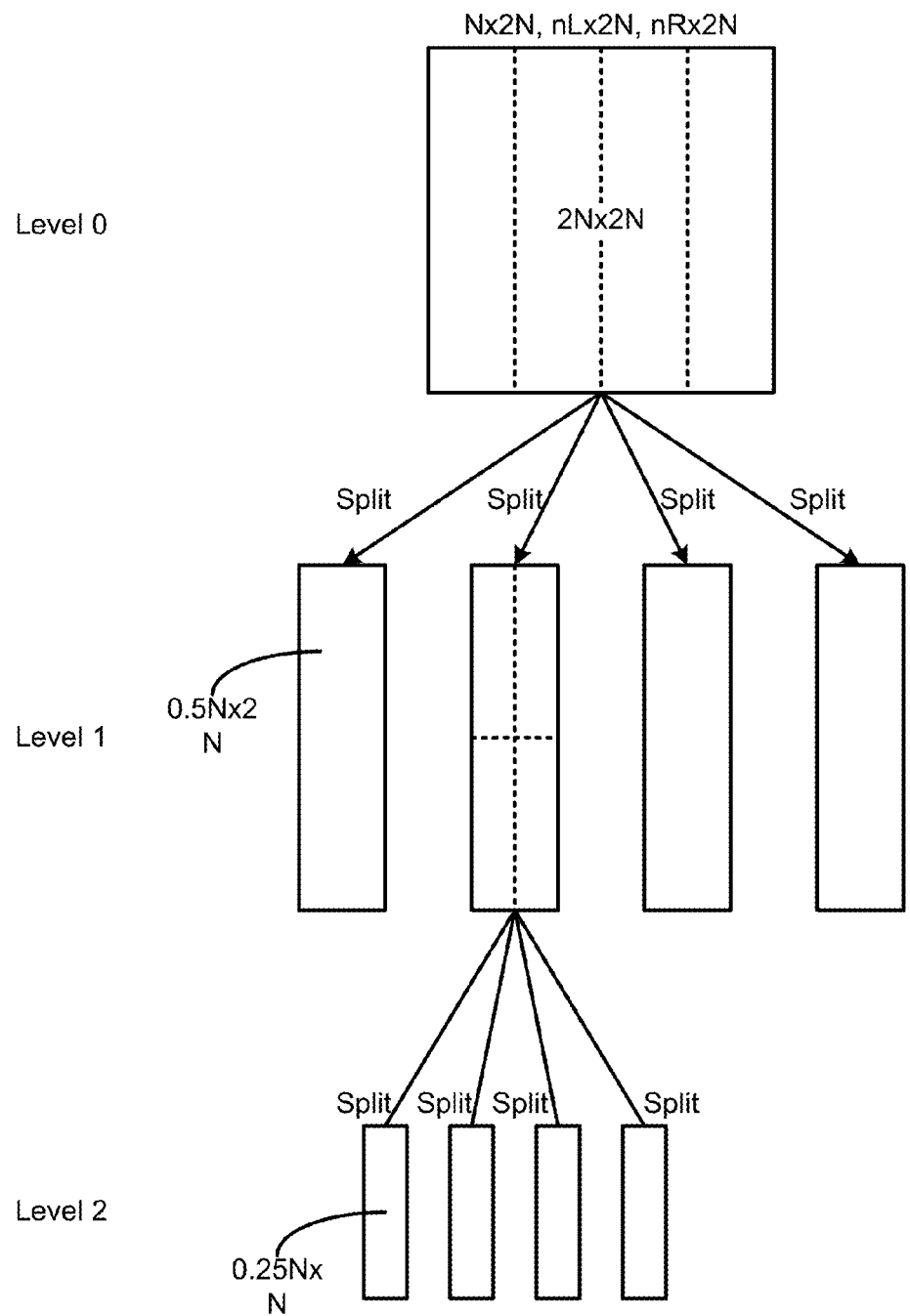
FIG. 18 is a conceptual diagram illustrating a NSQT for N×2N, nR×2N, and nL×2N prediction modes.

FIG. 17 is a conceptual diagram illustrating a non-square quadtree (NSQT) for 2N×N, 2N×nD and 2N×nU prediction modes. In FIG. 17, a 2N×2N block at level 0 is split into four 2N×0.5N blocks located at level 1; the block at level 1 is further split into four N×0.25N blocks locate at level 2. FIG. 18 is a conceptual diagram illustrating a NSQT for N×2N, nR×2N and nL×2N prediction modes. In FIG. 18, a 2N×2N block at level 0 is split into four 0.5N×2N blocks located at level 1; the block at level 1 is further split into four 0.25N×N blocks locate at level 2.

Considering that residuals might be discontinuous at the boundaries of two connective prediction blocks, high frequency transform coefficients will likely be produced and the coding performance will be affected. In this disclosure, connective predictive blocks are predictive blocks that share at least one of the four boundaries. Therefore, in Yuan et al., "Non-Square Quadtree Transform Structure for HEVC," 2012 Picture Coding Symposium (PCS), pp. 505-508, May 7-9, 2012, Krakow, Poland (hereinafter, "Yuan"), a non-square quadtree transform (NSQT) structure is described.

In NSQT, two additional transform block sizes are added: 2N×0.5N and 0.5N×2N. In this structure, a transform block is split into 2N×0.5N and 0.5N×2N and transform matrix can be obtained by reusing 0.5N×0.5N and 2N×2N transform matrixes. In this disclosure, a transform matrix may also be referred to as a transform core. In Yuan, the N×N quantization table of HEVC is reused to quantize the transform coefficients of 2N×0.5N and 0.5N×2N transform blocks.

As mentioned above, a video coder may apply a transform to convert samples to a frequency domain, or vice versa. The specific types of transforms applied in HEVC are two types of discrete cosine transforms, namely DCT-II and 4×4 DST-VII. Xin Zhao et al., U.S. Patent Publication 2016/0219290 A1 proposed an Enhanced Multiple Transform (EMT) scheme in addition to DCT-II and 4×4 DST-VII for both inter and intra coded blocks. The EMT scheme utilizes multiple selected transforms from the DCT/discrete sine transform (DST) families other than the current transforms in HEVC. The newly introduced transform matrices in U.S. Patent Publication 2016/0219290 are DST-VII, DCT-VIII, DST-I and DCT-V.

The proposed EMT in U.S. Patent Publication 2016/0219290 A1 applies to CUs smaller than 64×64, and whether EMT applies or not is controlled at the CU level using a flag, namely an EMT flag, for all TUs within a CU. For each TU within an EMT-enabled CU, the horizontal or vertical transform to be used is signaled by an index to a selected transform set, namely an EMT index. Each transform set is formed by selecting two transforms from the aforementioned transform matrices.

For intra prediction residual, the transform sets are pre-defined based on the intra prediction mode, as described in X. Zhao et al., "Video coding with rate-distortion optimized transform," IEEE Trans. Circuits Syst. Video Technol., vol. 22, no. 1, pp. 138-151, January 2012; thus each intra prediction mode has its own transform set. For example, one transform set can be {DCT-VIII, DST-VII}. Note that the transform set for the horizontal transform may be different from the transform set for the vertical transform, even for a same intra prediction mode. However, the total number of different transform sets for all intra prediction modes as well as the number of newly introduced transforms is limited. However, for inter prediction residual, only one transform set is used for all inter modes and for both horizontal and vertical transforms.

Illumination compensation (IC) in the multi-view video coding is used for compensating illumination discrepancies between different views because each camera may have different exposure to a light source. Typically, a weight factor and/or an offset are used to compensate the differences between a coded block and a prediction block in a different view. Illumination compensation was introduced to improve the coding efficiency for blocks predicted from inter-view reference pictures. Therefore, illumination compensation may only apply to blocks predicted by an inter-view reference picture.

Liu et al., "3D-CE1.h related: Illumination Compensation for Inter-View Prediction," Joint Collaborative Team on 3D Video Coding Extension Development of ITU-T SG 16 WP 3 and ISO/IEC JTC 1/SC 29/WG 11, 1$^{st}$ Meeting, Stockholm, SE, 16-20 Jul. 2012, document JCT3V-A0086 (hereinafter, JCT3V-A0086), describes illumination compensation (IC). In JCT3V-A0086, IC is enabled for inter-view prediction. Furthermore, as described in JCT3V-A0086, a IC process derives IC parameters based on neighboring samples of a current CU and neighboring samples of a reference block. In JCT3V-A0086, IC only applies to a 2N×2N partition mode. Furthermore, in JCT3V-A0086, for AMVP mode, one IC flag is signaled for each CU that is predicted from an inter-view reference picture. For merge mode, to save bits, an IC flag is signaled only when a merge index of the PU is not equal to 0. The IC flag indicates whether IC is used for a CU. IC does not apply to CUs that are only predicted from temporal reference pictures.

As described in JCT3V-A0086, a linear IC model used in inter-view prediction is shown in Eq. (6):

$$p(i,j)=a*r(i+dv_x,j+dv_y+b), \text{ where } (i,j) \in PU_c \quad (15)$$

Here, $PU_c$ is a current PU, (i, j) are the coordinates of pixels in $PU_c$, $(dv_x, dv_y)$ is a disparity vector of $PU_c$, p(i, j) is the prediction of $PU_c$, and r is the current PU's reference picture from a neighboring view. a and b are parameters of the linear IC model.

Figure 19:
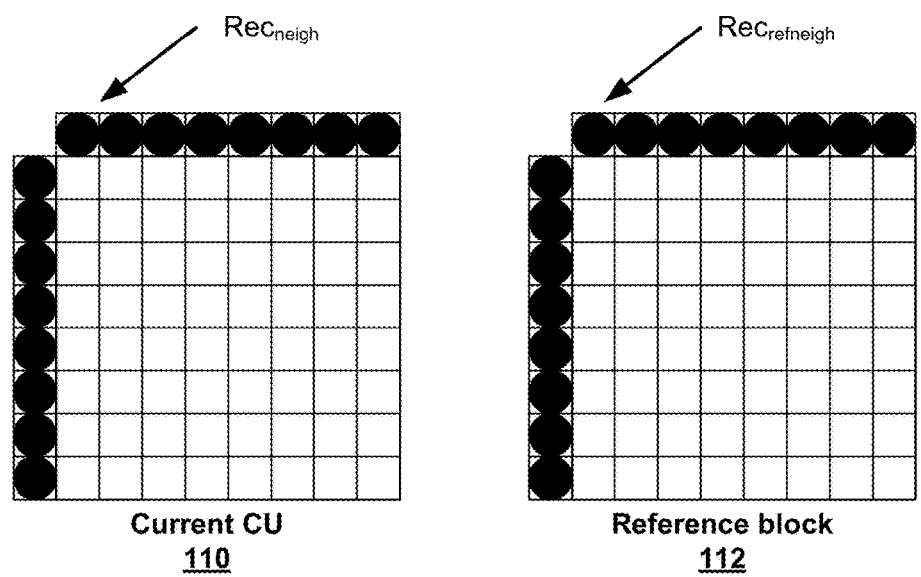
FIG. 19 illustrates neighboring pixels used for estimating parameters in an Illumination Compensation (IC) model.

In JCT3V-A0086, two sets of pixels as shown in FIG. 19 are used to estimate parameters a and b for a current PU. The first set of pixels includes available reconstructed neighboring pixels in a left column and an above row of a current CU (i.e., a CU that contains the current PU). The second set of pixels includes corresponding neighboring pixels of a reference block of the current CU. The disparity vector of the current PU is used to find the reference block of the current CU.

FIG. 19 illustrates neighboring pixels used to estimate parameters in the IC model. Particularly, FIG. 19 includes a current CU 110 and reference block 112. Each respective square of FIG. 19 corresponds to a respective sample. Thus, current CU 110 and reference block 112 each include 64 samples. The squares enclosing circles adjacent to current CU 110 correspond to the neighboring samples of current CU 110 (i.e., $Rec_{neigh}$). The squares enclosing circles adjacent to reference block CU 112 correspond to the neighboring samples of neighboring block 112 (i.e., $Rec_{refneigh}$). As described elsewhere in this disclosure, a video coder may use $Rec_{neigh}$ and $Ref_{refneigh}$ to estimate parameters for IC.

Furthermore, as described in JCT3V-A0086, let $Rec_{neig}$ denote a neighboring pixel set used by the current CU. Let $Rec_{refneigh}$ denote a neighboring pixel set used by the reference block of the current CU. Let the size of the current CU and the size of the reference block of the current CU both be equal to N×N. Let 2N denote the number of pixels in $Rec_{neig}$ and $Rec_{refneig}$. Then, a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (16)$$

$$b = \frac{\sum_{i=0}^{2N-1} Rec_{neig}(i) - a \cdot \sum_{i=0}^{2N-1} Rec_{refneig}(i)}{2N} \quad (17)$$

In some cases, only a is used in linear model and b is always set equal to 0, or only b is used and a is always set equal to 1.

In VCEG-AZ06, Local Illumination Compensation (LIC) is enabled or disabled adaptively for each inter-mode coded CU. In VCEG-AZ06, LIC is based on a linear model for illumination changes, using a scaling factor a and an offset b. FIG. 20 is a conceptual diagram illustrating example neighboring samples used for deriving IC parameters as described in VCEG-AZ06.

In VCEG-AZ06, when LIC applies for a CU, for each PU/sub-PU belonging to the CU, a video coder derives LIC parameters in a way that using sub-sampled (2:1 sub-sampling) neighboring samples of the CU and the corresponding pixels (identified by motion information of the current PU/sub-PU) in the reference picture. For a CU with size equal to N×N, the total number of boundary pixels used in equations (16) and (17) is N instead of 2N. An example is illustrated in FIG. 20. Thus, FIG. 20 is a conceptual diagram illustrating example neighboring pixels used to estimate parameters in an illumination compensation model, in which a reference block 114 of a current CU 116 is found by using a disparity vector of a current PU. In VCEG-AZ06, the IC parameters are derived and applied for each prediction direction separately. A video coder may employ a least square error method to derive the parameters a and b based on the abovementioned neighboring samples.

The current RQT design in HEVC, and other techniques such as NSQT and IC, may have the following shortcomings. For instance, regardless of whether the NSQT or the transform tree of HEVC is used, a quad-tree structure is always employed which may be sub-optimal without considering PU information. However, HEVC only supports square PUs for intra prediction modes.

Introducing 2N×N and N×2N partitions to intra modes, as is done in JCTVC-G135, may have the following problems. First, AMP is not allowed. Second, how to define the transform tree structure to achieve high coding efficiency has not been studied. Third, the LM prediction mode has only been used with square PUs and it is unknown how to derive the parameters α and β used in the LM prediction mode with non-square PUs. Fourth, in prior techniques, the coefficients must be reorganized to be in a square form, which may reduce the correlation among neighboring coefficients. Furthermore, the current EMT design has a problem in that EMT is controlled at the CU level. However, controlling EMT at the CU level is not efficient if the residual characteristics (e.g., distributions) of each PU in a CU are different.

To resolve the problems mentioned above, this disclosure proposes the following techniques. The following itemized techniques may be applied individually. Alternatively, any combination of them may be applied. In the following description, the CU size is denoted by M×M and PU size is denoted by K×L, wherein both K and L are no larger than M.

In accordance with a first example technique of this disclosure, it is proposed that a transform tree is not restricted to be a quarter tree. For example, a transform quad-tree and a transform binary tree may be combined. That is, for at least a certain transform depth, one TU may be split into two smaller TUs or four smaller TUs. In this disclosure, for each respective node of a transform tree, the respective transform depth of the respective node refers to the number of nodes in the transform tree between the respective node and the root node of the transform tree. The flexibility to split a TU into two TUs or four TUs may enhance the ability of video encoder 20 to structure the transform tree in a way that aligns TU boundaries with PU boundaries. Aligning TU boundaries with PU boundaries may increase compression performance.

Thus, in this example, video encoder 20 may partition a CU of video data into TUs of the CU based on a tree structure. In this example, a root node of the tree structure corresponds to a coding block of the CU. Furthermore, in this example, each respective non-root node of the tree structure corresponds to a respective block that is a partition of a block that corresponds to a parent node of the respective non-root node. In this example, leaf nodes of the tree structure correspond to the TUs of the CU. In this example, at least one node in the tree structure has exactly two child nodes in the tree structure. In some instances, at least one node in the tree structure may have exactly four child nodes in the tree structure. In this example, video encoder 20 may include, in a bitstream that comprises an encoded representation of the video data, data representing one or more of the TUs of the CU.

In a corresponding example, video decoder 30 may determine a CU is partitioned into TUs of the CU based on a tree structure. In this example, a root node of the tree structure corresponds to a coding block of the CU. Furthermore, in this example, each respective non-root node of the tree structure corresponds to a respective block that is a partition of a block that corresponds to a parent node of the respective non-root node. In this example, leaf nodes of the tree structure correspond to the TUs of the CU. In this example, at least one node in the tree structure has exactly two child nodes in the tree structure, and at least one node in the tree structure has exactly four child nodes in the tree structure. In this example, video decoder 30 may reconstruct, based on data for at least one of the TUs of the CU, the coding block of the CU.

Furthermore, in an example where a transform tree is not restricted to be a quarter tree (i.e., not required to be a tree in which all non-leaf nodes have 4 child nodes), for transform depth equal to 0, the square transform with size equal to M×M is applied. For transform depth equal to 1, the transform is split into two or four (depending on the number of PUs) and transform size is equal to K×L. For remaining transform depths, the quad-tree structure is still applied wherein one TU is split into four smaller ones, i.e., for transform depth equal to 2, the transform size is set to K/2×L/2. An example is given in FIG. 21. One reason for limiting splitting of transform into two or four at transform depth 1 is to align transform sizes with PU sizes, e.g., if a PU size is 2N×N or N×2N, splitting into 2 may be preferred. If a PU is an N×N partition, 4-way transform splitting may yield better results. In another reason, if the corresponding transform matrix was unknown, e.g., if AMP is used, one 16×16 CU may be split into 4×16 and 12×16 PUs, while 12×12 transform is not defined, therefore, splitting to 4 may be used for this case.

Figure 21:
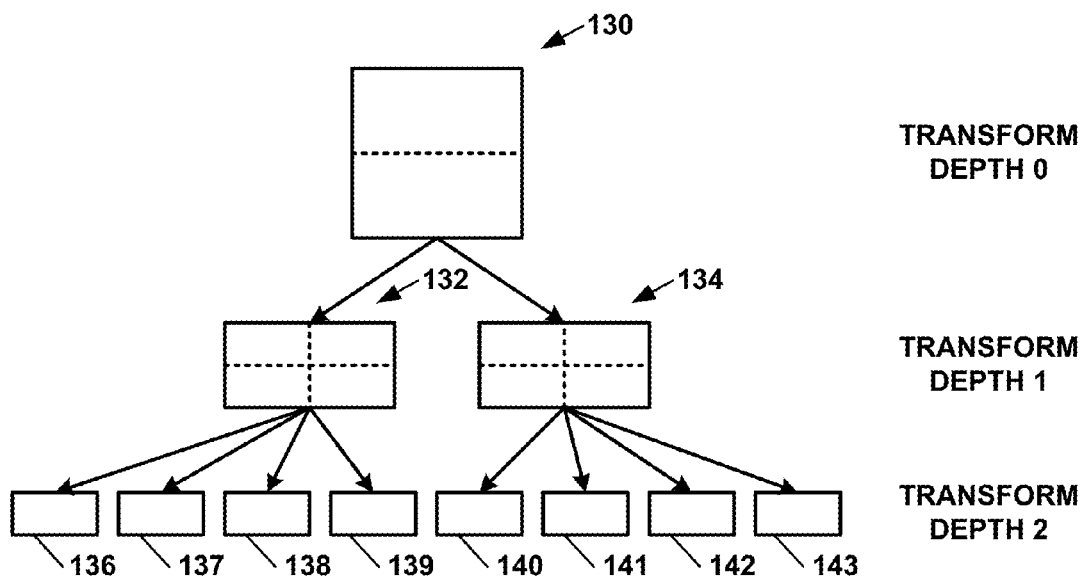
FIG. 21 is a conceptual diagram illustrating an example transform structure for a partition size equal to 2N×N.

FIG. 21 is a conceptual diagram illustrating an example transform structure for partition size equal to 2N×N. In FIG. 21 and the following figures, the dash lines indicate the splitting information for the next transform depth. Particularly, in FIG. 21, a transform block 130 has the same size as a coding block of a CU. Transform block 130 is partitioned into transform blocks 132 and 134. Furthermore, in the example of FIG. 21, transform block 132 is partitioned into transform blocks 136, 137, 138, and 139. Transform block 134 is partitioned into transform blocks 140, 141, 142 and 143. Thus, as shown in FIG. 21, a root node may have 2 child nodes, but nodes at other transform depths may be required to have 0 or 4 child nodes.

In some examples where a transform tree of a CU is not restricted to being a quarter tree, either a binary tree or a quarter tree is applied. A video coder may determine whether a binary tree or a quarter tree is applied based on the number of PUs in the CU. For example, when there are two PUs, the video coder utilizes a binary transform tree. If the CU has four PUs, the video coder may use a quarter tree structure to partition the CU into TUs. In one example, the method of selecting either binary tree or quarter tree is only applied to certain transform depths, such as 1.

Thus, in this example, video encoder 20 may partition a CU of the video data into TUs of the CU based on a tree structure. In this example, a root node of the tree structure corresponds to a coding block of the CU, each respective non-root node of the tree structure corresponds to a respective block that is a partition of a block that corresponds to a parent node of the respective non-root node, leaf nodes of the tree structure correspond to the TUs of the CUs, and the CU has one or more PUs. Furthermore, in this example, depending on the number of PUs of the CU, exactly one of the following applies: each node in the tree structure has exactly two child nodes in the tree structure, or each node in the tree structure has exactly four child nodes in the tree structure. In this example, video encoder 20 may include, in a bitstream that comprises an encoded representation of the video data, data representing one or more of the TUs of the CU.

In a corresponding example, video decoder 30 may determine a CU of the video data is partitioned into TUs of the CU based on a tree structure. In this example, a root node of the tree structure corresponds to a coding block of the CU, each respective non-root node of the tree structure corresponds to a respective block that is a partition of a block that corresponds to a parent node of the respective non-root node, leaf nodes of the tree structure correspond to the TUs of the CUs, and the CU has one or more PUs. In this example, depending on the number of PUs of the CU, exactly one of the following applies: each node in the tree structure has exactly two child nodes in the tree structure, or each node in the tree structure has exactly four child nodes in the tree structure. Furthermore, in this example, video decoder 30 may reconstruct, based on data for at least one of the TUs of the CU, the coding block of the CU.

In some examples where the transform tree is not restricted to be a quarter tree, the splitting method of either binary or quarter tree is signaled. For example, video encoder 20 may include, in the bitstream data representing a syntax element that indicates whether a CU is partitioned into TUs according to a binary tree or according to quarter tree. In this example, video decoder 30 may determine, based on data in the bitstream, a value of the syntax element. Furthermore, in this example, video decoder 30 may determine, based on the value of the syntax element, whether the CU is partitioned into TUs according to a binary tree or according to a quarter tree.

Alternatively, furthermore, the signaling may be skipped for certain PU partitions. In other words, video encoder 20 may skip signaling of transform tree splitting for a block based on how the block is split into PUs. For instance, in one example, for PU partitions equal to 2N×N, a binary tree is always used and therefore, there is no need to signal that binary or quarter tree splitting is used in the corresponding transform tree.

In accordance with a second technique of this disclosure, it is proposed that at a certain transform depth, the transform size is equal to the PU size for the rectangular PUs. In this disclosure, transform size refers to a size of a transform block of a TU. Thus, in this example, the transform blocks corresponding to nodes at a particular depth of a transform tree of a CU have the same sizes as prediction blocks of PUs of the CU. As previously discussed, aligning TU boundaries with PU boundaries may improve compression performance.

In one example of the second technique, the above method is only applied to inter coded CUs. In other words, a video coding standard may require video encoder 20 to ensure that transform sizes are equal to PUs for inter coded CUs, but this requirement does not apply to intra coded CUs.

Furthermore, in some examples, video encoder 20 may signal one flag for each PU to indicate whether there exists at least one non-zero coefficient for the three color components (e.g., Y, Cb, and Cr). As mentioned above, the second technique of this disclosure requires the sizes of TUs of a CU to be equal to the sizes of PUs of the CU at a particular depth in the transform tree. Hence, at the particular depth, the transform tree includes a respective transform tree node for each respective PU of the CU. For each respective transform tree node of the transform tree at the particular depth, the respective transform tree node corresponds to a luma transform block and chroma transform blocks having the same sizes and shapes as a luma prediction block and chroma prediction blocks of the corresponding PU. Hence, encoder 20 may signal information about a transform tree node at the particular depth (and descendant transform tree nodes of the transform tree node at the particular depth) by signaling information in the corresponding PU. For example, video encoder 20 may signal, in a bitstream, a first syntax element for a PU, a second syntax element for the PU, and a third syntax element for the PU. In this example, the first syntax element for the PU indicates whether there exists a non-zero transform coefficient in a luma coefficient block of the corresponding transform tree node or descendant transform tree node thereof, the second syntax element for the PU indicates whether there exists a non-zero transform coefficient in a Cb coefficient block of the corresponding transform tree node or descendant transform tree node thereof, and the third syntax element for the PU indicates whether there exists a non-zero transform coefficient in a Cr coefficient block of the corresponding transform tree node or descendant transform tree node thereof.

In prior techniques, rectangular PUs were only permitted for inter predicted CUs. However, in some examples of the second technique of this disclosure, when the rectangular PUs (such as 2N×N, N×2N) are introduced to the intra coded CUs, the above method (i.e., requiring the transform size to be equal to the PU size at a particular transform depth) is also applied.

In accordance with a third technique, one TU may be split into multiple smaller TUs while the sizes of the smaller TUs may be different. In other words, a video coder may split a TU into two differently-sized child TUs. In some instances, splitting a TU into two or more differently-sized child TUs may improve video coding performance instances where AMP is enabled because splitting a TU into two or more differently-sized child TUs may better align the boundaries of the child TUs with PU boundaries. As discussed elsewhere in this disclosure, aligning boundaries of TUs with boundaries of PUs may reduce the occurrence of high frequency transform coefficients associated with discontinuities at boundaries between predictive blocks and therefore increase compression efficiency. For example, if a block (e.g., a CU) has a 12×16 PU, a portion of the block corresponding to the 12×16 PU may be split into two 8×8 TUs plus two 4×4 TUs, or two 8×8 TUs plus one 4×16 TU.

Figure 22:
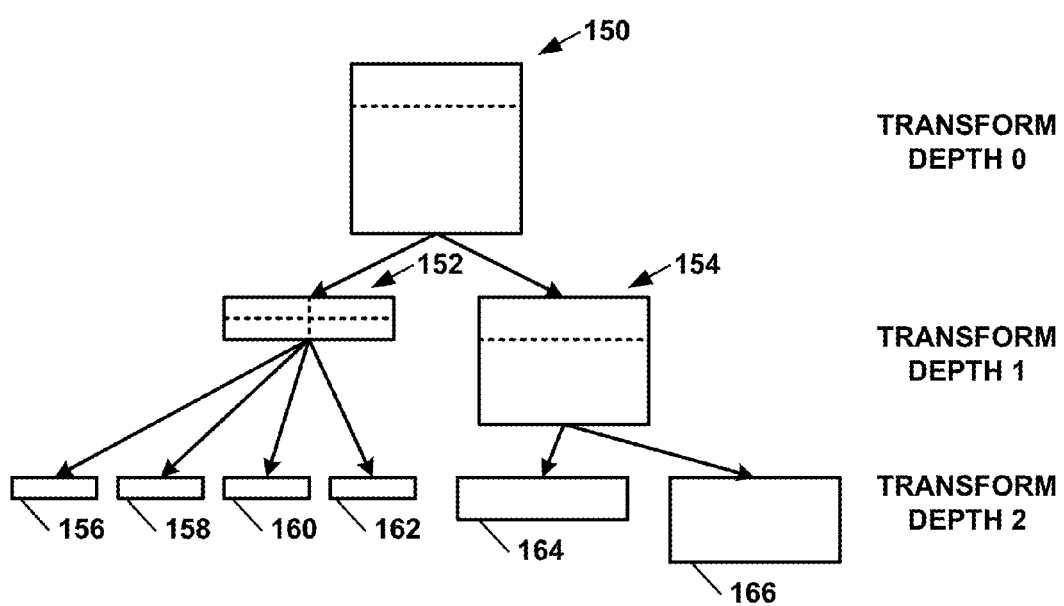
FIG. 22 is a conceptual diagram illustrating a transform structure for a partition size equal to N×N/4(U), in accordance with a technique of this disclosure.

In one example of the third technique, when AMP mode is enabled for one CU, the transform tree for the larger PU may be split to two parts with one equal to the smaller PU and the rest as another TU. An example is given in FIG. 22. FIG. 22 is a conceptual diagram illustrating a transform structure for partition size equal to N×N/4(U), in accordance with a technique of this disclosure. In the example of FIG. 22, a transform block 150 is partitioned into transform blocks 152 and 154. Furthermore, in the example of FIG. 22, transform block 152 is partitioned into transform blocks 156, 158, 160, and 162. Transform block 154 is partitioned into transform blocks 164 and 166. The right branch at transform depth 2 shows that the two split transform sizes are different. That is, transform block 164 and transform block 166 have different sizes.

In some examples of the third technique, asymmetric splitting of a TU is only applicable to the AMP case wherein the two PU sizes are different or one CU contains multiple PUs with at least two of the PUs having different sizes. In other words, a video coder may only split a TU into child TUs of different sizes if a CU containing the TU is split into PUs of different sizes.

Thus, in an example where a TU may be split into multiple differently-sized TUs, video encoder 20 may partition a CU into TUs of the CU based on a tree structure. In this example, a root node of the tree structure corresponds to a coding block of the CU. Furthermore, in this example, each respective non-root node of the tree structure corresponds to a respective block that is a partition of a block that corresponds to a parent node of the respective non-root node. In this example, leaf nodes of the tree structure correspond to the TUs of the CUs. In this example, child nodes of at least one node of the tree structure correspond to blocks of different sizes. Furthermore, in this example, video encoder 20 may include, in a bitstream that comprises an encoded representation of video data, data representing one or more of the TUs of the CU.

In a corresponding example, video decoder 30 may determine a CU is partitioned into TUs of the CU based on a tree structure. In this example, a root node of the tree structure corresponds to a coding block of the CU. Furthermore, in this example, each respective non-root node of the tree structure corresponds to a respective block that is a partition of a block that corresponds to a parent node of the respective non-root node. In this example, leaf nodes of the tree structure correspond to the TUs of the CUs. In this example, child nodes of at least one node of the tree structure correspond to blocks of different sizes. Furthermore, in this example, video decoder 30 may reconstruct, based on data for at least one of the TUs of the CU, the coding block of the CU.

In accordance with a fourth technique of this disclosure, it is allowed that the split of transform is carried out not along the same direction (vertical or horizontal) in a CU. In other words, a transform tree for a CU may include transform blocks that are split horizontally and transform blocks that are split vertically. Allowing both horizontal and vertical splitting of transform blocks may better align the boundaries of the TUs of the CU with boundaries of the PUs of the CU. As discussed elsewhere in this disclosure, aligning the boundaries of the TUs of a CU with boundaries of the PUs of the CU may reduce the occurrence of high frequency transform coefficients associated with discontinuities at boundaries between predictive blocks and therefore increase compression efficiency. In one example of the fourth technique, the use of both horizontal and vertical splitting of TUs of a CU is only applicable to certain partition modes, e.g., AMP.

Figure 23:
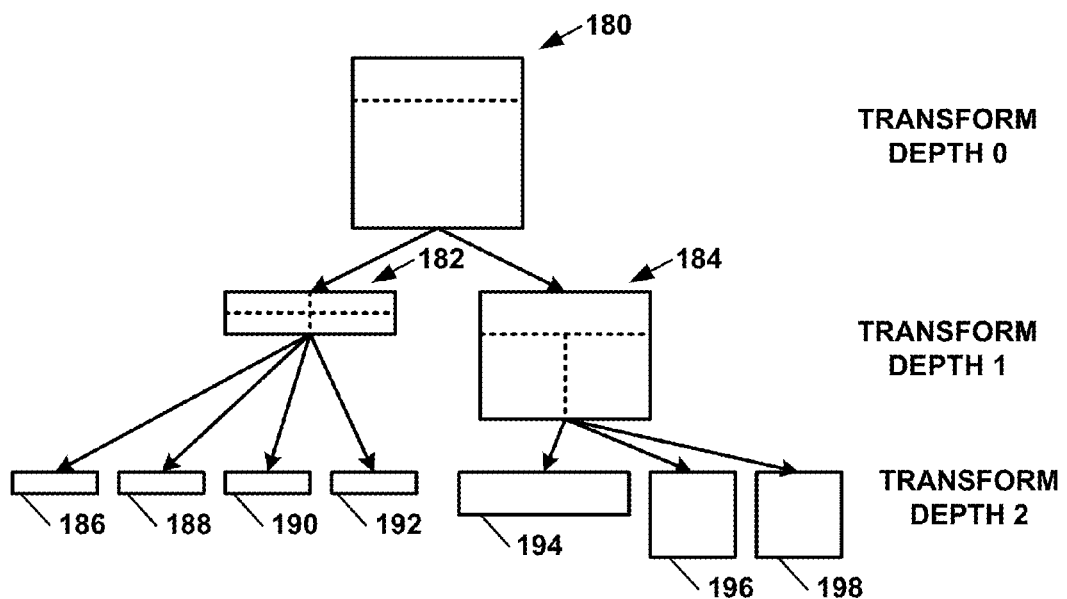
FIG. 23 is a conceptual diagram illustrating a transform structure for a partition size equal to N×N/4(U), in accordance with a technique of this disclosure.

FIG. 23 is a conceptual diagram illustrating a transform structure for a partition size equal to N×N/4(U), in accordance with a technique of this disclosure. In the example of FIG. 23, the CU partition is along the horizontal direction and TU partition could be from either horizontal and/or vertical directions. Particularly, a TU 180 is split horizontally into a TU 182 and a TU 184. TU 182 is split into TUs 186, 188, 190, and 192. TU 184 is split horizontally and vertically into TUs 194, 196, and 198.

In an example in which splitting of transform blocks along different directions in a CU is allowed, video encoder 20 may partition a CU into TUs of the CU based on a tree structure. In this example, a root node of the tree structure corresponds to a coding block of the CU. Furthermore, in this example, each respective non-root node of the tree structure corresponds to a respective block that is a partition of a block that corresponds to a parent node of the respective non-root node. In this example, leaf nodes of the tree structure correspond to the TUs of the CUs. In this example, a first node in the tree structure has exactly two child nodes and a boundary between blocks corresponding to the child nodes of the first node is vertical. Additionally, in this example, a second node in the tree structure has exactly two child nodes and a boundary between blocks corresponding to the child nodes of the second node is horizontal. In this example, video encoder 20 may include, in a bitstream that comprises an encoded representation of the video data, data representing one or more of the TUs of the CU.

Similarly, video decoder 30 may determine a CU is partitioned into TUs of the CU based on a tree structure. In this example, a root node of the tree structure corresponds to a coding block of the CU, each respective non-root node of the tree structure corresponds to a respective block that is a partition of a block that corresponds to a parent node of the respective non-root node, and leaf nodes of the tree structure correspond to the TUs of the CUs. Furthermore, in this example, a first node in the tree structure has exactly two child nodes and a boundary between blocks corresponding to the child nodes of the first node is vertical. In this example, a second node in the tree structure has exactly two child nodes and a boundary between blocks corresponding to the child nodes of the second node is horizontal. In this example, video decoder 30 may reconstruct, based on data for at least one of the TUs of the CU, the coding block of the CU.

In accordance with a fifth technique of this disclosure, one CU may contain both intra and inter PUs which is referred to comb_mode in the following descriptions. In some instances, use of comb_mode may increase the accuracy of predictive blocks of a CU and therefore may ultimately lead to increased compression performance. The accuracy of a predictive block of a PU of a CU is a measure of differences between corresponding samples of the predictive block of the PU and samples of a coding block of the CU.

Thus, in accordance with the fifth technique, video encoder 20 may perform intra prediction to obtain a first predictive block for a first PU of a CU. Additionally, in this example, video encoder 20 may perform inter prediction to obtain a second predictive block for a second PU of the same CU. In this example, video encoder 20 may obtain, based on the first predictive block and the second predictive block, residual data for the CU. Furthermore, in this example, video encoder 20 may include, in a bitstream comprising an encoded representation of the video data, data representing the residual data for the CU.

Similarly, in accordance with the fifth technique, video decoder 30 may perform intra prediction to obtain a first predictive block for a first PU of a CU. In this example, video decoder 30 may perform inter prediction to obtain a second predictive block for a second PU of the same CU. Furthermore, in this example, video decoder 30 may reconstruct, based on the first predictive block and the second predictive block, a coding block of the CU.

When one CU is coded with comb_mode, and the CU is split into two PUs in the vertical direction, such as in an N×2N partitioning mode, a video coder may determine the transform depth of a transform tree of the CU as follows: If the left PU is an intra-coded PU, transform depth can be from 0. In other words, based on the left PU being intra-coded, the depth of the transform tree of the CU is allowed to be 0 or greater. Therefore, in instances where the depth of the transform tree of the CU is equal to 0, the TU size could be equal to the CU size and one TU may cover two PUs, i.e., cross PU boundaries. Otherwise (the left PU is an inter-coded PU), the transform depth is restricted to be from 1. In other words, the depth of the transform tree of the CU may be 1 or greater, but not equal to 0. In this example, when the left PU is an inter-coded PU, the TU size should be no larger than the PU size.

Thus, in this example, video encoder 20 may generate a bitstream that conforms to a video coding standard. In this example, based on the CU being split into the first PU and the second PU along a vertical boundary and the left PU of the CU being an intra-coded PU, the video coding standard allows a TU of the CU to cover both the first and second PUs. In a similar example, video decoder 30 may obtain a bitstream comprising an encoded representation of the video data. In this example, the bitstream may conform to a video coding standard that, based on the CU being split into the first PU and the second PU along a vertical boundary and the left PU of the CU being an intra-coded PU, allows a TU of the CU to cover both the first and second PUs. In both the example of video encoder 20 and video decoder 30, the video coding standard may provide a restriction requiring that, based on the CU being split into the first PU and the second PU along a vertical boundary and the left PU of the CU being an inter-coded PU, a TU size of a TU of the CU is no larger than a size of the first PU or the second PU.

Furthermore, when one CU is split into two PUs in the horizontal direction, such as when the 2N×N partition mode is used, a video coder may determine the transform depth used when a CU contains both intra and inter PUs as follows: If the above PU is an intra-coded PU, transform depth can be from 0. In other words, the depth of transform tree of the CU is 0 or more. In this example, the above PU is the upper PU of the horizontally divided CU. In instances where the transform depth is 0, the TU size is equal to the CU size and one TU covers two PUs. Otherwise (i.e., the above PU is an inter-coded PU), transform depth is restricted to be from 1. In other words, the depth of the transform tree of the CU is 1 or more, but cannot be 0. In this example, when the above PU is an inter-coded PU, the TU size should be no larger than the PU size.

Thus, in this example, video encoder 20 may generate a bitstream that conforms to a video coding standard. In this example, based on the CU being split into the first PU and the second PU along a horizontal boundary and the above PU of the CU being an intra-coded PU, the video coding standard allows a TU of the CU to cover both the first and second PUs. Moreover, in some examples, the bitstream conforms to a video coding standard that provides a restriction requiring that, based on the CU being split into the first PU and the second PU along a horizontal boundary and the above PU of the CU being an inter-coded PU, a TU size of a TU of the CU is no larger than a size of the first PU or the second PU.

In a similar example, video decoder 30 may obtain a bitstream comprising an encoded representation of the video data. In this example, the bitstream conforms to a video coding standard that, when the CU is split into the first PU and the second PU along a horizontal boundary and the above PU of the CU is an intra-coded PU, allows a TU of the CU to cover both the first and second PUs. Moreover, in some examples, video decoder 30 obtains a bitstream conforming to a video coding standard that provides a restriction requiring that, when the CU is split into the first PU and the second PU along a horizontal boundary and the above PU of the CU is an inter-coded PU, a TU size of a TU of the CU is no larger than a size of the first PU or the second PU.

In some examples, when one CU is coded with comb_mode, a restriction is added such that a TU should not cross PU boundaries. This restriction may reduce the encoder complexity since there is no need to check the rate-distortion cost of the case wherein TUs could cross PU boundaries. Thus, in this example, video encoder 20 may generate a bitstream that conforms to a video coding standard that provides a restriction requiring that based on the CU having an intra-coded PU and an inter-coded PU, no TU of the CU crosses PU boundaries of the CU. In a similar example, video decoder 30 may obtain a bitstream comprising an encoded representation of the video data. In this example, the bitstream conforms to a video coding standard that provides a restriction requiring that based on the CU having an intra-coded PU and an inter-coded PU, no TU of the CU crosses PU boundaries of the CU.

Furthermore, in some examples involving the comb_mode, it is restricted that the comb_mode is only applied for a CU larger than (not including) a certain size such as 8×8. It is noted that for smaller blocks, increasing the bits of signaling whether comb_mode is applied to a CU may not compensate the saved rate-distortion cost introduced by the comb_mode. Therefore, for certain small sizes, comb_mode may be always disabled without additional signaling. In this disclosure, a restriction may prevent a video encoder from performing some action or generating a bitstream in some way. For example, video encoder 20 may generate a bitstream that conforms to a video coding standard that provides a restriction requiring that no CU smaller than a particular size is allowed to have both an intra-coded PU and an inter-coded PU. In a similar example, video decoder 30 may obtain a bitstream comprising an encoded representation of the video data. In this example, the bitstream conforms to a video coding standard that provides a restriction requiring that no CU smaller than a particular size is allowed to have both an intra-coded PU and an inter-coded PU.

In some examples involving the comb_mode, one 8×8 CU can be coded with comb_mode with one 8×4 intra and one 8×4 inter PU, or one 4×8 Intra and one 4×8 Inter PU. In this example, the corresponding 4×4 chroma block of this 8×8 CU (in 4:2:0 color format) can be coded using only the inter prediction mode of the inter coded luma PU, or using only the intra prediction mode of the intra coded luma PU, or the 4×4 chroma block is further partitioned correspondingly as two 4×2 or 2×4 blocks based on the luma PU partition, and each of the two 4×2 or 2×4 is predicted by the corresponding luma prediction mode, and a 4×4 residual block is generated and a 4×4 transform is performed on the generated 44 residual block to avoid the introduction of a 2×2 transform. Introduction of a 2×2 transform may unnecessarily increase complexity.

Thus, in the example above, video encoder 20 may perform intra prediction to obtain a first predictive block for a first PU of a CU of the video data. Additionally, in this example, video encoder 20 may perform inter prediction to obtain a second predictive block for a second PU of the same CU. In this example, the size of the CU is 2N×2N, the size of the first PU is 2N×N and the size of the second PU is N×2N or the size of the first PU is N×2N and the size of the second PU is 2N×N. Furthermore, in this example, the CU is coded using a 4:2:0 color format. In this example, the first predictive block for the first PU is a luma predictive block for the first PU. In this example, the second predictive block for the second PU is a luma predictive block for the second PU. In this example, video encoder 20 uses only inter prediction to obtain a third predictive block, the third predictive block being a chroma predictive block of size N×N. In this example, video encoder 20 obtains residual data for the CU based on the first, second, and third predictive blocks. A similar example substitutes, instead of video encoder 20 that obtains residual data for the CU based on the first, second, and third predictive blocks, a video encoder 20 that uses only intra prediction to obtain the third predictive block instead of intra prediction.

Moreover, in a corresponding example, video decoder 30 may perform intra prediction to obtain a first predictive block for a first PU of a CU of the video data. In this example, video decoder 30 may perform inter prediction to obtain a second predictive block for a second PU of the same CU. In this example, the size of the CU is 2N×2N, the size of the first PU is 2N×N and the size of the second PU is N×2N or the size of the first PU is N×2N and the size of the second PU is 2N×N, and the CU is coded using a 4:2:0 color format. Furthermore, in this example, the first predictive block for the first PU is a luma predictive block for the first PU and the second predictive block for the second PU is a luma predictive block for the second PU. In this example, video decoder 30 uses only inter prediction to obtain a third predictive block, the third predictive block being a chroma predictive block of size N×N. Furthermore, in this example, video decoder 30 may reconstruct, based on the first, second, and third predictive blocks, the coding block of the CU. A similar example substitutes a different configuration of video decoder 30 that uses only intra prediction to obtain the third predictive block instead of intra prediction.

As mentioned above, in some examples, one 8×8 CU can be coded with comb_mode with one 8×4 intra and one 8×4 inter PU, or one 4×8 intra and one 4×8 inter PU, and the corresponding 4×4 chroma block of this 8×8 CU, can be coded using only the inter prediction mode of the inter coded luma PU, a video coder may partition the 4×4 chroma block correspondingly as two 4×2 or 2×4 blocks based on the luma PU partition, the video coder predicts each of the two 4×2 or 2×4 by the corresponding luma prediction mode, and the video coder generates a 4×4 residual block and performs a 4×4 transform on the generated 4×4 residual block.

Thus, in such examples, video encoder 20 may perform intra prediction to obtain a first predictive block for a first PU of a CU of the video data. Additionally, in this example, video encoder 20 may perform inter prediction to obtain a second predictive block for a second PU of the same CU. In this example, the size of the CU is 2N×2N, the size of the first PU is 2N×N and the size of the second PU is N×2N or the size of the first PU is N×2N and the size of the second PU is 2N×N, and the CU is coded using a 4:2:0 color format. Furthermore, the first predictive block for the first PU is a luma predictive block for the first PU and the second predictive block for the second PU is a luma predictive block for the second PU. In this example, video encoder 20 may use an intra prediction mode of the first PU to generate a chroma predictive block for the first PU. Furthermore, in this example, video encoder 20 may use inter prediction to generate a chroma predictive block for the second PU. In this example, video encoder 20 may obtain residual data for the CU based on the first predictive block, the second predictive blocks, the chroma predictive block for the first PU and the chroma predictive block for the second PU.

In a similar example, video decoder 30 may perform intra prediction to obtain a first predictive block for a first PU of a CU of the video data. In this example, video decoder 30 may perform inter prediction to obtain a second predictive block for a second PU of the same CU. In this example, the size of the CU is 2N×2N, the size of the first PU is 2N×N and the size of the second PU is N×2N or the size of the first PU is N×2N and the size of the second PU is 2N×N, and the CU is coded using a 4:2:0 color format. Furthermore, in this example, the first predictive block for the first PU is a luma predictive block for the first PU and the second predictive block for the second PU is a luma predictive block for the second PU. In this example, video decoder 30 may use an intra prediction mode of the first PU to generate a chroma predictive block for the first PU. Video decoder 30 may use inter prediction to generate a chroma predictive block for the second PU. Furthermore, video decoder 30 may reconstruct, based on the first predictive block, the second predictive blocks, the chroma predictive block for the first PU and the chroma predictive block for the second PU, the coding block of the CU.

Additionally, in some examples involving the comb_mode, when one CU is coded using two or more PUs and both Inter and Intra prediction modes are used, for inter-coded PUs, the CU is treated in the same way as the current HEVC design. That is, the reconstruction is defined as the sum of decoded residual after possible inverse quantization/transform and the motion-compensated prediction block using its motion information. In addition, for intra-coded PUs, a video coder uses a process involving two predictors, i.e., the reconstruction is defined as the sum of decoded residual after possible inverse quantization/transform and the motion-compensated prediction block using the motion information from its neighbor inter-coded PU and the intra prediction block using the intra prediction modes associated with the current PU.

Thus, in this example, video encoder 20 may perform intra prediction to obtain a first predictive block for a first PU of a CU of the video data. In this example, video encoder 20 may perform inter prediction to obtain a second predictive block for a second PU of the same CU. Furthermore, in this example, as part of obtaining residual data for the CU, video encoder 20 may, for each respective sample of the residual data corresponding to the first PU, obtain the respective sample such that the respective sample is equal to a respective sample of a coding block of the CU minus a predictive sample obtained using motion information of the second PU and minus a sample of the first predictive block. The predictive sample obtained using motion information may be a sample of a predictive block of an inter-predictive PU.

In a corresponding example, video decoder 30 may perform intra prediction to obtain a first predictive block for a first PU of a CU of the video data. In this example, video decoder 30 may perform inter prediction to obtain a second predictive block for a second PU of the same CU. Furthermore, in this example, as part of reconstructing a coding block of the CU, video decoder 30 may, for each respective sample of the coding block corresponding to the first PU, obtain the respective sample such that the respective sample is equal to a sum of a respective decoded residual sample, a predictive sample obtained using motion information of the second PU, and a sample of the first predictive block.

Alternatively, in some examples involving comb_mode, when one CU is coded using two or more PUs and both Inter and Intra prediction modes are used, for intra-coded PUs, the process for reconstructing coding blocks of the CU is the same as the current HEVC design, i.e., the reconstruction is defined as the sum of decoded residual after possible inverse quantization/transform and the intra prediction block using its intra prediction mode. In addition, for an inter-coded PU of a CU, the process for reconstructing portions of the coding blocks corresponding to the inter-coded PU is different from the reconstruction process in HEVC in that two predictors are defined for the inter-coded PU. Furthermore, for each sample of a coding block of the CU that corresponds to a sample of the inter-coded PU, the sample is defined as a sum of a decoded residual sample (e.g., after possible inverse quantization/transform) and a sample of the motion-compensated prediction block of the inter-coded PU generated using motion information of the inter-coded PU and a sample of an intra prediction block generated using an intra prediction mode associated with an intra-coded PU that neighbors the inter-coded PU.

Thus, in this example, video encoder 20 may perform intra prediction to obtain a first predictive block for a first PU of a CU of the video data. In this example, video encoder 20 may perform inter prediction to obtain a second predictive block for a second PU of the same CU. Furthermore, in this example, as part of obtaining residual data for the CU, video encoder 20 may, for each respective sample of the residual data corresponding to the second PU, obtain the respective sample such that the respective sample is equal to a respective sample of a coding block of the CU minus a predictive sample obtained using an intra prediction mode of the first PU and minus a sample of the second predictive block.

In a corresponding example, video decoder 30 may perform intra prediction to obtain a first predictive block for a first PU of a CU of the video data. In this example, video decoder 30 may perform inter prediction to obtain a second predictive block for a second PU of the same CU. Furthermore, in this example, as part of reconstructing a coding block of the CU, video decoder 30 may, for each respective sample of the coding block corresponding to the second PU, obtain the respective sample such that the respective sample is equal to a sum of a respective decoded residual sample, a predictive sample obtained using an intra prediction mode of the first PU, and a sample of the second predictive block.

In one example, when allowing the two predictors, the two prediction blocks are combined with a linear weighting function, e.g., an average of the two. For example, a video coder such as video encoder 20 or video decoder 30 may use intra prediction to generate a first predictive block of a PU and may use inter prediction to generate a second predictive block for the PU. In this example, the video coder may determine a final predictive block for the PU by determining, for each respective sample of the final predictive block, a weighted average of the samples of the first and second predictive blocks that correspond to the respective sample of the final predictive block. In this example, weights used in the weighted average may favor the intra predicted predictive block over the inter predicted predictive block, or vice versa. In some instances, using such a linear weighting function may lead to a more accurate final predictive block, which may ultimately increase compression performance. The linear weighting factors may be signaled as side information or derived from certain coded information.

For example, for each respective sample of a coding block of the CU that corresponds to a PU of the CU, video encoder 20 may obtain a first predictive sample for the respective sample and a second predictive sample for the respective sample. For instance, the first predictive sample for the respective sample may be generated using inter prediction and the second predictive sample for the respective sample may be generated using intra prediction. In this example, video encoder 20 may determine a weighted predictive sample for the respective sample by applying the linear weighting function to the first predictive sample for the respective sample and the second predictive sample for the respective sample. Additionally, in this example, video encoder 20 may determine a residual sample for the respective sample equal to a difference between an original value of the respective sample and the weighted predictive sample for the respective sample.

Similarly, for each respective sample of a coding block that video decoder 30 may obtain a residual sample for the respective sample. For instance, video decoder 30 may obtain, from a bitstream, syntax elements indicating transform coefficients, apply inverse quantization to the transform coefficients, and apply an inverse transform to the transform coefficients to obtain residual samples. Furthermore, in this example, video decoder 30 may determine a first predictive sample for the respective sample and a second predictive sample for the respective sample. For instance, the first predictive sample for the respective sample may be generated using inter prediction and the second predictive sample for the respective sample may be generated using intra prediction. In this example, video decoder 30 may determine a weighted predictive sample for the respective sample by applying a linear weighting function to the first predictive sample for the respective sample and the second predictive sample for the respective sample. Additionally, in this example, video decoder 30 may reconstruct the respective sample as a sum of the residual sample for the respective sample and the weighted predictive sample for the respective sample.

The following examples indicate the usage of comb_mode when the comb_mode is enabled for one slice, picture, or sequence (i.e., coded video sequence). In HEVC, a CU includes a 1-bit pred_mode_flag syntax element. The pred_mode_flag syntax element of a CU equal to 0 specifies that the CU is coded in the inter prediction mode. The pred_mode_flag syntax element of a CU equal to 1 specifies that the CU is coded in the intra prediction mode. In accordance with one example of this disclosure, the 1-bit pred_mode_flag of a CU is replaced by a syntax element with three possible values. In this example, the three values correspond to the conventional intra mode, the conventional inter mode, and comb_mode, respectively. In this example, the conventional intra mode refers to instances where all PUs of the CU are coded using intra prediction mode. Furthermore, in this example, the conventional inter prediction mode refers to instances where all PUs of the CU are coded using inter prediction mode. In some examples, when comb_mode is enabled for a CU, for only one PU of the CU, video encoder 20 signals a 1-bit value to indicate whether the PU is coded in intra prediction mode or inter prediction mode. Because the CU is coded in the comb_mode, the other PU is a different prediction mode from the PU for which the 1-bit value was signaled. In another example, comb_mode is treated as the conventional inter mode. In this example, for each PU of a CU, an additional flag is added to indicate the usage of intra or inter prediction mode.

In a seventh technique of this disclosure, one PU can be predicted from both intra prediction and inter prediction and the two predictive blocks from intra prediction and inter prediction are used to derive the final predictive block for the PU. Deriving a final predictive block in this way may result in a more accurate predictive block for the PU, which may increase compression performance.

Thus, in accordance with the seventh technique, video encoder 20 may perform intra prediction to obtain a first predictive block for a PU of a CU. Additionally, in this example, video encoder 20 may perform inter prediction to obtain a second predictive block for the same PU of the same CU. In this example, video encoder 20 may derive, based on the first predictive block and the second predictive block, a final predictive block for the PU. Furthermore, video encoder 20 may obtain, based on the final predictive block for the PU, residual data for the CU. For instance, video encoder 20 may generate at least a portion of the residual data for CU by calculating differences between samples of the final predictive block for the PU and corresponding samples of a coding block of the CU. In this example, video encoder 20 may include, in a bitstream comprising an encoded representation of the video data, data representing the residual data for the CU.

In a corresponding example, video decoder 30 may perform intra prediction to obtain a first predictive block for a PU of a CU. Additionally, in this example, video decoder 30 may perform inter prediction to obtain a second predictive block for the same PU of the same CU. In this example, video decoder 30 may derive, based on the first predictive block and the second predictive block, a final predictive block for the PU. Furthermore, in this example, video decoder 30 may reconstruct, based on the final predictive block for the PU, a coding block of the CU. For instance, video decoder 30 may add the final predictive block for the PU to residual data for the CU to reconstruct at least a portion of a coding block of the CU.

Furthermore, in some examples of the seventh technique, a video coder applies a linear weighting function to the two prediction blocks, e.g., the weighting factors of the pixels located in the same relative positions of the two prediction blocks are fixed. In some examples, the weighting factors for different positions may be variable. Furthermore, in some examples, the weighting factors are dependent on the intra prediction mode. In one example, for the top-left position within a block, if the intra prediction mode is a DC mode, the weights of the top-left samples in inter and intra predictive blocks are equal, i.e., (0.5, 0.5) while if the intra prediction is a vertical prediction mode, the weight of the top-left sample in intra predictive block may be larger than that of the top-left sample in the inter predictive block.

In some examples of the seventh technique, the final prediction value of one pixel at one or more positions, but not all positions, may be copied from either the intra predicted block or the inter predicted block, i.e., one of the two weighting factors is 0 and the other one is 1.

In some examples, the seventh technique is applied to specific partition sizes (e.g., 2N×2N), and/or specific prediction modes (MERGE/SKIP mode). Furthermore, in some examples, when the seventh technique is applied, the intra prediction modes are restricted to be a subset of intra prediction modes used for conventional intra prediction. In one example, the subset is defined to only include the MPMs (most probable modes).

As discussed above, a video coder may use a Linear Model (LM) prediction mode to predict chroma samples of a block based on reconstructed luma samples of the same block. Furthermore, as described above, the LM prediction mode has not been used with non-square PUs. In accordance with an eighth technique of this disclosure, a video coder may use the LM prediction mode with non-square PUs. More generally, the same techniques for applying the LM prediction mode work with non-square luma and chroma blocks. Hence, discussion in this disclosure regarding the eighth technique with respect to non-square PUs may apply more generally to non-square luma and chroma blocks, such as the luma prediction blocks and chroma prediction blocks of PUs. Furthermore, examples of the eighth technique may derive the parameters used in the LM prediction mode in several ways.

For instance, in some examples of the eighth technique, a boundary at the longer side of a non-square PU is down-sampled or sub-sampled such that the number of pixels in the down-sampled or sub-sampled boundary is equal to the number of pixels in the shorter boundary. The process can be a decimation or an interpolated sampling. In examples where video decoder 30 performs the sub-sampling using decimation, video decoder 30 may remove samples at regular intervals (e.g., every other sample) to reduce the number of samples without changing the values of the remaining samples. In another example, video decoder 30 may perform the sub-sampling using interpolation. In examples where video decoder 30 performs the sub-sampling using interpolation, for respective pairs of adjacent samples, video decoder 30 may interpolate a value between the samples of a respective pair and may include the interpolated value in the sub-sampled set of samples.

Thus, in an example of the eighth technique of this disclosure, video encoder 20 may perform a linear model prediction operation to predict a predictive chroma block for a non-square PU of a CU from down-sampled or sub-sampled reconstructed luma samples of the PU. Furthermore, in this example, video encoder 20 may obtain, based on the predictive chroma block, residual data for the CU. In this example, video encoder 20 may include, in a bitstream comprising an encoded representation of the video data, data representing the residual data for the CU. In a corresponding example, video decoder 30 may perform a linear model prediction operation to predict a predictive chroma block for a non-square PU of a CU of a current picture of the video data from down-sampled reconstructed luma samples of the PU. In this example, video decoder 30 may reconstruct, based in part on the predictive chroma block, a coding block of the CU. In either of the examples of the paragraph, video encoder 20 or video decoder 30 may down-sample or sub-sample luma samples of a longer side of the non-square PU such that the number of down-sampled or sub-sampled luma samples on the longer side of the non-square PU is the same as the luma samples on the shorter side of the non-square PU.

In one example, when using equation (4) and equation (5) to calculate linear model parameters, for both luma and chroma components, the pixels of the boundary at the longer side of a non-square PU are sub-sampled such that the number of pixels in the down-sampled or sub-sampled boundary are equal to the number of pixels in the shorter boundary (i.e., min(K, L)). The sub-sampling process can be a decimation or an interpolated sampling.

Thus, in this example, as part of performing an LM prediction operation, a video coder may obtain a predictive chroma sample such that the predictive chroma sample is equal to a first parameter multiplied by a collocated luma sample, plus a second parameter, wherein the first parameter is equal to:

$$\alpha = \frac{I \sum x_i \cdot y_i - \sum x_i \cdot \sum y_i}{I \sum x_i \cdot x_i - \sum x_i \cdot \sum x_i}$$

and the second parameter is equal to:

$$\beta = (\Sigma y_i - \alpha \cdot \Sigma x_i)/I,$$

where I is the number of reference samples in a left and top boundary of the non-square PU, $x_i$ is a down-sampled or sub-sampled reconstructed luma reference sample, $y_i$ is a reconstructed chroma reference sample.

Alternatively, in some examples, pixels located at both longer and short sides of the PU may be sub-sampled and the sub-sampling ratios may be different. A sub-sampling ratio is a ratio of samples prior to sub-sampling to samples after sub-sampling. However, it may be required that the total number of pixels at two sides after sub-sampling should be equal to $2^m$ (wherein m is an integer, m may be different for luma and chroma components). The value of m can be dependent on the block size K and L.

Thus, in this example, as part of performing an LM prediction operation, a video coder may obtain a predictive chroma sample such that the predictive chroma sample is equal to a first parameter multiplied by a collocated luma sample, plus a second parameter, wherein the first parameter is equal to:

$$\alpha = \frac{I\sum x_i \cdot y_i - \sum x_i \cdot \sum y_i}{I\sum x_i \cdot x_i - \sum x_i \cdot \sum x_i}$$

and the second parameter is equal to:

$$\beta = (\Sigma y_i - \alpha \cdot \Sigma x_i)/I,$$

where I is the number of reference samples in a set of reference samples, $x_i$ is a reconstructed luma reference sample, and $y_i$ is a reconstructed chroma reference sample. In this example, the set of reference samples is a sub-sampled set of left reference samples and above reference samples, the left reference samples being immediately left of a left boundary of the current PU and the above reference samples being immediately above a top boundary of the current PU.

In another example of the eighth technique, the number of pixels I in equations (4) and (5) are adjusted based on the actual number of pixels in the boundary. For instance, for 2N×N PU, I=3N. When only left or above causal samples are available, the total involved samples number I is equal to the length of left or above boundary. Thus, a video coder may calculate α as:

$$\alpha = \frac{3N\sum x_i \cdot y_i - \sum x_i \cdot \sum y_i}{3N\sum x_i \cdot x_i - \sum x_i \cdot \sum x_i}$$

Additionally, the video coder may calculate β as:

$$\beta = (\Sigma y_i - \alpha \cdot \Sigma x_i)/3N.$$

When LM is enabled for one non-square chroma PU (with size equal to K×L, where K is unequal to L), the parameters (i.e., a and b) can be derived in various ways. For example, when using equation (4) and equation (5) to calculate linear model parameters, for both luma and chroma components, the pixels of the boundary at the shorter side of the non-square PU is up-sampled such that the number of pixel in the up-sampled boundary is equal to the number of pixels in the longer boundary (i.e., max(K, L)). The up-sampling process can be a duplicator or an interpolated sampling. A duplicator up-sampling process is an up-sampling process in which existing samples are duplicated to generate new samples. An interpolated up-sampling process increases the number of samples by interpolating a value of a new sample based on two or more existing samples.

Thus, in this example, as part of performing an LM prediction operation, a video coder may obtain a predictive chroma sample such that the predictive chroma sample is equal to a first parameter multiplied by a collocated luma sample, plus a second parameter, wherein the first parameter and second parameter are defined in equations (4) and (5). In this example, the set of reference samples is an up-sampled set of left reference samples and above reference samples, the left reference samples being immediately left of a left boundary of the current PU and the above reference samples being immediately above a top boundary of the current PU. In this example, the video coder may determine the set of reference samples by applying an up-sampling method to the left references samples and/or the above reference samples. For instance, the up-sampling method may up-sample whichever of the left reference samples or the above reference samples corresponds to the shorter of the left boundary of the current PU and the top boundary of the current PU, but not whichever is longer of the left reference samples of the current PU and the above reference samples of the current PU.

In some examples, pixels located at both longer and shorter sides of the PU may be up-sampled and the up-sampling ratios may be different. However, it may be required that the total number of pixels at two sides after up-sampling should be equal to $2^m$ (wherein m is an integer, m may be different for luma and chroma components). The value of m may be dependent on the block size K and L. In other words, m is dependent on a height and/or width of the PU. For example, a PU may be 8×16 and a video coder may up-sample reference samples such that there are 32 reference samples along a left side of the PU and 32 reference samples along a top side of the PU. In this example, m is equal to 6. In another example, a PU may be 4×8 and a video coder may up-sample reference samples such that there are 16 reference samples along a left side of PU and 16 reference samples along a top side of the PU. In this example, m is equal to 4.

Furthermore, in some examples of the eighth technique, when using equation (4) and equation (5) to calculate LM parameters, for both luma and chroma components, the pixels of the boundary at the shorter side of the non-square PU is up-sampled and the pixels of the longer boundary (i.e., max (K, L)) is sub-sampled such that the number of pixel in the up-sampled shorter boundary is equal to the number of pixels in the sub-sampled longer boundary. The up-sampling process can be a duplicator or an interpolated sampling. The sub-sampling process can be a decimation or an interpolated sampling.

Thus, in this example, as part of performing the LM prediction operation, a video coder may obtain a predictive chroma sample such that the predictive chroma sample is equal to a first parameter multiplied by a collocated luma sample, plus a second parameter, wherein the first parameter and the second parameter are defined as in equations (4) and (5). In this example, the set of reference samples is a union of an up-sampled set of reference samples and a sub-sampled set of reference samples, the up-sampled set of reference samples being an up-sampled version of whichever contains fewer samples of left reference samples and above reference samples. In this example, the sub-sampled set of reference samples is a sub-sampled version of whichever contains more samples of the left reference samples and the above reference samples. In this example, the left reference samples are immediately left of a left boundary of the current PU and the above reference samples are immediately above a top boundary of the current PU.

In some examples, for the examples of the eighth technique mentioned above, after the sub-sampling or up-sampling process, a down-sampling process (e.g., as described elsewhere in this disclosure) only for the luma component may be further applied to cover the case that the color format is not 4:4:4. Thus, based on a color format of the current picture being other than 4:4:4, a video coder may sub-sample or down-sample luma samples of the predictive block. In some examples, the two down-sampling processes of luma samples could be merged into one.

Furthermore, in some examples of the eighth technique, different ways of sub-sampling/up-sampling for boundary pixels may be applied. In one example, the sub-sampling/up-sampling method is dependent on the PU size (i.e., on the values of K and L). In another example, the methods for sub-sampling/up-sampling may be signaled in a sequence parameter set, a picture parameter set, a slice header, or in another syntax structure.

In some examples of the eighth technique, the up-sampling/down-sampling (or sub-sampling) is implemented in an implicit manner. In other words, the up-sampling or sub-sampling technique is determined implicitly. That is, the sum value, such as $\Sigma x_i \cdot y_i$, $\Sigma x_i$ and $\Sigma y_i$ in equation (4) and equation (5) of the left side boundary or/and upper side boundary, is multiplied or divided by a factor S. The value of S can be dependent on the ratio of the pixel number in the left side boundary or/and upper side boundary.

Thus, in this example, as part of performing the LM prediction operation to predict the predictive chroma block, a video coder may obtain a predictive chroma sample such that the predictive chroma sample is equal to a first parameter multiplied by a collocated luma sample, plus a second parameter, wherein the first LM parameter is equal to:

$$\alpha = \frac{I \cdot S \cdot \sum x_i \cdot y_i - S \cdot \sum x_i \cdot S \cdot \sum y_i}{I \cdot S \cdot \sum x_i \cdot x_i - S \cdot \sum x_i \cdot S \cdot \sum x_i},$$

where S is dependent on a ratio of a pixel number in a left boundary or/and an upper boundary of the non-square PU, I is the number of reference samples in a subset of samples in a left and top boundary of the current PU determined according to a sub-sampling method, $x_i$ is a sub-sampled reconstructed luma reference sample, and $y_i$ is a reconstructed chroma reference sample. In some examples, S=max(K, L)/min(K, L) for a K×L chroma block.

As described above, an enhancement multiple transform (EMT) scheme has been proposed that uses DST-VII, DCT-VIII, DST-I and DCT-V. Furthermore, as discussed above, whether EMT applies or not is controlled at the CU level using a flag, namely an EMT flag, for all TUs within a CU. For each TU within an EMT-enabled CU, the horizontal or vertical transform to be used is signaled by an index to a selected transform set, namely an EMT index.

However, controlling the EMT scheme as previously-proposed may not be efficient if the residual characteristics of each PU in a CU are different. For example, controlling the EMT scheme as previously-proposed may not be efficient for an intra-coded PU and an inter-coded PU within a CU. Hence, in accordance with a ninth technique of this disclosure, when EMT is enabled for one slice, picture, or sequence and one CU is split into two PUs in vertical direction (e.g., N×2N partition), the signaling of an EMT flag is modified in the following way: If the left PU is an intra-coded PU, the transform depth could be 0. In other words, the transform tree of the CU may have a depth of 0 or more. In this case, an EMT flag may be signaled at the CU level. If the transform depth is not 0, the EMT flag may be signaled at the PU level. Hence, EMT may or may not be enabled for each PU.

Furthermore, in accordance with the ninth technique of this disclosure, when EMT is enabled for one slice, picture, or sequence and when one CU is split into two PUs in a horizontal direction (e.g., 2N×N partition), the signaling of the EMT flag is modified in the following way: If the above PU is an intra-coded PU, the transform depth may be 0. In other words, the transform tree of the CU may have a depth of 0 or more. In this case, an EMT flag may be signaled at CU level. If the transform depth is not 0, the EMT flag may be signaled at the PU level. That is, each PU may have EMT enabled or not.

Thus, in accordance with the ninth technique, video encoder 20 may include, in a bitstream that comprises an encoded representation of video data, a first syntax element. The first syntax element indicates whether EMT is enabled for a particular CU that is partitioned into exactly two PUs along a boundary. In this example, whether the first syntax element is in the particular CU or a particular PU of the two PUs is dependent on a splitting direction of the PUs of the CU. Furthermore, in this example, based on EMT being enabled for a particular CU, for each respective TU of the particular CU, video encoder 20 may include, in the bitstream, a respective syntax element indicating a respective selected transform set for the respective TU. In this example, based on EMT being enabled for the particular CU, video encoder 20 may apply one or more transforms of the respective selected transform set to transform coefficients of the respective TU to obtain a respective transform block for the respective TU in the sample domain. In this example, video encoder 20 may include, in a bitstream that comprises an encoded representation of the video data, data representing one or more of the TUs of the CU. In this example, the boundary may be a horizontal boundary or the boundary may be a vertical boundary.

In a corresponding example, video decoder 30 may obtain a first syntax element. The first syntax element indicates whether EMT is enabled for a particular CU that is partitioned into exactly two PUs along a boundary. In this example, whether the first syntax element is in the particular CU or a particular PU of the two PUs is dependent on a splitting direction of the PUs of the CU. In this example, in response to determining that EMT is enabled for a particular CU, for each respective TU of the particular CU, video decoder 30 may obtain a respective syntax element indicating a respective selected transform set for the respective TU. Additionally, in response to determining that EMT is enabled for a particular CU, for each respective TU of the particular CU, video decoder 30 may apply an inverse of one or more transforms of the respective selected transform set to transform coefficients of the respective TU to obtain a respective transform block for the respective TU in the sample domain. In this example, video decoder 30 may reconstruct, based at least in part on the transform blocks for the TUs of the CU, a coding block of the CU. In this example, the boundary may be a horizontal boundary or the boundary may be a vertical boundary.

In accordance with a tenth technique of this disclosure, several transform tree structures may be applied for coding one slice, picture, or sequence. For example, in one example, transform tree structures are pre-defined. In some examples, for each picture, slice, largest coding unit, CU, or PU, video encoder 20 may signal the selected transform tree structure. Alternatively, in some examples, video decoder 30 may derive the selected transform tree from the coded information, such as prediction modes/partition sizes.

Thus, in accordance with the tenth technique, video encoder 20 may partition a CU of the video data into TUs of the CU based on a particular tree structure from among a plurality of predefined tree structures. In this example, a root node of the tree structure corresponds to a coding block of the CU. Furthermore, in this example, each respective non-root node of the tree structure corresponds to a respective block that is a partition of a block that corresponding to a parent node of the respective non-root node. In this example, leaf nodes of the tree structure correspond to the TUs of the CUs. Additionally, in this example, video encoder 20 includes, in a bitstream that comprises an encoded representation of the video data, data representing one or more of the TUs of the CU. In some examples, video encoder 20 may further include, in the bitstream, one or more syntax elements identifying the particular tree structure. In some examples, the one or more syntax elements that indicate the particular tree structure applicable to CUs is in one of: a picture, slice, LCU, CU, and PU. Furthermore, in some examples, as part of determining the CU is partitioned into the TUs, video encoder 20 determines the particular tree structure from coded information without explicitly signaling of the particular tree structure. In such examples, the coded information may comprise at least one of: prediction modes and partition sizes.

In a corresponding example, video decoder 30 may determine a CU of the video data is partitioned into TUs of the CU based on a particular tree structure from among a plurality of predefined tree structures. In this example, a root node of the tree structure corresponds to a coding block of the CU. Each respective non-root node of the tree structure corresponds to a respective block that is a partition of a block that corresponding to a parent node of the respective non-root node. In this example, leaf nodes of the tree structure correspond to the TUs of the CUs. Additionally, in this example, video decoder 30 may reconstruct, based on data for at least one of the TUs of the CU, the coding block of the CU. In some examples, video decoder 30 may obtain, from a bitstream that comprises encoded video data, one or more syntax elements identifying the particular tree structure. The one or more syntax elements that indicate the particular tree structure applicable to CUs in one of: a picture, slice, LCU, CU, and prediction unit. Furthermore, in some examples, as part of determining the CU is partitioned into the TUs, video decoder 30 may determine the particular tree structure from coded information without explicit signaling of the particular tree structure. The coded information may comprise at least one of: prediction modes and partition sizes.

In an eleventh example of this disclosure, transforms with size equal to 1×N and N×1 may be also applied to inter coded blocks. For instance, in one example, such TUs are only allowed for a specific transform depth, e.g., the highest transform depth. In some examples, such TUs are only allowed for specific coding blocks, such as CU size equal to 8×8. Furthermore, in some examples, the eleventh technique is only applicable for specific color component, such as luma.

Thus, in accordance with the eleventh technique, video encoder 20 may determine transform-domain data (e.g., transform coefficients) by applying a 1×N or N×1 transform to residual data of an inter coded block. In this example, video encoder 20 may include, in a bitstream that comprises an encoded representation of the video data, data representing the transform-domain data. In a corresponding example, video decoder 30 may determine sample-domain data by applying a 1×N or N×1 transform to transform coefficients of an inter coded block. In this example, video decoder 30 may reconstruct, based in part on the sample-domain data, a coding block of a CU of the video data. For example, video decoder 30 may add samples of the sample-domain data to corresponding samples of residual data to reconstruct the coding block of the CU. In some instances, for the above examples of the eleventh technique involving video encoder 20 and video decoder 30, 1×N and N×1 transforms are only allowed for a specific transform depth. Additionally, in some instances, for the above examples of the eleventh technique involving video encoder 20 and video decoder 30, 1×N and N×1 transforms are only allowed for a CUs of particular sizes.

In accordance with a twelfth technique of this disclosure, the asymmetric motion partitioning defined in HEVC for inter coded CUs is also applied to intra coded CUs. Partitioning intra predicted CUs into PUs asymmetrically may enable video encoder 20 to more accurately divide the CU into regions corresponding to different objects, which may increase compression performance. Thus, in accordance with an example of the twelfth technique, video encoder 20 may partition an intra predicted CU of the video data into PUs asymmetrically. In this example, video encoder 20 may determine a respective predictive block for each respective PU of the intra predicted CU. Furthermore, in this example, video encoder 20 may obtain residual data based on the predictive blocks for the PUs of the intra predicted CU and a coding block of the intra predicted CU. Additionally, in this example, video encoder 20 may include, in a bitstream that comprises an encoded representation of the video data, data representing the residual data.

In a corresponding example of the twelfth technique, video decoder 30 may determine an intra predicted CU of the video data is partitioned into PUs asymmetrically. In this example, video decoder 30 may determine a respective predictive block for each respective PU of the intra predicted CU. Additionally, in this example, video decoder 30 may reconstruct, based on the predictive blocks for the PUs of the intra predicted CU, a coding block of the intra predicted CU.

In accordance with a thirteenth technique of this disclosure, when one intra coded CU contains multiple PUs, each PU may have its own chroma prediction mode. In other words, a PU may have a first intra prediction mode (i.e., a luma prediction mode) and a second intra prediction mode (i.e., a chroma prediction mode). A video coder may use the luma prediction mode to determine the luma predictive block of the PU and may use the chroma prediction mode to determine the chroma predictive blocks of the PU. Thus, in accordance with the $13^{th}$ technique, video encoder 20 may determine an intra predicted CU of the video data has at least a first PU and a second PU. In this example, the first PU and the second PU have different chroma prediction modes. Furthermore, in this example, video encoder 20 may include, in a bitstream that comprises an encoded representation of the video data, data representing residual data based at least on predictive blocks of the first PU and the second PU and a coding block of the CU.

In a corresponding example of the $13^{th}$ technique, video decoder 30 may determine an intra predicted CU of the video data has at least a first PU and a second PU. In this example, the first PU and the second PU have different chroma prediction modes. Furthermore, in this example, video decoder 30 may reconstruct, based at least on predictive blocks of the first PU and the second PU, a coding block of the CU.

Furthermore, in accordance with an example of the $13^{th}$ technique, the chroma intra prediction modes of the previously coded PU may be considered for coding the following PU. This, a video coder may determine, based at least in part on a chroma prediction mode of a PU prior to a current PU in coding order, a chroma prediction mode of the current PU. For instance, a video coder may use the chroma intra prediction modes of the previously coded PU in context modeling for chroma intra prediction mode of a current PU. Context modeling may comprise identification of a coding context for context-adaptive entropy coding. A coding context may indicate probabilities of a value In another example, a video coder may add the chroma intra prediction modes of the previously coded PU as one new candidate for the chroma intra prediction mode list.

In some examples of the $13^{th}$ technique, one flag may be firstly coded at a CU level to indicate whether all PUs share the same chroma intra prediction modes. Thus, in this example, video encoder 20 may include, in the bitstream, a syntax element indicating whether all PUs of the intra predicted CU share the same chroma intra prediction modes. Similarly, video encoder 20 may obtain, from a bitstream comprising an encoded representation of the video data, a syntax element indicating whether all PUs of the intra predicted CU share the same chroma intra prediction modes.

Furthermore, in some examples of the thirteenth technique, all the chroma PUs within one CU are restricted to follow the same transform tree. By restricting all of the chroma PUs within one CU to follow the same transform tree, it may be unnecessary for video encoder 20 to include data in the bitstream indicating the structures of the different transform trees for different chroma PUs. Thus, video encoder 20 may generate a bitstream that conforms to a video coding standard that restricts a video encoder from generating bitstreams in which chroma PUs of the CU have differently structured transform trees. Similarly, video decoder 30 may obtain a bitstream comprising an encoded representation of the video data. In this example, the bitstream conforms to a video coding standard that restricts a video encoder from generating bitstreams in which chroma PUs of the CU have differently structured transform trees.

In a fourteenth example of this disclosure, when one intra coded CU contains multiple rectangular PUs, a video coder may apply a mode-dependent scan. A mode-dependent scan is a scanning order used to scan transform coefficients in a 2-dimensional coefficient block for a TU into a 1-dimensional coefficient vector for entropy encoding. Video encoder 20 may select, based on which intra prediction mode is used for a PU corresponding to the TU, a mode-dependent scan to use for scanning transform coefficients of the TU from among a plurality of available scanning orders. The PU corresponding to the TU may be coextensive with the TU or contain the area associated with the TU. Using a mode-dependent scan may better arrange the transform coefficients for CABAC. In HEVC, mode-dependent scans are only allowed for 8×8 and 4×4 TUs.

Thus, in accordance with an example of the fourteenth technique, video encoder 20 may obtain residual data based on 2-dimensional transform coefficient blocks. In this example, video encoder 20 may obtain predictive blocks for each of a plurality of rectangular PUs of an intra predicted CU of the video data. Furthermore, in this example, video encoder 20 may apply a mode-dependent scan to arrange the 2-dimensional blocks of transform coefficients into 1-dimensional arrays of transform coefficients corresponding to TUs of the CU. In this example, video encoder 20 may include, in a bitstream that comprises an encoded representation of the video data, data representing the 1-dimensional arrays of transform coefficients.

In a similar example, video decoder 30 may apply a mode-dependent scan to arrange a 1-dimensional array of transform coefficients into 2-dimensional transform coefficient blocks corresponding to TUs of an intra predicted CU of the video data. In this example, the intra predicted CU has multiple rectangular PUs. Furthermore, in this example, video decoder 30 may obtain residual data based on the transform coefficient blocks. Additionally, video decoder 30 may obtain predictive blocks for each of the PUs. In this example, video decoder 30 may reconstruct, based on the residual data and the predictive blocks, a coding block of the CU.

In one example of the fourteenth technique, application of the mode-dependent scan is restricted to certain TU sizes, such as 8×4 or 4×8. In some examples, the mode-dependent scan is restricted to certain CU sizes, such as only 8×8, or 8×8 and 16×16. Furthermore, in some examples, the rule of the mapping between intra prediction mode and scan pattern used for TU sizes equal to 8×8 and 4×4 in HEVC may be reused. In some examples, different mapping functions may be applied which is dependent on the rectangular TU sizes.

As described elsewhere in this disclosure, VCEG-AZ07 proposed using a 4-tap intra interpolation filter to improve accuracy of directional intra prediction relative to the 2-tap intra interpolation filter used in HEVC. However, VCEG-AZ07 does not indicate how a video coder selects a 4-tap intra interpolation filter for a non-square intra coded PU. Rather, VCEG-AZ07 specifies that a video coder uses cubic interpolation filters for 4×4 and 8×8 blocks, and uses Gaussian interpolation filters for 16×16 and larger blocks. In a fifteenth technique of this disclosure, for a non-square intra coded PU with size equal to K×L, when determining a 4-tap filter type or a scan pattern as described elsewhere in this disclosure with respect to four-tap intra interpolation filters, the non-square intra coded PU is treated as a transform size equal to N×N, wherein $\log 2(N*N)=((\log 2(K)+\log 2(L))>>1)<<1)$, wherein $\log 2$ is the binary logarithm, and >> and << are the logic right and left shift, respectively.

Thus, in an example of the fifteenth technique, video encoder 20 may determine a 4-tap interpolation filter for a non-square intra coded PU of a CU of the video data. Furthermore, in this example, video encoder 20 may apply the determined 4-tap interpolation filter as part of obtaining a predictive block for the non-square intra coded PU. For instance, video encoder 20 may apply the 4-tap filter when determining a value of a reference sample that lies between two integer-position reference samples (i.e., reference samples at integer coordinates relative to a top-left sample of a picture). Additionally, in this example, video encoder 20 may include, in a bitstream that comprises an encoded representation of the video data, data representing residual data based at least in part on a predictive block for the non-square PU and a coding block of the CU. In this example, as part of determining the 4-tap interpolation filter, video encoder 20 may determine the 4-tap interpolation filter based on a size of a square PU, wherein the size of the square PU is based on the height and width of the non-square intra coded PU.

In a corresponding example of the fifteenth technique, video decoder 30 may determine a 4-tap interpolation filter for a non-square intra coded PU of a CU of the video data. Additionally, in this example, video decoder 30 may apply the determined 4-tap interpolation filter as part of obtaining a predictive block for the non-square intra coded PU. Furthermore, video decoder 30 may reconstruct, based at least in part on a predictive block for the non-square PU, a coding block of the CU. In this example, as part of determining the 4-tap interpolation filter, video decoder 30 may determine the 4-tap interpolation filter based on a size of a square PU, wherein the size of the square PU is based on the height and width of the non-square intra coded PU.

In some examples of the fifteenth technique, a new 4-tap filter may be applied for non-square intra coded PUs. That is, even for non-square intra coded PUs, a 4-tap filter may be applied and this filter may be different from what is defined for square PUs. Furthermore, in some examples of the fifteenth technique, a different mapping table between the intra prediction mode and scan pattern index may be applied for non-square intra coded PUs.

A K×L transform block is treated as a transform size equal to N×N wherein $\log 2(N*N)=(\log 2(K)+\log 2(L)+1)$. Thus, the selection of a scan pattern for the K×L transform block may be the same as the N×N block.

As discussed above, transform blocks in HEVC are of size N×N, where $N=2^m$ and m is an integer. Furthermore, in HEVC, a video encoder applies a 2-dimensional N×N transform to a transform block to generate transform coefficients. More specifically, the video encoder applies the 2-dimensional N×N transform by applying an N-point 1-dimensional transform to each row of the transform block and each column of the transform block separately. Applying the transform in this way results in an N×N block of transform coefficients.

In HEVC, the video encoder may apply an N-point 1-dimensional DCT transform to an i-th row or column of samples of the transform block $w_i$ by calculating:

$$w_i = \sum_{j=0}^{N-1} u_j c_{ij} \tag{18}$$

In the equation above, $i=0, \ldots, N-1$. Elements $c_{ij}$ of the DCT transform matrix C are defined as:

$$c_{ij} = \frac{A \cdot \cos\left[\frac{\pi}{2}\left(j + \frac{1}{2}\right)i\right]}{\sqrt{N}} \tag{19}$$

In the equation above, $i,j = 0, \ldots, N-1$ and where A is equal to 1 and $2^{1/2}$ for $i=0$ and $i>0$ respectively.

In equation (19), $$A \cdot \cos\left[\frac{\pi}{2}\left(j + \frac{1}{2}\right)i\right]$$

let be denoted by $X_{ij}$. Therefore, equation (18) can be rewritten as $$w_i = \sum_{j=0}^{N-1} \frac{u_j X_{ij}}{\sqrt{N}}.$$

Because the video encoder applies the 1-dimensional DCT transform in both the horizontal and vertical directions, the transform coefficient $w_i$ can ultimately be rewritten as:

$$w_i = \sum_{k=0}^{N-1} \left(\left(\sum_{j=0}^{N-1} \frac{u_j X_{ij}}{\sqrt{N}}\right) \cdot \frac{X_{ik}}{\sqrt{N}}\right) \tag{20}$$

This can further be rewritten as:

$$\frac{\sum_{k=0}^{N-1}\left(\left(\sum_{j=0}^{N-1} u_j \cdot X_{ij}\right) \cdot X_{ik}\right)}{\sqrt{N} \cdot \sqrt{N}} \tag{21}$$

Thus, the transform can ultimately be considered as having a "normalization factor" of $\sqrt{N}\cdot\sqrt{N}$. Because $N=2^m$, $\sqrt{N}\cdot\sqrt{N}$ is also a power of 2. Hence, the value of a transform coefficient can be implemented by a right-shift operation instead of a division operation. As discussed elsewhere in this disclosure, using right-shift operations instead of division operations may reduce complexity and improve coding speed.

However, problems may arise when reusing equation (19) with a non-square transform block of a TU. For a 2-D transform (including both horizontal and vertical transforms), considering a K*L transform, the normalization factor would be ($\sqrt{K}*\sqrt{L}$). If N is defined as the value satisfying the equation log 2(N*N)=((log 2(K)+log 2(L))>>1)<<1), the ratio of utilized normalization factor ($\sqrt{N}*\sqrt{N}$) and the real normalization factor ($\sqrt{K}*\sqrt{L}$) would be $1/\sqrt{2}$. In other words, when reusing the same normalization factor derived from an N×N transform block in the quantization process, the energy (i.e., the sum of squares of quantized transform coefficients) is changed by $\sqrt{2}$.

A sixteenth technique of this disclosure may address this issue. For instance, in the sixteenth technique of this disclosure, for a non-square transform block with size equal to K×L, when (log 2(K)+log 2(L)) is odd, the transform and quantization process in HEVC is kept unchanged and the non-square transform block is treated as a transform block with size equal to N×N, wherein log 2(N*N)=((log 2(K)+log 2(L))>>1)<<1). In other words, based on (log 2(K)+log 2(L)) being odd, video encoder 20 may determine a value N such that log 2(N*N)=((log 2(K)+log 2(L))>>1)<<1). Video encoder 20 may then use elements of a DCT transform matrix C that are defined according to equation (19) using the determined value of N in the "normalization factor." Thus, video encoder 20 may continue to use a right-shift operation for the division by the "normalization factor" in equation (21).

Furthermore, in accordance with the sixteenth technique of this disclosure, after the transform process and before the quantization process, the transform coefficients are modified, multiplied by a factor of $\sqrt{2}$. In other words, after applying the transform to the non-square transform block to generate a coefficient block, video encoder 20 multiplies each transform coefficient of the coefficient block by a factor of $\sqrt{2}$. This is because the ratio of the used normalization factor (i.e., ($\sqrt{N}*\sqrt{N}$)) to the real normalization factor (i.e., ($\sqrt{K}*\sqrt{L}$)) is equal to $$\frac{1}{\sqrt{2}}.$$

For example, let K=8 and L=4. In this example, log 2(4*4)=((log 2(8)+log 2(4))>>1)<<1), so $$N = 4 \cdot \frac{\sqrt{8} \times \sqrt{4}}{\sqrt{4} \times \sqrt{4}}$$

is equal to $$\frac{\sqrt{8 \times 4}}{\sqrt{4 \times 4}},$$

which is equal to $$\frac{\sqrt{32}}{\sqrt{16}},$$

which is equal to $\sqrt{2}$. Note that for values of K and L where (log 2(K)+log 2(L)) is even, the ratio of the used normalization factor (i.e., ($\sqrt{N}*\sqrt{N}$)) to the real normalization factor (i.e., ($\sqrt{K}*\sqrt{L}$)) is equal to 1. Therefore, when (log 2(K)+log 2(L)) is even, there may be no need for video encoder 20 to multiply the transform coefficients by the factor of $\sqrt{2}$.

After the de-quantization process, the de-quantized coefficients are further modified, divided by a factor of $\sqrt{2}$. Multiplying the transform coefficients by $\sqrt{2}$ before quantization and dividing the transform coefficients by $\sqrt{2}$ may preserve information that would otherwise be lost in the quantization process. Preserving this information may ensure more accurate reconstruction of the original transform block.

In another example of the sixteenth technique, the transform and quantization process in HEVC is kept unchanged and it is treated as a transform size equal to N×N wherein log 2(N*N)=(log 2(K)+log 2(L)+1). After transform and before the quantization process, the transform coefficients are modified, divided by a factor of $\sqrt{2}$. After the de-quantization process, the de-quantized coefficients are further modified, multiplied by a factor of $\sqrt{2}$.

In the examples of the sixteenth technique above, the factor of $\sqrt{2}$ may be represented by its approximation. For example, the process of $(x*\sqrt{2})$ can be approximated by $(x*181)>>7$, wherein $>>$ represents a right shift operation. The process of $(x/\sqrt{2})$ can be approximated by $(x*\sqrt{2})/2$, i.e., $(x*181)>>8$, wherein $>>$ represents a right shift operation.

Thus, in the example of the sixteenth technique presented above, video encoder 20 may apply a transform to a transform block of a non-square TU of a CU to generate a block of transform coefficients. Additionally, video encoder 20 may modify the transform coefficients such that each respective transform coefficient of a block of transform coefficients is based on the respective transform coefficient multiplied by an approximation of $\sqrt{2}$. In this example, after modifying the transform coefficients, video encoder 20 may apply a quantization process to the modified transform coefficients of the non-square PU of the CU. Furthermore, in this example, video encoder 20 may include, in a bitstream comprising an encoded representation of the video data, data based on the quantized transform coefficients. In some examples, as part of applying the transform to the transform block of the non-square TU, video encoder 20 may apply, to the dequantized transform coefficients, a transform having size N×N, where log 2(N*N)=((log 2(K)+log 2(L))>>1)<<1).

In a corresponding example, video decoder 30 may apply a dequantization process to transform coefficients of a non-square PU of a CU of the video data. In this example, after applying the dequantization process to the transform coefficients, video decoder 30 may modify the dequantized transform coefficients such that each respective dequantized transform coefficient of the dequantized transform coefficients based on the respective dequantized transform coefficient divided by an approximation of $\sqrt{2}$. In some examples, as part of applying the inverse transform to the modified dequantized transform coefficients comprises, video decoder 30 may apply, to the modified dequantized transform coefficients, a transform having size N×N, where log 2(N*N)=((log 2(K)+log 2(L))>>1)<<1).

In HEVC, video encoder 20 may calculate a quantized transform coefficient (i.e., a level) using the following equation:

$$\text{level} = \left( (coeff \times f_{QP\%6} + \text{offset}_Q) \gg \frac{QP}{6} \right) \gg \text{shift2} \quad (22)$$

where coeff is the transform coefficient, $\text{offset}_q$ is an offset value, QP is a quantization parameter, shift 2=29−M−B, B is the bit depth, M=$\log_2$(N), and $$f=[f_0, \ldots f_5]^T=[26214,23302,20560,18396,16384, 14564]^T \quad (23)$$

Furthermore, in HEVC, video decoder 30 may inverse quantize a quantized transform coefficient using the following equation:

$$\text{coeff}_Q = \left( \left( \text{level} \times \left( g_{QP\%6} \ll \frac{QP}{6} \right) \right) + \text{offset}_{IQ} \right) \gg \text{shift1} \quad (24)$$

In equation (24), $\text{coeff}_Q$ is the inverse quantized transform coefficient, level is the quantized transform coefficient, $\text{offset}_{IQ}$ is an offset value=1<<(M−10+B), shift1=(M−9+B), and g is defined as shown in equation (25), below:

$$g=[f_0, \ldots f_5]^T=[40,45,51,57,64,72]^T \quad (25)$$

In accordance with a technique of this disclosure, video encoder 20 may use different quantization matrixes (i.e., versions of f), depending on whether ($\log_2$(W)+$\log_2$(H)) is odd or even. Similarly, video decoder 30 may use different inverse quantization matrixes (i.e., versions of g), depending on whether ($\log_2$(W)+$\log_2$(H)) is odd or even. An example of g is defined as follows:

[40,45,51,57,64,72], // when the sum is even
[7240,8145,9231,10317,11584,13032]// when the sum is odd Note that each corresponding value of g for the case that it is even is multiplied by 181. In this example, there is no need to perform the multiplication or division processes before or after quantization stages since the compensation of $\sqrt{2}$ has already been considered in g.

Furthermore, in equations (22) and (24), the value selected in quantization matrixes f and g is selected based on the quantization parameter QP. The selected values in quantization matrixes f and g may be referred to herein as quantization matrix coefficients. In some examples of this disclosure, video encoder 20 and video decoder 30 may select quantization matrix coefficients based on the quantization parameter and also based on whether (log 2(W)+log 2(H)) is odd or even.

As briefly described above and illustrated in FIG. 2A and FIG. 2B, in HEVC, a video coder always processes TUs of a CU in a recursive z-scan order. Thus, as shown in FIG. 2A, data corresponding to transform coefficients of TU "a" appear in the bitstream before data corresponding to transform coefficients of TU "b", and so on. A seventeenth technique of this disclosure proposes that for CUs coded with inter mode or comb_mode or intra mode but with non-square partitions, the coding order of transform coefficients is dependent on a PU coding order instead of always using the recursive z-scan. In some examples of the seventeenth technique, all coefficients within one PU shall be coded together before coding the coefficients in another PU. Thus, for video encoder 20, all coefficients within one of the PUs of the CU are encoded together before encoding coefficients of another one of the PUs of the CU. Similarly, in this example, for video decoder 30, all coefficients within one PU of a CU are decoded together before decoding coefficients of another one of the PUs of the CU.

In this example, the transform coefficients of a PU are transform coefficients of TUs whose transform blocks are within an area of a prediction block of the PU. For example, let the coordinates of a top-left corner of a prediction block of a PU of a 16×16 CU be (0,0) relative to a top-left corner of a coding block of the CU and let the coordinates of the bottom-right corner of the prediction block of the PU be (7, 15). Furthermore, in this example, let the coordinates of a top-left corner of a transform block of a TU of the CU be (4, 0) and let the coordinates of a bottom-right corner of the transform block of the TU be (7,15). In this example, transform coefficients of the TU are transform coefficients of the PU. However, in this example, if the top-left corner of the transform block of the TU is (8, 0) and the bottom-right corner of the transform block of the TU is (15, 7), the transform coefficients of the TU are not transform coefficients of the PU.

For example, with respect to FIG. 2A, suppose that CU 40 has two PUs which partition CU 40 vertically through the center of CU 40. Thus, the transform coefficients of a first PU of CU 40 include the transform coefficients of TUs "a," "b," "c," "d," and "f". The transform coefficients of a second PU of CU 40 include the transform coefficients of TUs "e," "g," "h," "i," and "j". In this example, video encoder 20 may include data representing transform coefficients of TU "e" following data representing transform coefficients of TU "f". In contrast, in HEVC, the data representing transform coefficients of TU "f" follows the data representing transform coefficients of TU "e", regardless of the shape and size of the PUs of CU 40. In other words, when one PU contains multiple TUs, the recursive Z-scan with depth-first traversal is applied for coding these coefficients within the PU. Taking FIG. 2 as an example, if the partition size is equal to N×2N, the coding order may be a, b, c, d, f, e, g, h, i, j.

Some examples of the seventeenth technique are only applicable when the transform depth is unequal to 0, i.e., transform size no larger than PU sizes. Note that the AMP mentioned above may include other asymmetric partitions, not only the four cases defined in HEVC.

As mentioned briefly above, the IC design in HEVC only supports square PUs. Prior to the present disclosure, how to derive the IC parameters a and b for non-square PUs was unknown. An eighteenth technique of this disclosure enables IC to be used with non-square PUs. For instance, video encoder 20 may use IC to generate a non-square predictive block of a current PU of a picture of the video data. Additionally, video encoder 20 may generate residual data based on the predictive block. For example, video encoder 20 may generate the residual data such that each respective sample of the residual data is equal to a difference between a respective sample of a coding block of the current CU and a corresponding respective sample of the predictive block. Furthermore, video encoder 20 may output a bitstream that includes data based on the residual data. For example, video encoder 20 may apply a transform to the residual data to generate a coefficient block, quantize coefficients of the coefficient block, and include in the bitstream one or more syntax elements representing each of the quantized coefficients. In this example, video encoder 20 may entropy encode one or more of the syntax elements for each quantized coefficient. In other examples, video encoder 20 may skip application of the transform and/or quantization.

Furthermore, in accordance with one or more of the examples related to IC provided above, video decoder 30 may use IC to generate a non-square predictive block of a current PU of a current CU of a picture of the video data. Additionally, video decoder 30 may reconstruct, based on the predictive block, a block (e.g., a coding block) of the picture. For example, video decoder 30 may reconstruct samples of the block by adding samples of the predictive block to corresponding residual samples.

In the examples of the eighteenth technique, as part of using IC to generate a non-square predictive block, a video coder (e.g., video encoder 20 and/or video decoder 30) may determine a sample of the predictive block as:

$$p(i,j)=a*r(i+dv_x,j+dv_y+b), \text{ where } (i,j) \in PU_c,$$

where $PU_c$ is the current PU, (i, j) is the coordinate of pixels in the predictive block, $(dv_x, dv_y)$ is a vector (e.g., disparity vector) of PUG. p(i, j) is a prediction of $PU_c$, r is an inter-view reference picture, a is a first IC parameter and b is a second IC parameter. Furthermore, as part of using IC to generate the non-square predictive block, the video coder may calculate the first IC parameter as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}.$$

Additionally, the video coder may calculate the second IC parameter as:

$$b = \frac{\sum_{i=0}^{2N-1} Rec_{neig}(i) - a \cdot \sum_{i=0}^{2N-1} Rec_{refneig}(i)}{2N},$$

In the equations above, $Rec_{new}$ and $Rec_{refneig}$ denote a neighboring pixel set of the current CU and a reference block respectively, 2N denotes the pixel number in $Rec_{neig}$ and $Rec_{refneig}$, and the current CU has a size equal to N×N. Other examples may use variations on the formulas indicated above.

Furthermore, in examples of the eighteenth technique, when IC is enabled for one non-square PU with size equal to K×L (K is unequal to L), the parameters could be derived in various ways. For example, when using the equation (16) and equation (17) to calculate linear model parameters, pixels located at both longer and shorter sides of the PU may be sub-sampled with different ways, such as different sub-sampling ratios. However, it may be required that the total number of pixels at two sides together should be equal to $2^m$ (wherein m is an integer, and its value may be dependent on the block size). Thus, in this example, $Rec_{neigh}$ is a subset of pixels immediately above the current CU and immediately left of the current CU, $Rec_{refneigh}$ is a subset of pixels immediately above the reference block and immediately left of the reference block, and a total number of pixels in $Rec_{neigh}$ and $Rec_{refneigh}$ is equal to $2^m$, where m is an integer. The sub-sampling process can be a decimation or an interpolated sampling.

In another example of deriving the parameters for IC, when using the equation (16) and equation (17) to calculate linear model parameters, the pixels of the boundary at the shorter side of the non-square PU is up-sampled such that the number of pixels in the up-sampled boundary is equal to the number of pixels in the longer boundary (i.e., max(K, L)). The up-sampling process can be a duplicator or an interpolated sampling. Thus, in this example, as part of using IC to generate a predictive block, a video coder may generate $Rec_{neigh}$ such that $Rec_{neigh}$ includes up-sampled pixels in whichever is shorter of a left side and a top side of the current CU. Additionally, in this example, the video coder may generate $\text{Rec}_{refneigh}$ such that $\text{Rec}_{refneigh}$ includes up-sampled pixels in whichever is shorter of the left side and the top side of the reference block Alternatively, pixels located at both longer and short sides of the PU may be up-sampled and the up-sampling ratios may be different. Thus, in this example, as part of using IC to generate a predictive block, a video coder may generate $\text{Rec}_{neigh}$ such that $\text{Rec}_{neigh}$ includes up-sampled pixels in whichever is longer of the left side and the top side of the current CU. Additionally, the video coder may generate $\text{Rec}_{refneigh}$ such that $\text{Rec}_{refneigh}$ includes up-sampled pixels in whichever is longer of the left side and the top side of the reference block. However, it may be required that the total number of pixels at two sides together should be equal to $2^m$ (wherein m is an integer, m may be different for luma and chroma components).

Furthermore, in some examples of deriving the parameters for IC, different ways of sub-sampling/up-sampling for boundary pixels may be applied. In one example, the sub-sampling/up-sampling method is dependent on the PU size (i.e., on the values of K and L). Thus, a video coder may determine, based on a size of the current PU, a sub-sampling method or up-sampling method to use to generate $\text{Rec}_{neigh}$ and $\text{Rec}_{refneigh}$. In another example, the methods for sub-sampling/up-sampling may be signaled in sequence parameter set, picture parameter set, and/or slice header. Thus, in some examples, video encoder 20 may include, in a bitstream, and video decoder 30 may obtain, from the bitstream, a syntax element indicating a sub-sampling method to use to generate $\text{Rec}_{neigh}$ and $\text{Rec}_{refneigh}$. In some examples, video encoder 20 may include, in a bitstream, and video decoder 30 may obtain, from the bitstream, a syntax element indicating an up-sampling method to use to generate the up-sampled pixels.

In some examples of deriving the parameters for IC, the up-sampling/down-sampling (or sub-sampling) is implemented in an implicit manner. For instance, the sum value in equation (16) and equation (17) of the left side boundary or/and upper side boundary, may be multiplied or divided by a factor S. The value of S can be dependent on the ratio of the pixel number in the left side boundary or/and upper side boundary.

In some examples of the eighteenth technique, the same sub-sampling/up-sampling method shall also be applied to the boundary pixels of the reference block (i.e., $\text{Rec}_{refneigh}$). For example, decimation may be used for sub-sampling both $\text{Rec}_{neigh}$ and $\text{Rec}_{refneigh}$.

Furthermore, in accordance with particular techniques of this disclosure, when LM is enabled for a square PU, the luma and chroma boundary pixels may be firstly sub-sampled to derive the parameters e.g. using equations (16) and (17). The sub-sampling method may be predefined or signaled in a sequence parameter set, a picture parameter set or a slice header. The sub-sampling method may be dependent on prediction unit size.

Thus, a video coder (e.g., video encoder 20 or video decoder 30) may perform a linear model prediction operation to predict a predictive chroma block for a current PU from sub-sampled reconstructed luma samples of the PU. Additionally, the video coder may reconstruct, based in part on the predictive chroma block, the block of the picture. As part of performing the linear model prediction operation, the video coder may obtain a predictive chroma sample such that the predictive chroma sample is equal to a first parameter multiplied by a collocated luma sample, plus a second parameter, wherein the first parameter is equal to:

$$\alpha = \frac{I \sum x_i \cdot y_i - \sum x_i \cdot \sum y_i}{I \sum x_i \cdot x_i - \sum x_i \cdot \sum x_i}$$

and the second parameter is equal to:

$$\beta = (\Sigma y_i - \alpha \cdot \Sigma x_i)/I.$$

In the equations above, I is the number of reference samples in a subset of samples in a left and top boundary of the current PU determined according to a sub-sampling method, $x_i$ is a sub-sampled reconstructed luma reference sample, $y_i$ is a reconstructed chroma reference sample. In some instances of this example, video encoder 20 may include, in a bitstream, and video decoder 30 may obtain, from the bitstream, a syntax element indicating the sub-sampling method. In some instances of this example, video encoder 20 and video decoder 30 may determine, based on a size of the current PU, the sub-sampling method.

Various examples have been described. Particular examples of this disclosure may be used separately or in combination with one another.

Figure 24:
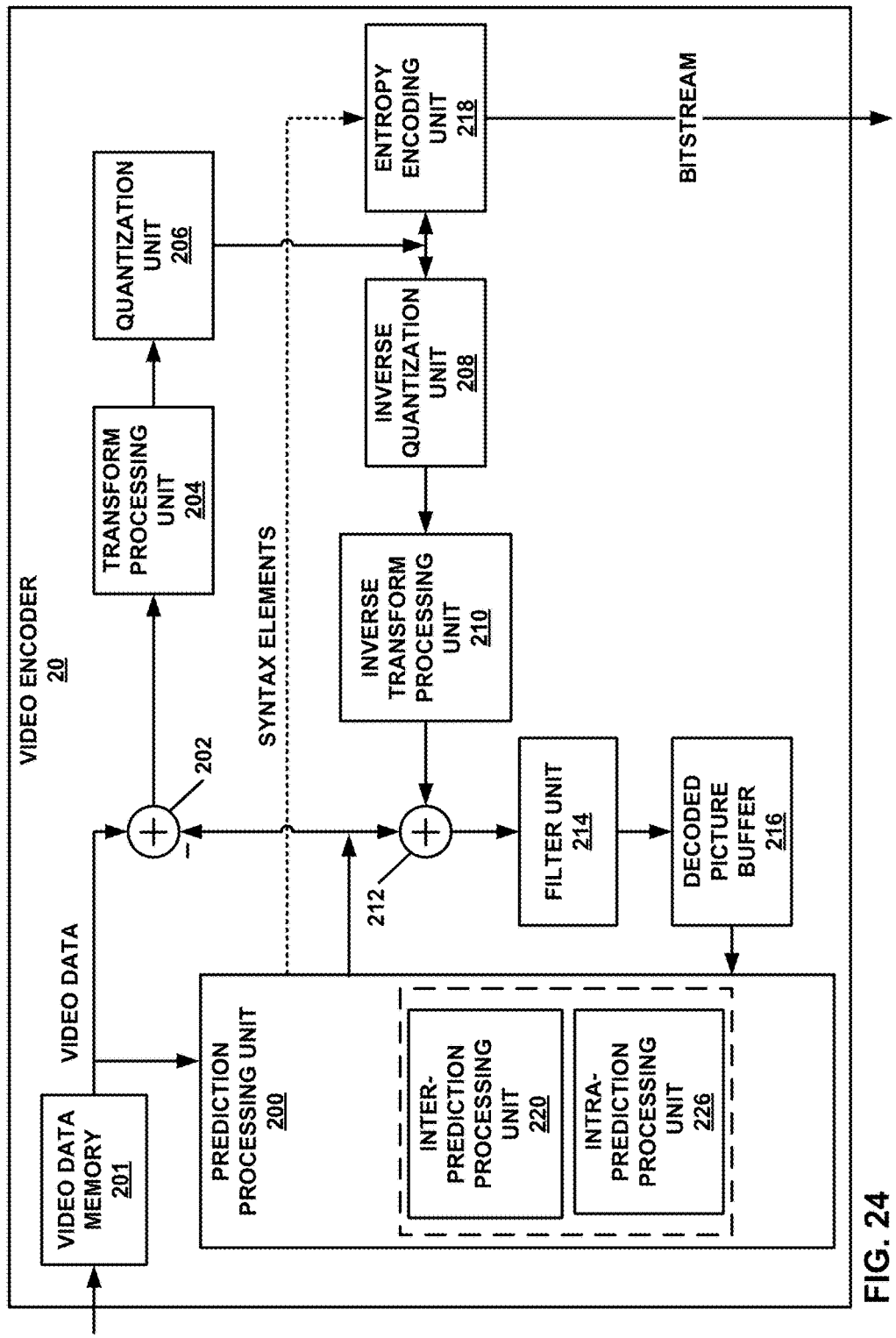
FIG. 24 is a block diagram illustrating an example video encoder that may implement the techniques of this disclosure.

FIG. 24 is a block diagram illustrating an example video encoder 20 that may implement techniques of this disclosure. FIG. 24 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 includes processing circuitry, and video encoder 20 is configured to perform one or more of the example techniques described in this disclosure. Such processing circuitry may include fixed function and/or programmable circuitry. For instance, video encoder 20 includes integrated circuitry, and the various units illustrated in FIG. 24 may be formed as hardware circuit blocks that are interconnected with a circuit bus. These hardware circuit blocks may be separate circuit blocks or two or more of the units may be combined into a common hardware circuit block. The hardware circuit blocks may be formed as combinations of electronic components that form operation blocks such as arithmetic logic units (ALUs), elementary function units (EFUs), as well as logic blocks such as AND, OR, NAND, NOR, XOR, XNOR, and other similar logic blocks.

In the example of FIG. 24, video encoder 20 includes a prediction processing unit 200, video data memory 201, a residual generation unit 202, a transform processing unit 204, a quantization unit 206, an inverse quantization unit 208, an inverse transform processing unit 210, a reconstruction unit 212, a filter unit 214, a decoded picture buffer 216, and an entropy encoding unit 218. Prediction processing unit 200 includes an inter-prediction processing unit 220 and an intra-prediction processing unit 226. Inter-prediction processing unit 220 may include a motion estimation unit and a motion compensation unit (not shown). In some examples, prediction processing unit 200 performs the illumination compensation techniques of this disclosure. In some examples, prediction processing unit 200 performs the LM techniques of this disclosure to generate non-square chroma predictive blocks. Furthermore, in some examples, prediction processing unit 200 performs the IC techniques of this disclosure to generate non-square predictive blocks.

Video data memory 201 may be configured to store video data to be encoded by the components of video encoder 20. The video data stored in video data memory 201 may be obtained, for example, from video source 18 (FIG. 1). Decoded picture buffer 216 may be a reference picture memory that stores reference video data for use in encoding video data by video encoder 20, e.g., in intra- or inter-coding modes. Video data memory 201 and decoded picture buffer 216 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 201 and decoded picture buffer 216 may be provided by the same memory device or separate memory devices. In various examples, video data memory 201 may be on-chip with other components of video encoder 20, or off-chip relative to those components.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 200 may perform quad-tree partitioning to divide the CTBs of the CTU into progressively-smaller blocks. The smaller block may be coding blocks of CUs. For example, prediction processing unit 200 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 200 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 220 may generate predictive data for a PU by performing inter prediction on each PU of a CU. The predictive data for the PU may include predictive blocks of the PU and motion information for the PU. Inter-prediction processing unit 220 may perform different operations for a PU of a CU depending on whether the PU is in an I slice, a P slice, or a B slice. In an I slice, all PUs are intra predicted. Hence, if the PU is in an I slice, inter-prediction processing unit 220 does not perform inter prediction on the PU. Thus, for blocks encoded in I-mode, the predicted block is formed using spatial prediction from previously-encoded neighboring blocks within the same frame. If a PU is in a P slice, inter-prediction processing unit 220 may use uni-directional inter prediction to generate a predictive block of the PU. If a PU is in a B slice, inter-prediction processing unit 220 may use uni-directional or bi-directional inter prediction to generate a predictive block of the PU.

Intra-prediction processing unit 226 may generate predictive data for a PU by performing intra prediction on the PU. The predictive data for the PU may include predictive blocks of the PU and various syntax elements. Intra-prediction processing unit 226 may perform intra prediction on PUs in I slices, P slices, and B slices.

To perform intra prediction on a PU, intra-prediction processing unit 226 may use multiple intra prediction modes to generate multiple sets of predictive data for the PU. Intra-prediction processing unit 226 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 226 may use various numbers of intra prediction modes, e.g., 33 directional intra prediction modes. In some examples, the number of intra prediction modes may depend on the size of the region associated with the PU.

Prediction processing unit 200 may select the predictive data for PUs of a CU from among the predictive data generated by inter-prediction processing unit 220 for the PUs or the predictive data generated by intra-prediction processing unit 226 for the PUs. In some examples, prediction processing unit 200 selects the predictive data for the PUs of the CU based on rate/distortion metrics of the sets of predictive data. The predictive blocks of the selected predictive data may be referred to herein as the selected predictive blocks.

Residual generation unit 202 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 202 may generate the residual blocks of the CU such that each sample in the residual blocks has a value equal to a difference between a sample in a coding block of the CU and a corresponding sample in a corresponding selected predictive block of a PU of the CU.

Transform processing unit 204 may perform partitioning (e.g., quad-tree partitioning) to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

In some examples, transform processing unit 204 may perform the techniques of this disclosure for determining a residual tree structure that includes nodes having two (and/or 4) child nodes. For example, video data memory 201 may receive video data and transform processing unit 204 may partition a CU of the video data into TUs of the CU based on a tree structure. In this example, as part of partitioning the CU into TUs of the CU based on the tree structure, transform processing unit 204 may determine that a node in the tree structure has exactly two child nodes in the tree structure. In some instances, transform processing unit 204 may further determine that a second node in the tree structure has exactly four child nodes in the tree structure. For at least one of the TUs of the CU, transform processing unit 204 may apply a transform to a residual block for the TU to generate a block of transform coefficients for the TU.

Transform processing unit 204 may generate transform coefficient blocks for each TU of a CU by applying one or more transforms to the transform blocks of the TU. Transform processing unit 204 may apply various transforms to a transform block associated with a TU. For example, transform processing unit 204 may apply a discrete cosine transform (DCT), a directional transform, or a conceptually similar transform to a transform block. In some examples, transform processing unit 204 does not apply transforms to a transform block. In such examples, the transform block may be treated as a transform coefficient block. In some examples, transform processing unit 204 performs the EMT techniques of this disclosure.

Quantization unit 206 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 206 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information; thus quantized transform coefficients may have lower precision than the original transform coefficients.

In some examples, quantization unit 206 modifies the transform coefficients such that each respective transform coefficient of the block of transform coefficients is based on the respective transform coefficient multiplied by an approximation of $\sqrt{2}$. In this example, after modifying the transform coefficients, quantization unit 206 applies a quantization process to the modified transform coefficients of the non-square PU of the CU.

Inverse quantization unit 208 and inverse transform processing unit 210 may apply inverse quantization and inverse transforms to a coefficient block, respectively, to reconstruct a residual block from the coefficient block. Reconstruction unit 212 may add the reconstructed residual block to corresponding samples from one or more predictive blocks generated by prediction processing unit 200 to produce a reconstructed transform block associated with a TU. By reconstructing transform blocks for each TU of a CU in this way, video encoder 20 may reconstruct the coding blocks of the CU.

Filter unit 214 may perform one or more deblocking operations to reduce blocking artifacts in the coding blocks associated with a CU. Decoded picture buffer 216 may store the reconstructed coding blocks after filter unit 214 performs the one or more deblocking operations on the reconstructed coding blocks. Inter-prediction processing unit 220 may use a reference picture that contains the reconstructed coding blocks to perform inter prediction on PUs of other pictures. In addition, intra-prediction processing unit 226 may use reconstructed coding blocks in decoded picture buffer 216 to perform intra prediction on other PUs in the same picture as the CU.

Entropy encoding unit 218 may receive data from other functional components of video encoder 20. For example, entropy encoding unit 218 may receive coefficient blocks from quantization unit 206 and may receive syntax elements from prediction processing unit 200. Entropy encoding unit 218 may perform one or more entropy encoding operations on the data to generate entropy-encoded data. For example, entropy encoding unit 218 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 218. For instance, the bitstream may include data that represents a RQT for a CU.

Figure 25:
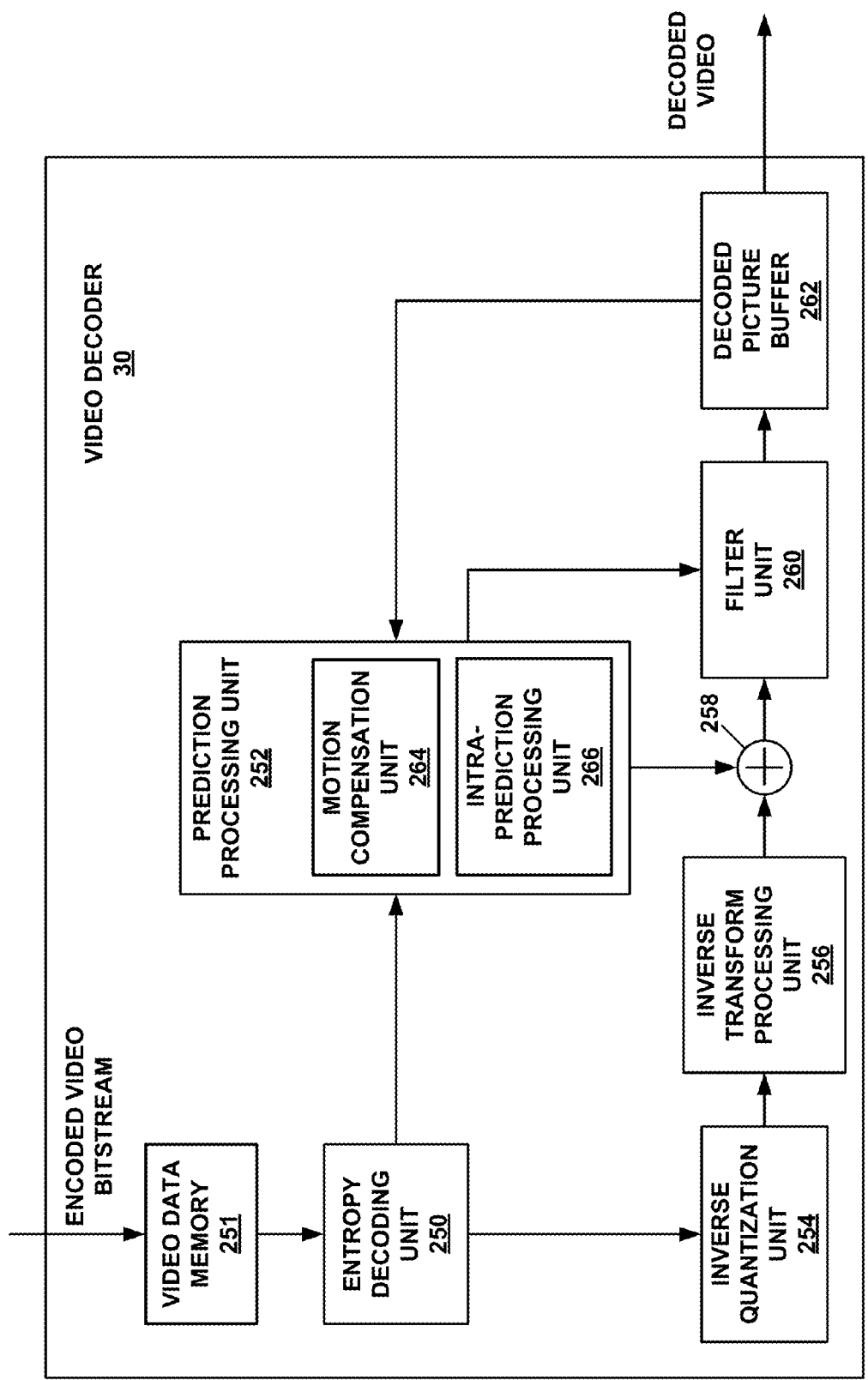
FIG. 25 is a block diagram illustrating an example video decoder that is configured to implement the techniques of this disclosure.

FIG. 25 is a block diagram illustrating an example video decoder 30 that is configured to implement techniques of this disclosure. FIG. 25 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 includes processing circuitry, and video decoder 30 is configured to perform one or more of the example techniques described in this disclosure. For instance, video decoder 30 includes integrated circuitry, and the various units illustrated in FIG. 25 may be formed as hardware circuit blocks that are interconnected with a circuit bus. These hardware circuit blocks may be separate circuit blocks or two or more of the units may be combined into a common hardware circuit block. The hardware circuit blocks may be formed as a combination of electronic components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 25 may be provided by software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 25, video decoder 30 includes an entropy decoding unit 250, video data memory 251, a prediction processing unit 252, an inverse quantization unit 254, an inverse transform processing unit 256, a reconstruction unit 258, a filter unit 260, and a decoded picture buffer 262. Prediction processing unit 252 includes a motion compensation unit 264 and an intra-prediction processing unit 266. In other examples, video decoder 30 may include more, fewer, or different functional components. In some examples, prediction processing unit 266 performs the illumination compensation techniques of this disclosure. In some examples, prediction processing unit 266 performs the LM techniques of this disclosure.

Video data memory 251 may store encoded video data, such as an encoded video bitstream, to be decoded by the components of video decoder 30. The video data stored in video data memory 251 may be obtained, for example, from computer-readable medium 16, e.g., from a local video source, such as a camera, via wired or wireless network communication of video data, or by accessing physical data storage media. Video data memory 251 may form a coded picture buffer (CPB) that stores encoded video data from an encoded video bitstream. Decoded picture buffer 262 may be a reference picture memory that stores reference video data for use in decoding video data by video decoder 30, e.g., in intra- or inter-coding modes, or for output. Video data memory 251 and decoded picture buffer 262 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 251 and decoded picture buffer 262 may be provided by the same memory device or separate memory devices. In various examples, video data memory 251 may be on-chip with other components of video decoder 30, or off-chip relative to those components.

Video data memory 251 receives and stores encoded video data (e.g., NAL units) of a bitstream. Entropy decoding unit 250 may receive encoded video data (e.g., NAL units) from video data memory 251 and may parse the NAL units to obtain syntax elements. Entropy decoding unit 250 may entropy decode entropy-encoded syntax elements in the NAL units. Prediction processing unit 252, inverse quantization unit 254, inverse transform processing unit 256, reconstruction unit 258, and filter unit 260 may generate decoded video data based on the syntax elements extracted from the bitstream. Entropy decoding unit 250 may perform a process generally reciprocal to that of entropy encoding unit 218.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 254 may inverse quantize, i.e., de-quantize, coefficient blocks associated with the TU. After inverse quantization unit 254 inverse quantizes a coefficient block, inverse transform processing unit 256 may apply one or more inverse transforms to the coefficient block in order to generate a residual block associated with the TU. For example, inverse transform processing unit 256 may apply an inverse DCT, an inverse integer transform, an inverse Karhunen-Loeve transform (KLT), an inverse rotational transform, an inverse directional transform, or another inverse transform to the coefficient block. In some examples, inverse transform processing unit 256 performs the EMT techniques of this disclosure.

In accordance with some examples of this disclosure, inverse quantization unit 254 may apply a dequantization process to transform coefficients of a non-square TU of a CU of the video data. Furthermore, after applying the dequantization process to the transform coefficients, inverse quantization unit 254 may modify the dequantized transform coefficients such that each respective dequantized transform coefficient of the dequantized transform coefficients is based on the respective dequantized transform coefficient divided by an approximation of $\sqrt{2}$.

In some examples, inverse transform processing unit 256 may apply the techniques of this disclosure for determining a residual tree structure that includes nodes having two (and/or 4) child nodes. For example, inverse transform processing unit 256 may determine a CU of the video data is partitioned into TUs of the CU based on a tree structure. In this example, as part of determining the CU is partitioned into the TUs of the CU based on the tree structure, inverse transform processing unit 256 may determine that a node in the tree structure has exactly two child nodes in the tree structure. In some examples, inverse transform processing unit 256 may determine that a second node in the tree structure has exactly four child nodes in the tree structure. Furthermore, in this example, for at least one of the TUs of the CU, inverse transform processing unit 256 may apply a transform to a coefficient block for the TU to generate a residual block for the TU.

If a PU is encoded using intra prediction, intra-prediction processing unit 266 may perform intra prediction to generate predictive blocks of the PU. Intra-prediction processing unit 266 may use an intra prediction mode to generate the predictive blocks of the PU based on samples spatially-neighboring blocks. Intra-prediction processing unit 266 may determine the intra prediction mode for the PU based on one or more syntax elements obtained from the bitstream.

If a PU is encoded using inter prediction, entropy decoding unit 250 may determine motion information for the PU. Motion compensation unit 264 may determine, based on the motion information of the PU, one or more reference blocks. Motion compensation unit 264 may generate, based on the one or more reference blocks, predictive blocks (e.g., predictive luma, Cb and Cr blocks) for the PU.

Reconstruction unit 258 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 258 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 260 may apply one or more filters to coding blocks of the CU. For example, filter unit 260 may perform a deblocking operation to reduce blocking artifacts associated with the coding blocks of the CU. Video decoder 30 may store the coding blocks of the CU in decoded picture buffer 262. Thus, decoded picture buffer 262 may store decoded blocks of the video data. Decoded picture buffer 262 may provide reference pictures for subsequent motion compensation, intra prediction, and presentation on a display device, such as display device 32 of FIG. 1. For instance, video decoder 30 may perform, based on the blocks in decoded picture buffer 262, intra prediction or inter prediction operations for PUs of other CUs.

Figure 26:
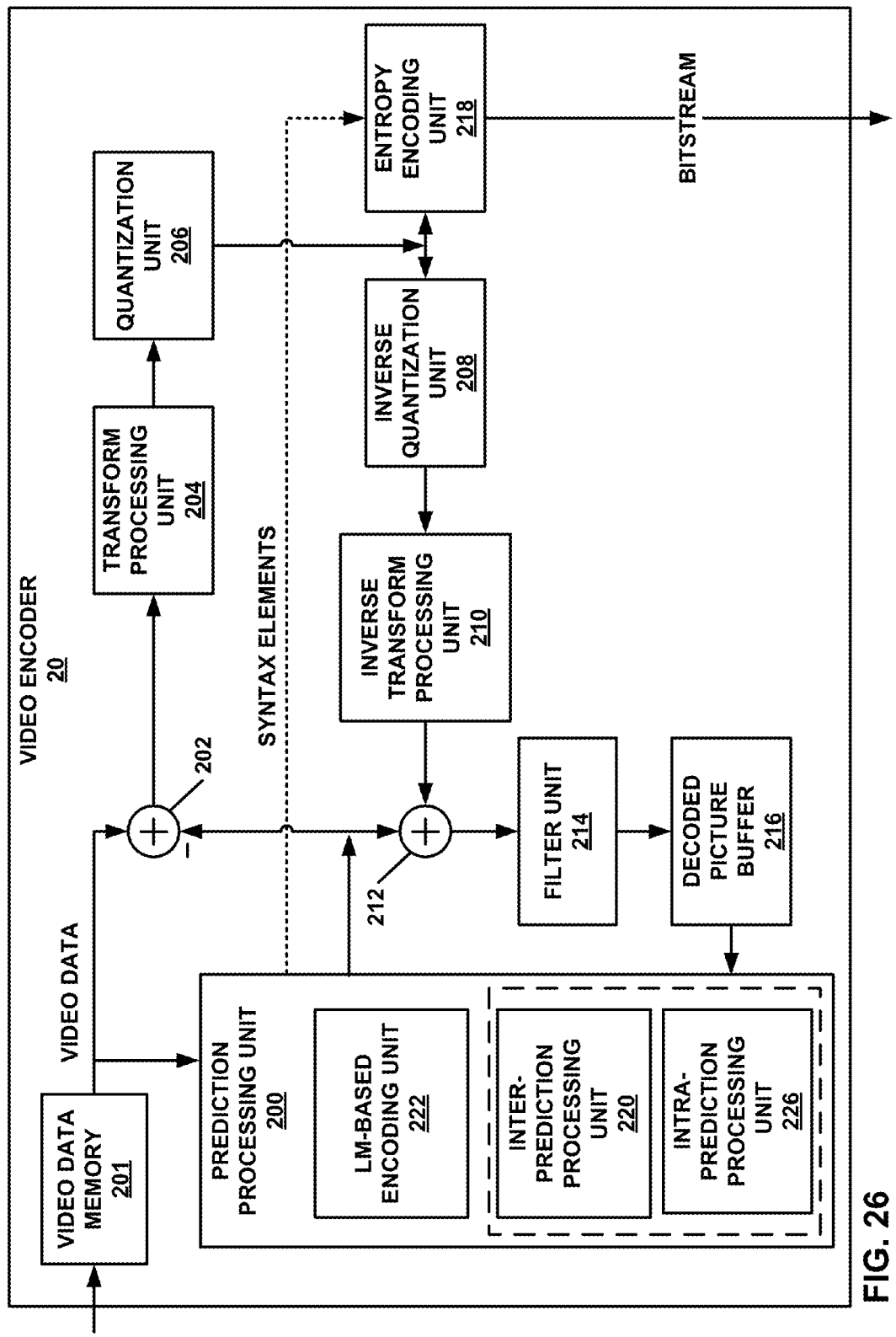
FIG. 26 is a block diagram illustrating an example video encoder that supports LM-based encoding in accordance with a technique of this disclosure.

FIG. 26 is a block diagram illustrating an example video encoder 20 that supports LM-based encoding in accordance with a technique of this disclosure. In the example of FIG. 26, component of video encoder 20 operates in the same manner as the corresponding components of video encoder 20 of FIG. 24. However, video encoder 20 of FIG. 26 also includes an LM-based encoding unit 222.

LM-based encoding unit 222 may perform the LM prediction encoding according to the examples described elsewhere in this disclosure. For example, inverse quantization unit 208, inverse transform processing unit 210, reconstruction unit 212, and filter unit 214 may reconstruct a set of luma reference samples, a set of chroma reference samples, and may also reconstruct luma samples of a non-square PU. LM-based encoding unit 222 may down-sample or sub-sample the set of luma reference samples such that a total number of luma reference samples in the set of luma reference samples that neighbor a longer side of the non-square PU is the same as a total number of luma reference samples of the set of luma reference samples that neighbor a shorter side of the non-square PU. Additionally, LM-based decoding unit 222 may determine a first parameter such that the first parameter is equal to:

$$(\Sigma y_i - \alpha \cdot \Sigma x_i)/I$$

where I is a total number of reference samples in the set of the luma reference samples, $x_i$ is an i-th luma reference sample in the set of luma reference samples, and $y_i$ is an i-th chroma reference sample in the set of chroma reference samples. For each respective chroma sample of a predictive chroma block of the non-square PU, LM-based encoding unit 222 may determine a value of the respective chroma sample such that the value of the respective chroma sample is equal to a second parameter multiplied by a respective reconstructed luma sample corresponding to the respective chroma sample, plus the first parameter, the reconstructed luma sample corresponding to the respective chroma sample being one of the reconstructed luma samples of the non-square PU. LM-based encoding unit 222 may determine the first parameter such that the second parameter is equal to:

$$\frac{I \sum x_i \cdot y_i - \sum x_i \cdot \sum y_i}{I \sum x_i \cdot x_i - \sum x_i \cdot \sum x_i}.$$

LM-based encoding unit 222 may output the predictive block to residual generation unit 202. Residual generation unit 202 generates a residual block from the predictive block and the chroma block. The resulting residual block is transformed by transform processing unit 103, quantized by quantization unit 206, and entropy encoded by entropy encoding unit 218. The result is then signaled via a bitstream and video decoder 30 may use information in the bitstream to reconstruct the chroma block.

Figure 27:
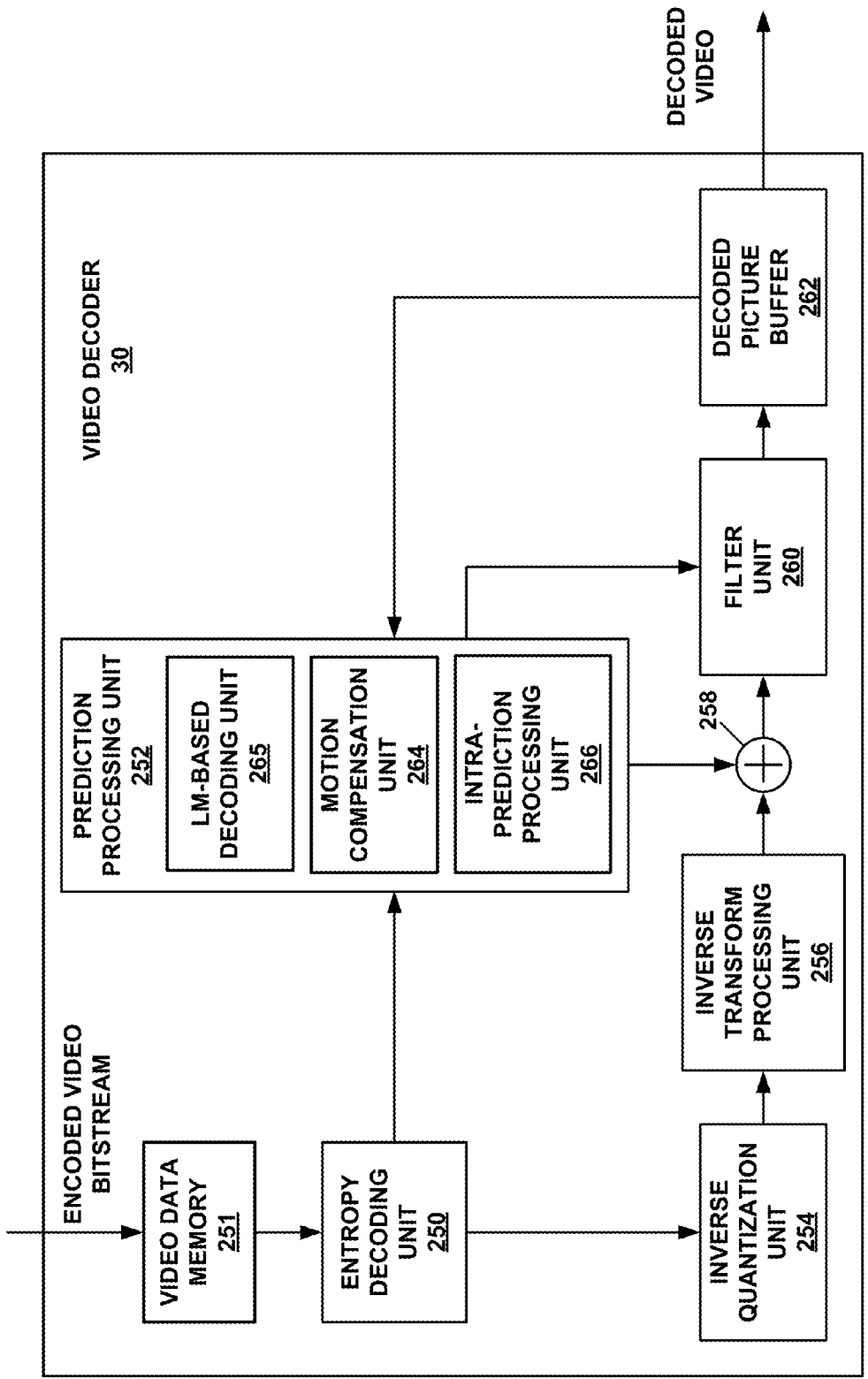
FIG. 27 is a block diagram illustrating an example video decoder that supports LM-based decoding in accordance with a technique of this disclosure.

FIG. 27 is a block diagram illustrating an example video decoder 30 that supports LM-based decoding in accordance with a technique of this disclosure. In the example of FIG. 27, components of video decoder 30 operate in the same manner as the corresponding components of video decoder 30 of FIG. 27. However, video decoder 30 of FIG. 27 also includes an LM-based decoding unit 265.

In accordance with various examples of this disclosure, video decoder 30 may be configured to perform LM-based coding in accordance with examples provided elsewhere in this disclosure. For example, inverse quantization unit 254, inverse transform processing unit 256, reconstruction unit 258, and filter unit 260 may reconstruct a set of luma reference samples, a set of chroma reference samples, and may also reconstruct luma samples of a non-square PU. LM-based decoding unit 265 may down-sample or sub-sample the set of luma reference samples such that a total number of luma reference samples in the set of luma reference samples that neighbor a longer side of the non-square PU is the same as a total number of luma reference samples of the set of luma reference samples that neighbor a shorter side of the non-square PU. Additionally, LM-based decoding unit 265 may determine a first parameter such that the first parameter is equal to:

$$(\Sigma y_i - \alpha \cdot \Sigma x_i)/I$$

where I is a total number of reference samples in the set of the luma reference samples, $x_i$ is an i-th luma reference sample in the set of luma reference samples, and $y_i$ is an i-th chroma reference sample in the set of chroma reference samples. For each respective chroma sample of a predictive chroma block of the non-square PU, LM-based decoding unit 266 may determine a value of the respective chroma sample such that the value of the respective chroma sample is equal to a second parameter multiplied by a respective reconstructed luma sample corresponding to the respective chroma sample, plus the first parameter, the reconstructed luma sample corresponding to the respective chroma sample being one of the reconstructed luma samples of the non-square PU. LM-based decoding unit 266 may determine the first parameter such that the second parameter is equal to:

$$\frac{I \sum x_i \cdot y_i - \sum x_i \cdot \sum y_i}{I \sum x_i \cdot x_i - \sum x_i \cdot \sum x_i}.$$

LM-based decoding unit 265 may output the predictive block to reconstruction unit 258. Reconstruction unit 258 also receives a residual block (e.g., after information in the bitstream for the residual block is entropy decoded with entropy decoding unit 250, inverse quantized with inverse quantization unit 254, inverse transformed with inverse transform processing unit 256). Reconstruction unit 258 adds the residual block with the predictive block to reconstruct the chroma block.

Figure 28:
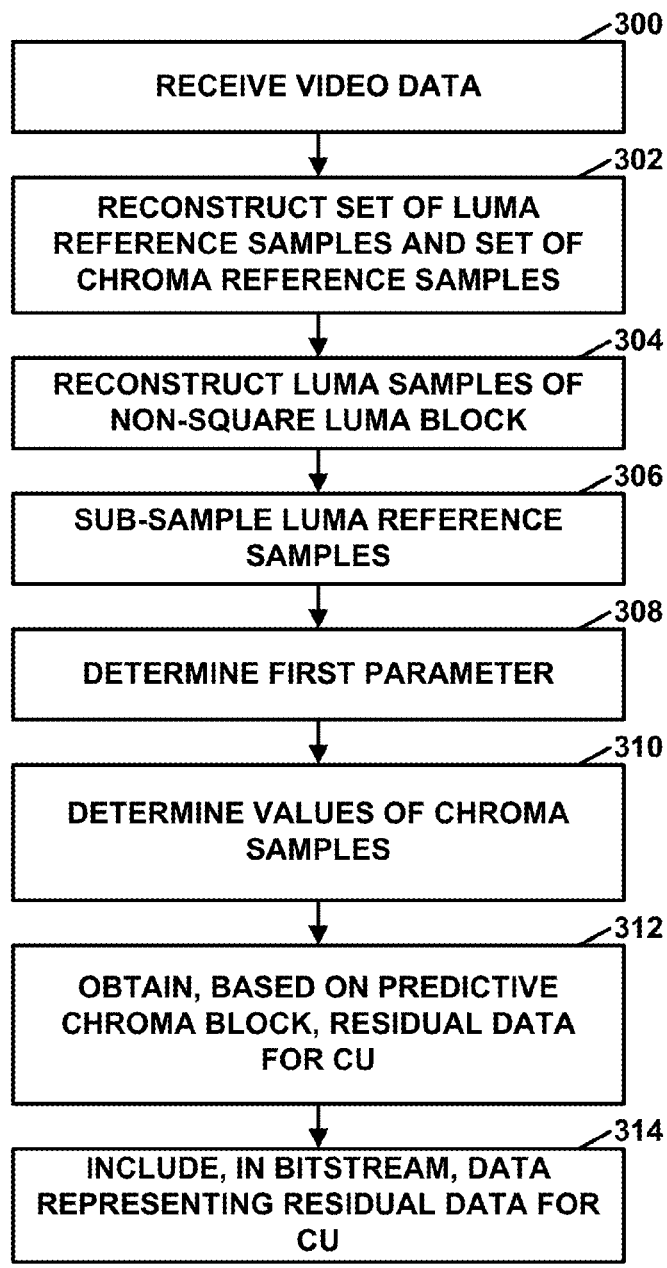
FIG. 28 is a flowchart illustrating an example operation of a video encoder in accordance with a LM-based coding technique of this disclosure.

FIG. 28 is a flowchart illustrating an example operation of video encoder 20 in accordance with a LM-based coding technique of this disclosure. The flowcharts of this disclosure are provided as examples. Other examples within the scope of this disclosure may include more, fewer, or different actions. Other examples within the scope of this disclosure may include actions in different orders or performed in parallel.

In the example of FIG. 28, video encoder 20 may receive video data (300). For example, video encoder 20 may receive the video data from video source 18 (FIG. 1), or another source.

Additionally, in the example of FIG. 28, video encoder 20 may reconstruct a set of luma reference samples and a set of chroma reference samples (302). The set of luma reference samples may comprise above luma samples neighboring a top side of a non-square luma block of a current picture of the video data and left luma samples neighboring a left side of the non-square luma block. In some examples, the non-square luma block is a luma prediction block of a non-square PU. The set of chroma reference samples may comprise chroma samples neighboring the top side of a non-square chroma block and chroma samples neighboring the left side of the non-square chroma block. In some examples, the non-square luma block is a luma prediction block of a non-square PU.

Furthermore, video encoder 20 may reconstruct luma samples of the non-square luma block (304). For example, video encoder 20 may generate luma residual samples for the CU as described elsewhere in this disclosure. In this example, video encoder 20 may add samples of a luma predictive block of the non-square luma block to corresponding samples of the luma residual samples to reconstruct the luma samples of the non-square luma block.

In some examples, video encoder 20 may down-sample or sub-sample the luma samples of the non-square luma block. By down-sampling or sub-sampling the luma samples of the non-square luma block, video encoder 20 may obtain a down-sampled or sub-sampled set of luma samples having one luma sample for each chroma sample of a chroma predictive block (e.g., a chroma predictive block of the same PU as the luma block). Video encoder 20 may down-sample or sub-sample the luma samples of the non-square luma block in response to determining that a color format of the current picture is not 4:4:4.

Additionally, video encoder 20 may down-sample or sub-sample the set of luma reference samples such that a total number of luma reference samples in the set of luma reference samples that neighbor a longer side of the non-square luma block is the same as a total number of luma reference samples of the set of luma reference samples that neighbor a shorter side of the non-square luma block (306). Video encoder 20 may down-sample or sub-sample the set of luma reference samples in accordance with the techniques described elsewhere in this disclosure. For instance, video encoder 20 may decimate the set of luma reference samples such that the set of luma reference samples that neighbor the longer side of the non-square luma block is the same as the total number of luma reference samples of the set of luma reference samples that neighbor the shorter side of the non-square luma block. In some examples, video encoder 20 may down-sample or sub-sample whichever of the left reference samples or the above reference samples corresponds to the longer of the left boundary of the luma and the top boundary of the luma, but not whichever is shorter of the left boundary of the luma block and the top boundary of the luma block. In some examples, a total number of reference samples in the set of luma reference samples is equal to $2^m$, where m is an integer dependent on a height and/or width of the non-square luma block.

In some examples, video encoder 20 may also down-sample or sub-sample the set of chroma reference samples such that a total number of chroma reference samples in the set of chroma reference samples that neighbor a longer side of the non-square chroma block is the same as a total number of chroma reference samples of the set of chroma reference samples that neighbor a shorter side of the non-square chroma block.

In action (308) of FIG. 28, video encoder 20 may determine a first parameter ($\beta$) such that the first parameter is based on:

$$(\Sigma y_i - \alpha \cdot \Sigma x_i)/I$$

the equation above, I is a total number of reference samples in the set of the luma reference samples, $x_i$ is an i-th luma reference sample in the set of luma reference samples, and $y_i$ is an i-th chroma reference sample in the set of chroma reference samples. Video encoder 20 may determine the first parameter based on the formula above in the sense that video encoder 20 uses the formula above directly or a variation on the formula above, such as one that includes additional constants or coefficients.

In some examples, video encoder 20 may also determine a second parameter ($\alpha$) such that the second parameter is based on:

$$\frac{I\sum x_i \cdot y_i - \sum x_i \cdot \sum y_i}{I\sum x_i \cdot x_i - \sum x_i \cdot \sum x_i}$$

Video encoder 20 may determine the second parameter based on the formula above in the sense that video encoder 20 uses the formula above directly or a variation on the formula above, such as one that includes additional constants or coefficients.

Additionally, in example of FIG. 28, for each respective chroma sample of a predictive chroma block, video encoder 20 may determine a value of the respective chroma sample such that the value of the respective chroma sample is equal to a second parameter multiplied by a respective reconstructed luma sample corresponding to the respective chroma sample, plus the first parameter (310). The reconstructed luma sample corresponding to the respective chroma sample is one of the reconstructed luma samples of the non-square luma block.

Furthermore, video encoder 20 may obtain, based on the predictive chroma block, residual data (312). For example, video encoder 20 may determine values of chroma samples of the residual data equal to differences between samples of the chroma block of the non-square prediction block and samples of a chroma coding block of a CU.

Additionally, video encoder 20 may include, in a bitstream comprising an encoded representation of the video data, data representing the residual data (314). For example, video encoder 20 may apply one or more transforms to the residual data to generate one or more coefficient blocks; quantize the coefficient blocks; generate syntax elements indicating whether a transform coefficient is non-zero, whether the transform coefficient is greater than 1, whether the transform coefficient is greater than 2, a sign of the transform coefficient, and a remainder for the transform coefficient. In this example, video encoder 20 may apply CABAC coding to one or more of these syntax elements and include the resulting values in the bitstream.

Figure 29:
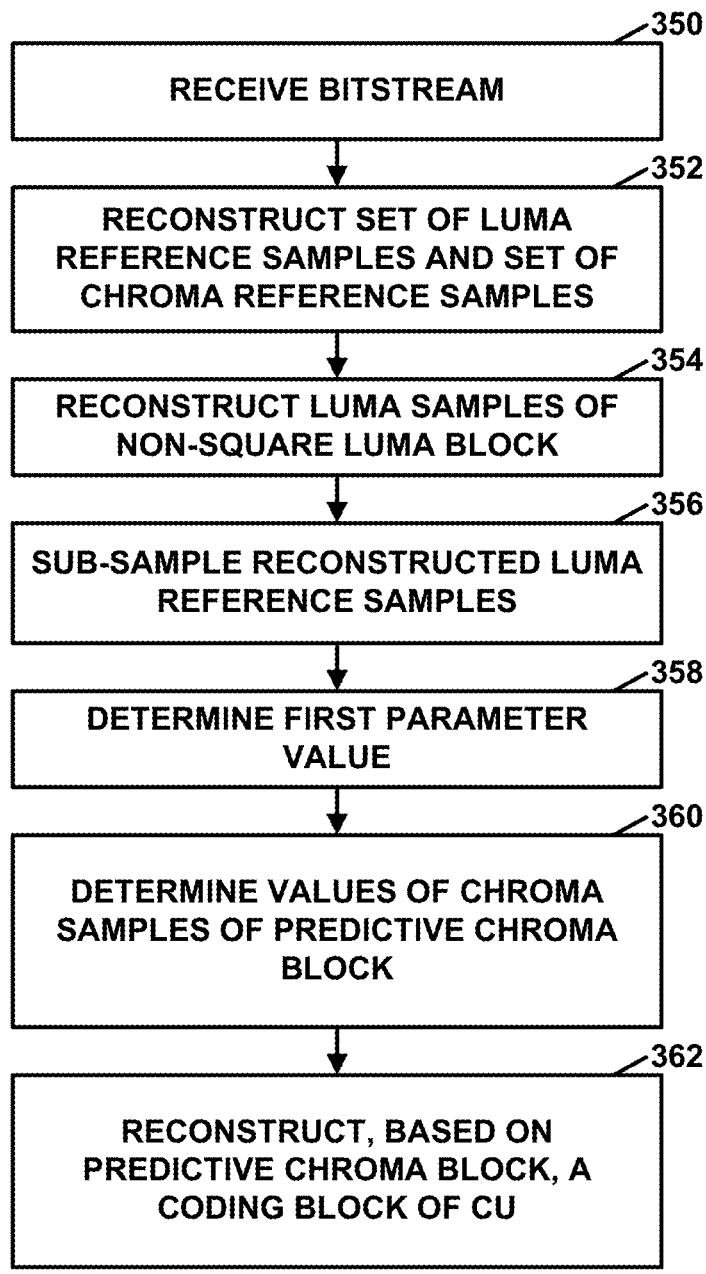
FIG. 29 is a flowchart illustrating an example operation of a video decoder in accordance with a LM-based coding technique of this disclosure.

FIG. 29 is a flowchart illustrating an example operation of video decoder 30 in accordance with a LM-based coding technique of this disclosure. In the example of FIG. 29, video decoder 30 receives a bitstream that comprises an encoded representation of the video data (350).

Furthermore, in the example of FIG. 29, video decoder 30 reconstructs a set of luma reference samples and a set of chroma reference samples (352). The set of luma reference samples comprises above luma samples neighboring a top side of a non-square luma block of a current picture of the video data and left luma samples neighboring a left side of the non-square luma block. In some examples, the non-square luma block is a luma prediction block of a non-square PU. The set of chroma reference samples comprises chroma samples neighboring a top side of a non-square chroma block and chroma samples neighboring a left side of the non-square chroma block. In some examples, the non-square luma block is a luma prediction block of a non-square PU.

Video decoder 30 may reconstruct luma samples of the non-square luma block (354). For example, as part of reconstructing luma samples of the non-square luma block, video decoder 30 may use intra prediction or inter prediction to generate a luma predictive block for the non-square luma block. Additionally, in this example, video decoder 30 may add samples of the luma predictive block for the non-square prediction block to corresponding residual samples to reconstruct luma samples.

In some examples, video decoder 30 may down-sample or sub-sample the luma samples of the non-square luma block. By down-sampling or sub-sampling the luma samples of the non-square luma block, video decoder 30 may obtain a down-sampled or sub-sampled set of luma samples having one luma sample for each chroma sample of a chroma predictive block (e.g., a chroma predictive block of the same PU as the luma block). Video decoder 30 may down-sample or sub-sample the luma samples of the non-square luma block in response to determining that a color format of the current picture is not 4:4:4.

Furthermore, in the example of FIG. 29, video decoder 30 may down-sample or sub-sample the set of luma reference samples such that a total number of luma reference samples in the set of luma reference samples that neighbor a longer side of the non-square prediction block is the same as a total number of luma reference samples of the set of luma reference samples that neighbor a shorter side of the non-square prediction block (356). Video decoder 30 may down-sample or sub-sample the set of luma reference samples in accordance with the techniques described elsewhere in this disclosure. For instance, video decoder 30 may decimate the set of luma reference samples such that the set of luma reference samples that neighbors the longer side of the non-square luma block is the same as the total number of luma reference samples of the set of luma reference samples that neighbor the shorter side of the non-square luma block. In some examples, video decoder 30 may down-sample or sub-sample whichever of the left reference samples or the above reference samples corresponds to the longer of the left boundary of the luma block and the top boundary of the luma block, but not whichever is shorter of the left boundary of the luma block and the top boundary of the luma block. In some examples, a total number of reference samples in the set of luma reference samples is equal to $2^m$, where m is an integer dependent on a height and/or width of the non-square luma block.

In some examples, video decoder 30 may also down-sample or sub-sample the set of chroma reference samples such that a total number of chroma reference samples in the set of chroma reference samples that neighbor a longer side of the non-square chroma block is the same as a total number of chroma reference samples of the set of chroma reference samples that neighbor a shorter side of the non-square chroma block.

Additionally, in action (358) of FIG. 29, video decoder 30 may determine a first parameter (β) such that the first parameter is based on:

$$(\Sigma y_i - \alpha \cdot \Sigma x_i)/I$$

In the equation above, I is a total number of reference samples in the set of the luma reference samples, $x_i$ is an i-th luma reference sample in the set of luma reference samples, and $y_i$ is an i-th chroma reference sample in the set of chroma reference samples. In this disclosure, video encoder 20 and/or video decoder 30 may determine a value based on a formula in the sense that video encoder 20 and/or video decoder 30 may uses the formula directly or a variation on the formula, such as one that includes additional constants or coefficients.

In some examples, video decoder 30 may also determine a second parameter (a) such that the second parameter is based on:

$$\frac{I\sum x_i \cdot y_i - \sum x_i \cdot \sum y_i}{I\sum x_i \cdot x_i - \sum x_i \cdot \sum x_i}$$

In the example of FIG. 29, for each respective chroma sample of a predictive chroma block, video decoder 30 may determine a value of the respective chroma sample such that the value of the respective chroma sample is equal to a second parameter multiplied by a respective reconstructed luma sample corresponding to the respective chroma sample, plus the first parameter (360). In this example, the reconstructed luma sample corresponding to the respective chroma sample is one of the reconstructed luma samples of the non-square luma block.

Furthermore, video decoder 30 may reconstruct, based in part on the predictive chroma block, a coding block (362). For example, video decoder 30 may add samples of the predictive chroma block to corresponding residual chroma samples of a CU to determine samples of a coding block of the CU.

Figure 30:
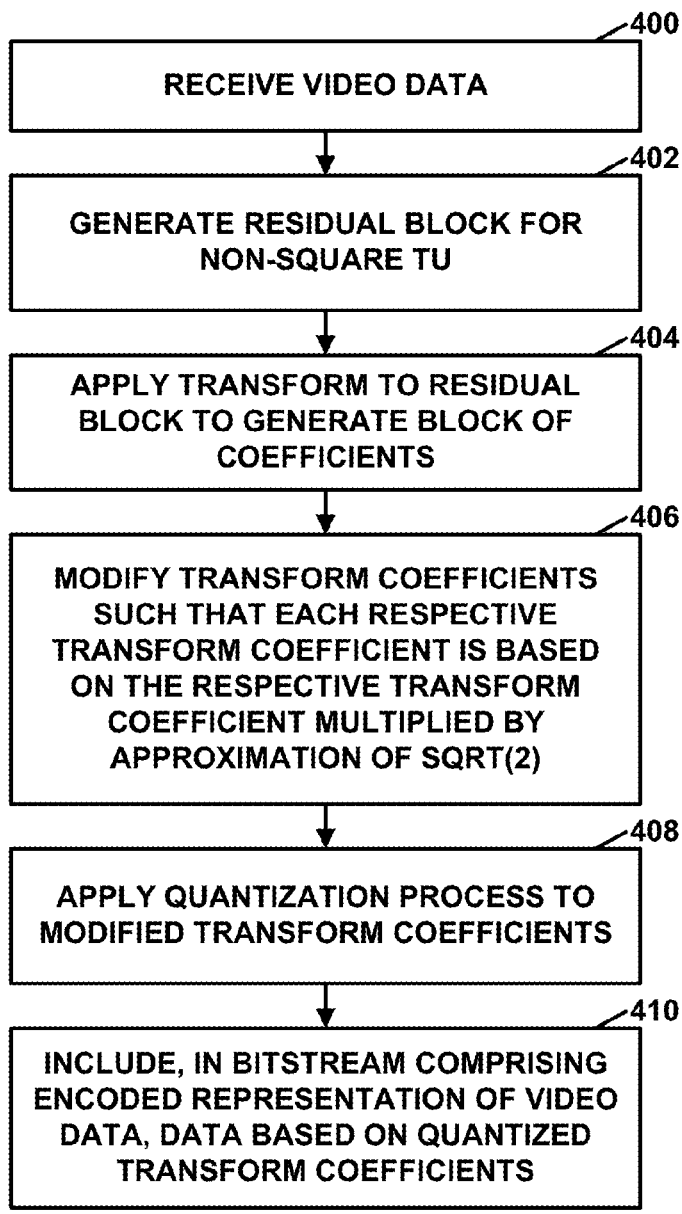
FIG. 30 is a flowchart illustrating an example operation of a video encoder, in accordance with a quantization technique of this disclosure.

FIG. 30 is a flowchart illustrating an example operation of video encoder 20, in accordance with a quantization technique of this disclosure. In the example of FIG. 30, video encoder 20 receives the video data (400). Furthermore, video encoder 20 may generate a residual block for a non-square TU of a CU such that each residual sample of the residual block indicates a difference between corresponding samples of a coding block of the CU and a predictive block of a PU of the CU (402).

Video encoder 20 may apply a transform to the residual block to generate a block of transform coefficients (404). For example, video encoder 20 may apply a DCT transform to the residual block. In addition, video encoder 20 may modify the transform coefficients such that each respective transform coefficient of the block of transform coefficients is based on the respective transform coefficient multiplied by an approximation of $\sqrt{2}$ (406). For example, video encoder 20 may modify the transform coefficients such that each respective transform coefficient is equal to an original value of the respective transform coefficient multiplied by the approximation of $\sqrt{2}$. In this disclosure, an approximation of $\sqrt{2}$ may be a representation of $\sqrt{2}$ (e.g., a floating point representation of $\sqrt{2}$). In some examples, modifying the transform coefficients such that each respective transform coefficient is equal to an original value of the respective transform coefficient multiplied by the approximation of $\sqrt{2}$ may comprise performing one or more mathematical operations to determine values approximating transform coefficient multiplied by $\sqrt{2}$.

In some examples where the non-square TU has the size K×L, as part of applying the transform to the residual block, video encoder 20 may apply, to the residual block, a transform having size N×N, where $\log_2(N*N)=((\log_2(K)+\log_2(L))>>1)<<1)$ and $((\log_2(K)+\log_2(L))$ is odd. For instance, video encoder 20 may apply N-point 1-dimensional DCT transforms to rows and columns of the residual block as shown in equation (18), above.

Furthermore, in the example of FIG. 30, after modifying the transform coefficients, video encoder 20 may apply a quantization process to the modified transform coefficients of the non-square prediction block of the CU (408). For instance, video encoder 20 may quantize the modified transform coefficients as described in equation (22), above.

Video encoder 20 may include, in a bitstream comprising an encoded representation of the video data, data based on the quantized transform coefficients (410). For example, video encoder 20 may generate syntax elements indicating whether a quantized transform coefficient is non-zero, whether the quantized transform coefficient is greater than 1, whether the quantized transform coefficient is greater than 2, a sign of the quantized transform coefficient, and a remainder for the quantized transform coefficient. In this example, video encoder 20 may apply CABAC coding to one or more of these syntax elements and include the resulting values in the bitstream.

In some examples where the non-square TU has the size K×L, video encoder 20 may modify, based on the $((\log_2(K)+\log_2(L))$ being odd, the transform coefficients such that each respective transform coefficient of the transform coefficients is based on the respective transform coefficient multiplied by the approximation of $\sqrt{2}$. In such examples, when (($\log_2$(K)+$\log_2$(L))) is even, video encoder 20 does not modify the transform coefficients such that each respective transform coefficient of the transform coefficients is based on the respective transform coefficient multiplied by the approximation of $\sqrt{2}$.

Figure 31:
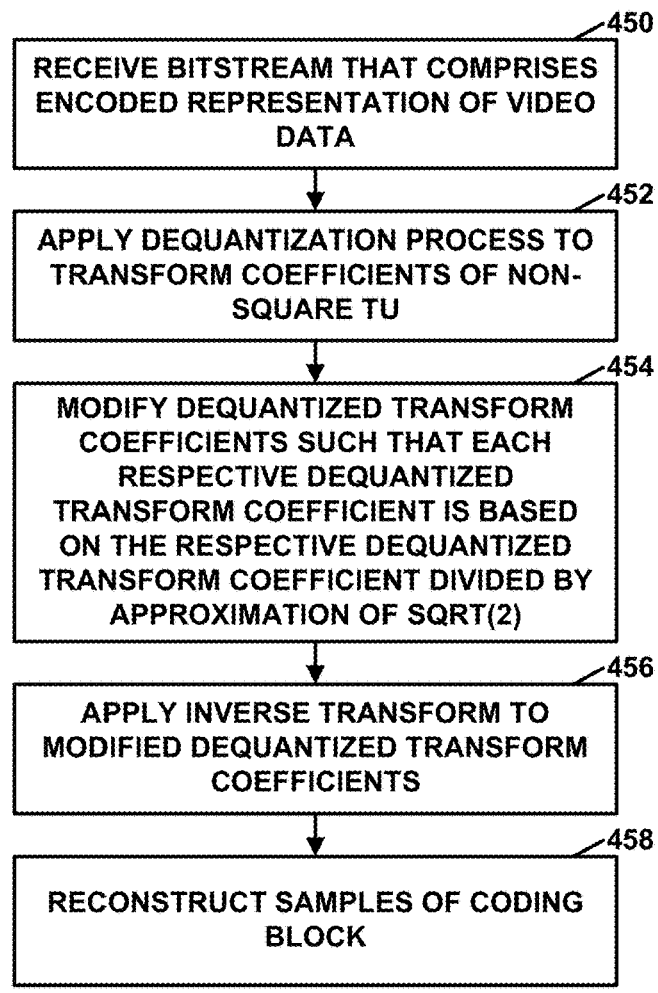
FIG. 31 is a flowchart illustrating an example operation of a video decoder, in accordance with a quantization technique of this disclosure.

FIG. 31 is a flowchart illustrating an example operation of video decoder 30, in accordance with a quantization technique of this disclosure. In the example of FIG. 31, video decoder 30 may receive a bitstream that comprises an encoded representation of the video data (450). Furthermore, video decoder 30 may apply a dequantization process to transform coefficients of a non-square TU of a CU of the video data (452). For instance, video decoder 30 may dequantize (i.e., inverse quantize) the transform coefficients by applying equation (24), above.

After applying the dequantization process to the transform coefficients, video decoder 30 may modify the dequantized transform coefficients such that each respective dequantized transform coefficient of the dequantized transform coefficients is based on the respective dequantized transform coefficient divided by an approximation of $\sqrt{2}$ (454). For instance, video decoder 30 may determine each respective modified transform coefficient is equal to the transform coefficient divided an approximation of $\sqrt{2}$. In this disclosure, an approximation of $\sqrt{2}$ may be a representation of $\sqrt{2}$ (e.g., a floating point representation of $\sqrt{2}$. In some examples, modifying the transform coefficients such that each respective transform coefficient is equal to an original value of the respective transform coefficient multiplied by the approximation of $\sqrt{2}$ may comprise performing one or more mathematical operations to determine values approximating transform coefficient divided by $\sqrt{2}$.

Furthermore, video decoder 30 may apply an inverse transform to the modified dequantized transform coefficients to reconstruct a residual block (456). For example, video decoder 30 may apply equation (18) with a transpose of the transform matrix C (or its approximation represented in integer precision) to apply the inverse transform to the modified dequantized transform coefficients. In some examples where the non-square TU has the size K×L, as part of applying the transform to the residual block, video decoder 30 may apply, to the residual block, a transform having size N×N, where $\log_2$(N*N)=(($\log_2$(K)+$\log_2$(L))>>1)<<1) and (($\log_2$(K)+$\log_2$(L))) is odd. Video decoder 30 may reconstruct samples of a coding block by adding samples of a predictive block to corresponding samples of the residual block for the TU of the CU (458).

In some examples where the non-square TU has the size K×L, video decoder 30 may modify, based on the (($\log_2$(K)+$\log_2$(L))) being odd, the dequantized transform coefficients such that each respective dequantized transform coefficient of the dequantized transform coefficients is based on the respective dequantized transform coefficient divided by the approximation of $\sqrt{2}$. In such examples, when (($\log_2$(K)+$\log_2$(L))) is even, video decoder 30 does not modify the dequantized transform coefficients such that each respective dequantized transform coefficient of the dequantized transform coefficients is based on the respective dequantized transform coefficient divided by the approximation of $\sqrt{2}$.

Figure 32:
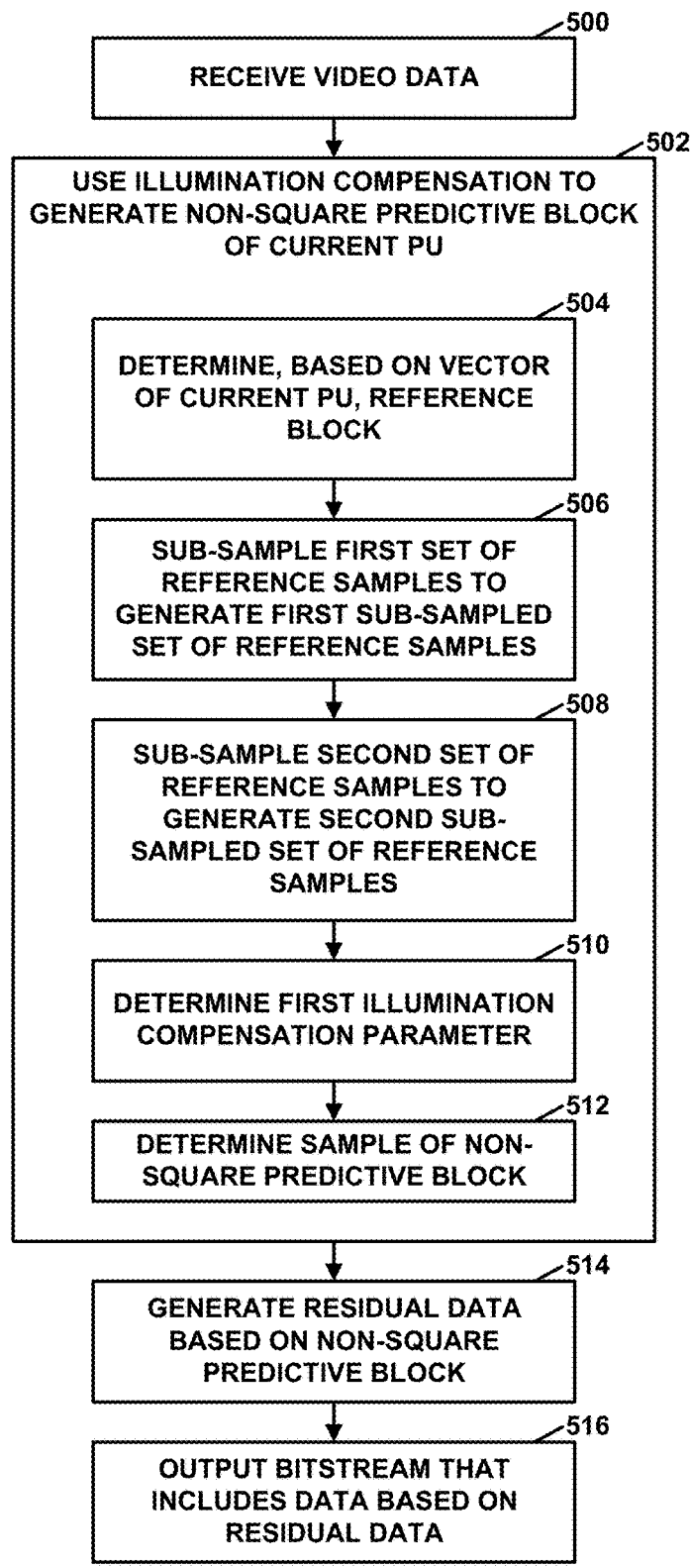
FIG. 32 is a flowchart illustrating an example operation of a video encoder, in accordance with a technique of this disclosure that uses IC.

FIG. 32 is a flowchart illustrating an example operation of video encoder 20, in accordance with a technique of this disclosure that uses IC. In the example of FIG. 32, video encoder 20 receives the video data (500). For example, video encoder 20 may receive the video data from video source 18 (FIG. 1), or elsewhere. Furthermore, video encoder 20 may use IC to generate a non-square predictive block of a current PU of a current CU of a current picture of the video data (502)

As part of using IC to generate the non-square predictive block, video encoder 20 may determine, based on a vector of the current PU, a reference block in an reference picture (504). In some examples, the vector is a disparity vector and the reference picture is an inter-view reference picture. In some examples, the vector is a motion vector and the reference picture is a temporal motion vector. The reference block and the non-square predictive block may be the same size and shape. In some examples, to determine the reference block based on the vector of the current PU, video encoder 20 may determine a position in the reference picture of a top-left corner of the reference block by adding a horizontal component of the vector to an x coordinate of a top-left corner of the non-square predictive block and adding a vertical component of the vector to a y coordinate of the top-left corner of the non-square predictive block. In this example, if the indicated position of the top-left corner of the reference block does not indicate a position in the reference picture of an integer pixel, video encoder 20 may interpolate samples of the reference block to determine the reference block.

Furthermore, in the example of FIG. 32, as part of using IC to generate the non-square predictive block, video encoder 20 may sub-sample a first set of reference samples to generate a first sub-sampled set of reference samples with a first sub-sampling ratio (506). In this example, a total number of reference samples in the first set of reference samples is not equal to $2^m$ and a total number of reference samples in the first sub-sampled set of reference samples is equal to $2^m$. Furthermore, in this example, the first set of reference samples comprises samples outside the non-square predictive block along a left side and a top side of the non-square predictive block, and m is an integer.

Additionally, as part of using IC to generate the non-square predictive block, video encoder 20 may sub-sample a second set of reference samples to generate a second sub-sampled set of reference samples with a second sub-sampling ratio (508). The first sub-sampling ratio may be the same or different from the second sub-sampling ratio. In this example, a total number of reference samples in the second set of reference samples is not equal to $2^m$ and a total number of reference samples in the second sub-sampled set of reference samples is equal to $2^m$. Furthermore, in this example, the second set of reference samples comprises samples outside the reference block along a left side and a top side of the reference block.

In actions (506) and (508), video encoder 20 may perform the sub-sampling in various ways. For example, video encoder 20 may perform the sub-sampling using decimation. In examples where video encoder 20 performs the sub-sampling using decimation, video encoder 20 may remove samples at regular intervals (e.g., every other sample) to reduce the number of samples without changing the values of the remaining samples. Thus, in this example, video encoder 20 may perform at least one of: decimating the first set of reference samples to generate the first sub-sampled set of reference samples; and decimating the second set of reference samples to generate the second sub-sampled set of reference samples.

In another example, video encoder 20 may perform the sub-sampling using interpolation. In examples where video encoder 20 performs the sub-sampling using interpolation, for respective pairs of adjacent samples, video encoder 20 may interpolate a value between the samples of a respective pair and may include the interpolated value in the sub-sampled set of samples. Thus, in this example, video encoder 20 may perform at least one of: performing interpolated sampling of the first set of reference samples to generate the first sub-sampled set of reference samples; and performing interpolated sampling of the second set of reference samples to generate the second sub-sampled set of reference samples.

In another example, video encoder 20 may perform the sub-sampling using a sub-sampling method indicated by a syntax element in the bitstream. Thus, in this example, video encoder 20 may include, in the bitstream, a syntax element indicating a sub-sampling method. In this example, video encoder 20 may perform at least one of: using the indicated sub-sampling method to sub-sample the first set of reference samples to generate the first sub-sampled set of reference samples; and using the indicated sub-sampling method to sub-sample the second set of reference samples to generate the second sub-sampled set of reference samples.

In another example, video encoder 20 may determine, based on a size of the current PU, a sub-sampling method. In this example, video encoder 20 may perform at least one of: using the determined sub-sampling method to sub-sample the first set of reference samples to generate the first sub-sampled set of reference samples; and using the determined sub-sampling method to sub-sample the second set of reference samples to generate the second sub-sampled set of reference samples.

As part of using IC to generate the non-square predictive block, in action (510) of FIG. 32, video encoder 20 may determine a first IC parameter based on the total number of reference samples in the first sub-sampled set of reference samples and the total number of reference samples in the second sub-sampled set of reference samples, the first sub-sampled set of reference samples, and the second sub-sampled set of reference samples. For instance, video encoder 20 may determine the first IC parameter such that the first IC parameter is based on:

$$\frac{\sum_{i=0}^{2N-1} Rec_{neigh}(i) - a \cdot \sum_{i=0}^{2N-1} Rec_{refneigh}(i)}{2N}$$

In the equation above, 2N denotes the total number of reference samples in the first sub-sampled set of reference samples and the total number of reference samples in the second sub-sampled set of reference samples, $Rec_{neigh}(i)$ denotes an i-th reference sample in the first sub-sampled set of reference samples, and $Rec_{refneigh}(i)$ denotes an i-th reference sample in the second sub-sampled set of reference samples.

In some examples, video encoder 20 may determine a second IC parameter such that the second IC parameter is based on:

$$\frac{2N \cdot \sum_{i=0}^{2N-1} Rec_{neigh}(i) \cdot Rec_{refneigh}(i) - \sum_{i=0}^{2N-1} Rec_{neigh}(i) \cdot \sum_{i=0}^{2N-1} Rec_{refneigh}(i)}{2N \cdot \sum_{i=0}^{2N-1} Rec_{refneigh}(i) \cdot Rec_{neigh}(i) - \left(\sum_{i=0}^{2N-1} Rec_{refneigh}(i)\right)^2}.$$

Furthermore, as part of using IC to generate the non-square predictive block, in action (512) of FIG. 32, video encoder 20 may determine a sample of the non-square predictive block based on the first IC parameter. For instance, the sample may be at coordinates (i,j) relative to a top-left corner of the current picture and video encoder 20 may determine the sample such that the sample is based on:

$$a*r(i+dv_x,j+dv_y+b)$$

In the equation above, b is the first IC parameter, a is a second IC parameter, r is the reference picture, dvx is a horizontal component of the vector (e.g., disparity vector, motion vector) of the current PU, and $dv_y$ is a vertical component of the vector of the current PU.

In the example of FIG. 32, video encoder 20 may generate residual data based on the non-square predictive block (514). For example, video encoder 20 may generate the residual data such that samples of the residual data are equal to differences between samples of the non-square predictive block and samples of a coding block of the current CU. Additionally, video encoder 20 may output a bitstream that includes data based on the residual data (516). For example, video encoder 20 may output a bitstream that includes entropy encoded syntax elements (e.g., syntax elements indicating greater than 1, greater than 2, remainder, etc.) that indicate the residual data.

Figure 33:
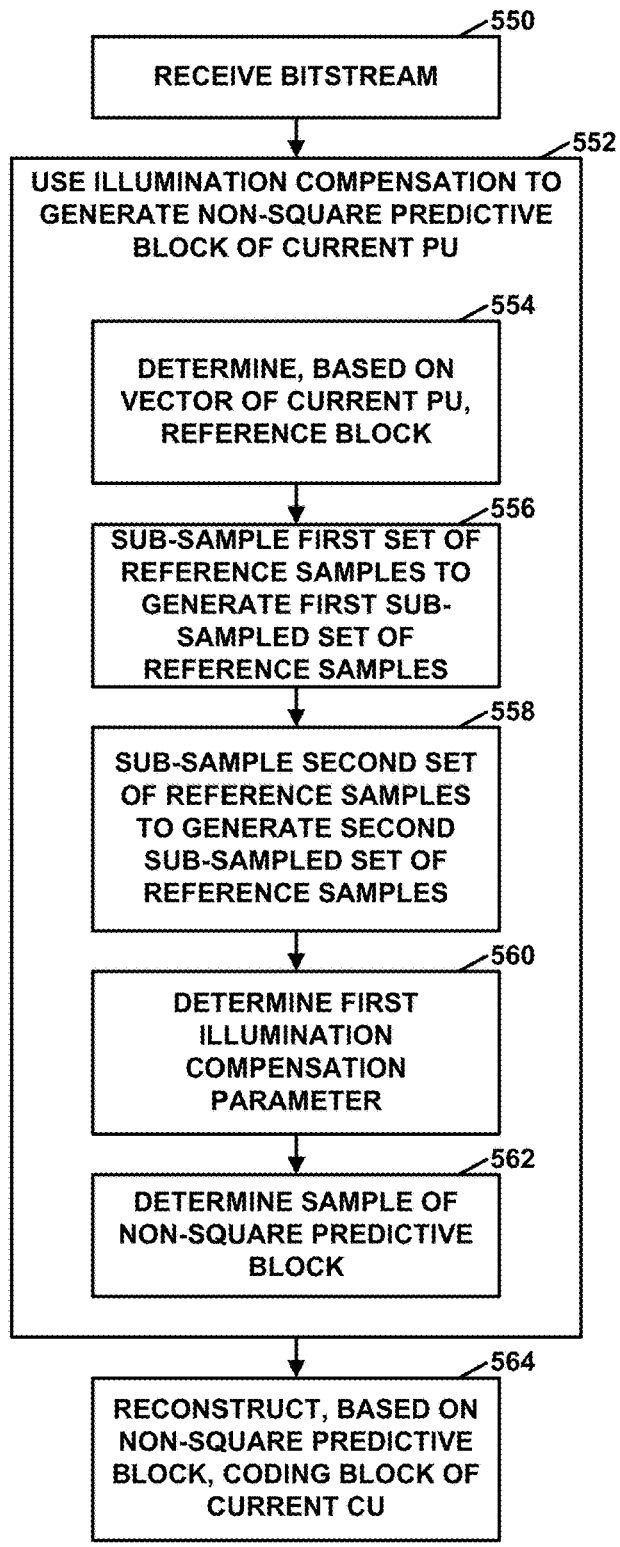
FIG. 33 is a flowchart illustrating an example operation of a video decoder, in accordance with a technique of this disclosure that uses IC.

FIG. 33 is a flowchart illustrating an example operation of video decoder 30 for encoding video data, in accordance with a technique of this disclosure that uses IC. In the example of FIG. 32, video decoder 30 receives a bitstream that comprises an encoded representation of the video data (550). Furthermore, video decoder 30 uses IC to generate a non-square predictive block of a current PU of a current CU of a current picture of the video data (552).

As part of using IC to generate the non-square predictive block, video decoder 30 may determine, based on a vector of the current PU, a reference block in a reference picture (554). In some examples, the vector is a disparity vector and the reference picture is an inter-view reference picture. In some examples, the vector is a motion vector and the reference picture is a temporal motion vector. The reference block and the non-square predictive block being the same size and shape. To determine the reference block based on the disparity vector of the current PU, video decoder 30 may determine a position in the reference picture of a top-left corner of the reference block by adding a horizontal component of the vector to an x coordinate of a top-left corner of the non-square predictive block and adding a vertical component of the vector to a y coordinate of the top-left corner of the non-square predictive block. In this example, if indicated position of the top-left corner of the reference block does not indicate a position in the reference picture of an integer pixel, video decoder 30 may interpolate samples of the reference block to determine the reference block.

Furthermore, as part of using IC to generate the non-square predictive block, video decoder 30 may sub-sample a first set of reference samples to generate a first sub-sampled set of reference samples with a first sub-sampling ratio (556). In this example, a total number of reference samples in the first set of reference samples is not equal to $2^m$ and a total number of reference samples in the first sub-sampled set of reference samples is equal to $2^m$. In this example, the first set of reference samples may comprise samples outside the non-square predictive block along a left side and a top side of the non-square predictive block, and m is an integer.

Additionally, as part of using IC to generate the non-square predictive block, video decoder 30 may sub-sample a second set of reference samples to generate a second sub-sampled set of reference samples with a second sub-sampling ratio (558). The first sub-sampling ratio may be the same or different from the second sub-sampling ratio. In this example, a total number of reference samples in the second set of is not equal to $2^m$ and a total number of reference samples in the second sub-sampled set of reference samples is equal to $2^m$. Furthermore, in this example, the second set of reference samples may comprise samples outside the reference block along a left side and a top side of the reference block.

In actions (556) and (558), video decoder 30 may perform the sub-sampling in various ways. For example, video decoder 30 may perform the sub-sampling using decimation. In examples where video decoder 30 performs the sub-sampling using decimation, video decoder 30 may remove samples at regular intervals (e.g., every other sample) to reduce the number of samples without changing the values of the remaining samples. Thus, in this example, video decoder 30 may perform at least one of: decimating the first set of reference samples to generate the first sub-sampled set of reference samples; and decimating the second set of reference samples to generate the second sub-sampled set of reference samples.

In another example, video decoder 30 may perform the sub-sampling using interpolation. In examples where video decoder 30 performs the sub-sampling using interpolation, for respective pairs of adjacent samples, video decoder 30 may interpolate a value between the samples of a respective pair and may include the interpolated value in the sub-sampled set of samples. Thus, in this example, video decoder 30 may perform at least one of: performing interpolated sampling of the first set of reference samples to generate the first sub-sampled set of reference samples; and performing interpolated sampling of the second set of reference samples to generate the second sub-sampled set of reference samples.

In another example, video decoder 30 may perform the sub-sampling using a sub-sampling method indicated by a syntax element in the bitstream. Thus, in this example, video decoder 30 may obtain, from the bitstream, a syntax element indicating a sub-sampling method. In this example, video decoder 30 may perform at least one of: using the indicated sub-sampling method to sub-sample the first set of reference samples to generate the first sub-sampled set of reference samples; and using the indicated sub-sampling method to sub-sample the second set of reference samples to generate the second sub-sampled set of reference samples.

In another example, video decoder 30 may determine, based on a size of the current PU, a sub-sampling method. In this example, video decoder 30 may perform at least one of: using the determined sub-sampling method to sub-sample the first set of reference samples to generate the first sub-sampled set of reference samples; and using the determined sub-sampling method to sub-sample the second set of reference samples to generate the second sub-sampled set of reference samples.

Furthermore, in action (560) of FIG. 33, video decoder 30 may determine a first IC parameter based on the total number of reference samples in the first sub-sampled set of reference samples and the total number of reference samples in the second sub-sampled set of reference samples, the first sub-sampled set of reference samples, and the second sub-sampled set of reference samples. For instance, video decoder 30 may determine the first IC parameter such that the first IC parameter is based on:

$$\frac{\sum_{i=0}^{2N-1} Rec_{neigh}(i) - a \cdot \sum_{i=0}^{2N-1} Rec_{refneigh}(i)}{2N}$$

In the equation above, 2N denotes the total number of reference samples in the first sub-sampled set of reference samples and the total number of reference samples in the second sub-sampled set of reference samples, $Rec_{neigh}(i)$ denotes an i-th reference sample in the first sub-sampled set of reference samples, and $Rec_{refneigh}(i)$ denotes an i-th reference sample in the second sub-sampled set of reference samples.

In some examples, video decoder 30 may determine a second IC parameter such that the second IC parameter is based on:

$$\frac{2N \cdot \sum_{i=0}^{2N-1} Rec_{neigh}(i) \cdot Rec_{refneigh}(i) - \sum_{i=0}^{2N-1} Rec_{neigh}(i) \cdot \sum_{i=0}^{2N-1} Rec_{refneigh}(i)}{2N \cdot \sum_{i=0}^{2N-1} Rec_{refneigh}(i) \cdot Rec_{neigh}(i) - \left(\sum_{i=0}^{2N-1} Rec_{refneigh}(i)\right)^2}.$$

Additionally, in action (562) of FIG. 33, video decoder 30 may determine a sample of the non-square predictive block based on the first IC parameter. For instance, the sample may be at coordinates (i,j) relative to a top-left corner of the current picture and video decoder 30 may determine the sample such that the sample is based on:

$$a*r(i+dv_x,j+dv_y+b)$$

In the equation above, b is the first IC parameter, a is a second IC parameter, r is the reference picture, $dv_x$ is a horizontal component of a vector of the current PU, and $dv_y$ is a vertical component of the vector of the current PU.

Video decoder 30 may reconstruct, based on the non-square predictive block, a coding block of the current CU (564). For example, video decoder 30 may reconstruct samples of the coding block by adding samples of the non-square predictive block to corresponding samples of a residual block for a TU of the current CU.

Figure 34:
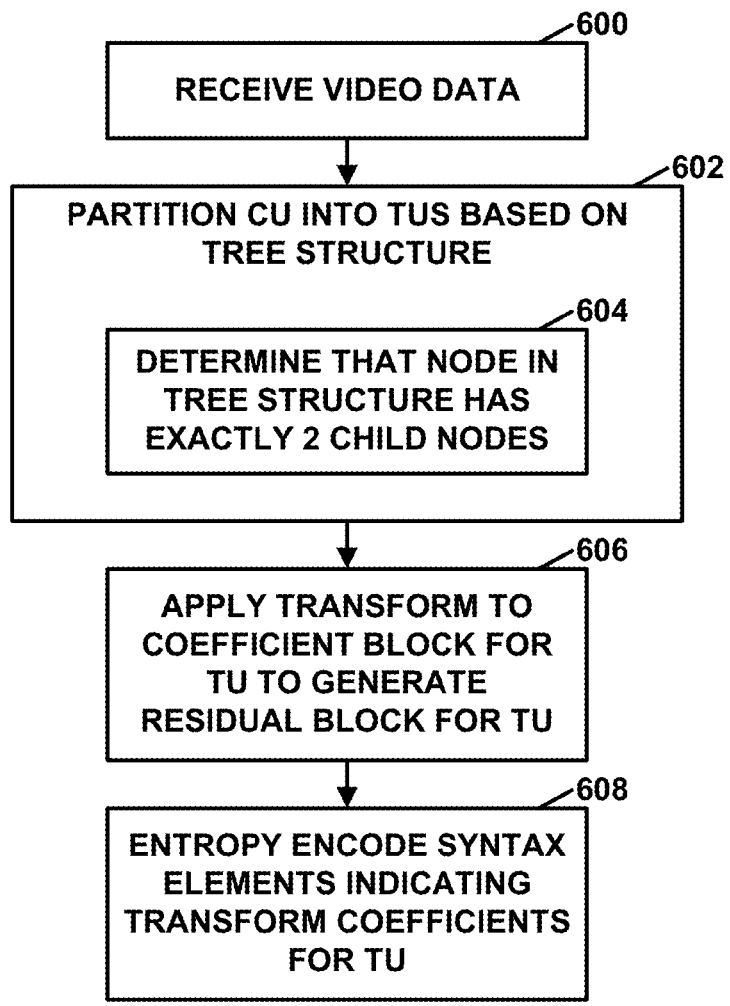
FIG. 34 is a flowchart illustrating an example operation of a video encoder, in accordance with a technique of this disclosure that uses a flexible residual tree.

FIG. 34 is a flowchart illustrating an example operation of video encoder 20 for encoding video data, in accordance with a technique of this disclosure that uses a flexible residual tree. In the example of FIG. 34, video encoder 20 may receive video data (600). Furthermore, video encoder 20 may partition a CU of the video data into TUs of the CU based on a tree structure (602). In some examples, video encoder 20 may determine, for each respective node of the tree structure, a value of a splitting indicator for the respective node. The splitting indicator for a respective node may indicate how many child nodes the respective node has. In some instances, video encoder 20 may signal, in the bitstream, a syntax element explicitly indicating the value of the splitting indicator of the respective node. In other instances, video decoder 30 may infer the value of the splitting indicator for the respective node (e.g., based on a depth of the node in the tree structure, values of splitting nodes of parent nodes, sizes and/or shapes of predictive blocks corresponding to the respective node, and so on).

As part of partitioning the CU into TUs of the CU based on the tree structure, video encoder 20 may determine that a node in the tree structure has exactly two child nodes in the tree structure (604). In this example, a root node of the tree structure corresponds to a coding block of the CU. Each respective non-root node of the tree structure corresponds to a respective block that is a partition of a block that corresponds to a parent node of the respective non-root node. Leaf nodes of the tree structure correspond to the TUs of the CUs.

For example, video encoder 20 may determine, based on a total number of PUs of the CU, whether the tree structure is a binary tree or a quarter tree. In this example, based on the CU having two PUs, the node has exactly two child nodes in the tree structure. In other words, video encoder 20 may determine, based on the CU having exactly two PUs, that the node has exactly two child nodes in the tree structure.

In some examples, video encoder 20 may determine, based on the CU having exactly two PUs, that the node has exactly two child nodes in the tree structure.

Furthermore, in the example of FIG. 34, for at least one of the TUs of the CU, video encoder 20 applies a transform to a residual block for the TU to generate a block of transform coefficients for the TU (606). For example, video encoder 20 may apply a discrete cosine transform (DCT), discrete sine transform (DST), or another type of transform to the residual block for the TU to generate the block of transform coefficients. Additionally, video encoder 20 may entropy encode syntax elements indicating the transform coefficients for the TU (608). For example, video encoder 20 may generate syntax elements indicating whether a transform coefficient is non-zero, whether the transform coefficient is greater than 1, whether the transform coefficient is greater than 2, a sign of the transform coefficient, and a remainder for the transform coefficient. In this example, video encoder 20 may apply CABAC coding to one or more of these syntax elements.

Figure 35:
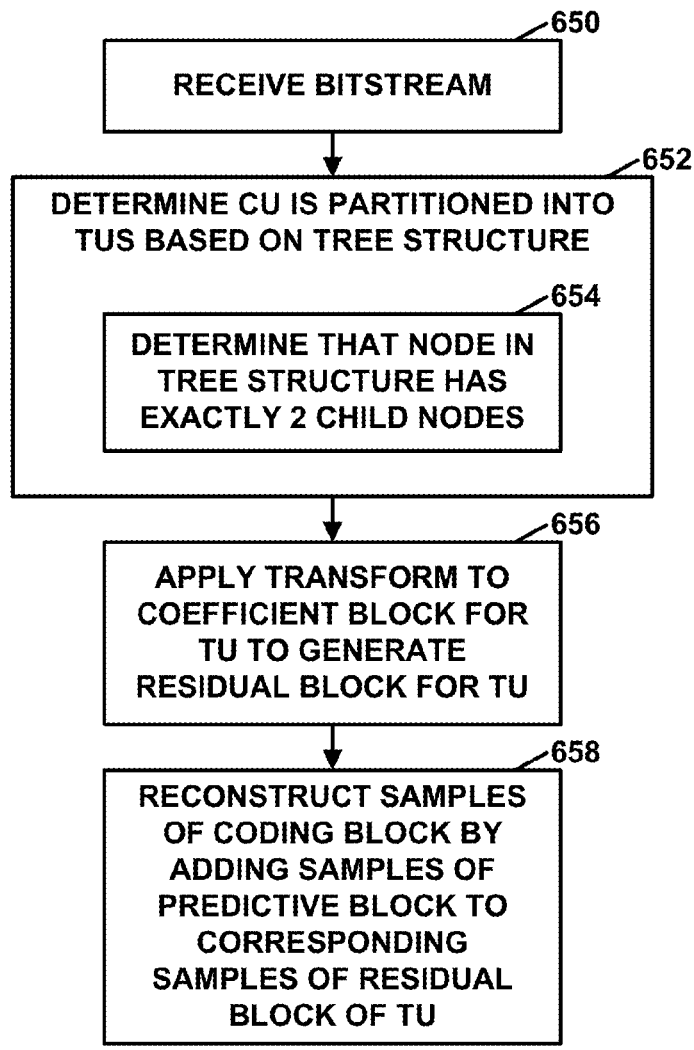
FIG. 35 is a flowchart illustrating an example operation of a video decoder, in accordance with a technique of this disclosure that uses a flexible residual tree.

FIG. 35 is a flowchart illustrating an example operation of video decoder 30 for decoding video data, in accordance with a technique of this disclosure that uses a flexible residual tree. In the example of FIG. 35, video decoder 30 may receive a bitstream that comprises an encoded representation of the video data (650). Additionally, video decoder 30 may determine a CU of the video data is partitioned into TUs of the CU based on a tree structure (652). In some examples, video decoder 30 may determine, for each respective node of the tree structure, a value of a splitting indicator for the respective node. The splitting indicator for a respective node may indicate how many child nodes the respective node has. In some instances, video decoder 30 may obtain from the bitstream a syntax element explicitly indicating the value of the splitting indicator of the respective node. In other instances, video decoder 30 may infer the value of the splitting indicator for the respective node (e.g., based on a depth of the node in the tree structure, values of splitting nodes of parent nodes, sizes and/or shapes of predictive blocks corresponding to the respective node, and so on).

As part of determining the CU is partitioned into the TUs of the CU based on the tree structure, video decoder 30 may determine that a node in the tree structure has exactly two child nodes in the tree structure (654). In this example, a root node of the tree structure corresponds to a coding block of the CU. Each respective non-root node of the tree structure corresponds to a respective block that is a partition of a block that corresponds to a parent node of the respective non-root node. Leaf nodes of the tree structure correspond to the TUs of the CU. As described elsewhere in this disclosure, video decoder 30 may determine that a node in the tree structure has exactly two child nodes based on a number of PUs in the CU, based on a depth of the node in the tree structure, based on a signaled syntax element, or based on other data.

For example, video decoder 30 may determine, based on a total number of PUs of the CU, whether the tree structure is a binary tree or a quarter tree. In this example, based on the CU having two PUs, the node has exactly two child nodes in the tree structure. In other words, video decoder 30 may determine, based on the CU having exactly two PUs, that the node has exactly two child nodes in the tree structure.

For at least one of the TUs of the CU, video decoder 30 may apply a transform to a coefficient block for the TU to generate a residual block for the TU (656). For example, video decoder 30 may apply an inverse DCT, an inverse DST, or another type of transform to the coefficient block for the TU to generate the residual block for the TU. Additionally, video decoder 30 may reconstruct samples of a coding block by adding samples of a predictive block to corresponding samples of the residual block for the TU of the CU (658).

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
   receiving, by a video decoder, a bitstream that comprises an encoded representation of the video data;
   applying, by the video decoder, a dequantization process to transform coefficients of a non-square transform unit (TU) of a coding unit (CU) of the video data, wherein the non-square TU has a size K×L;
   after applying the dequantization process to the transform coefficients and based on (($\log_2(K)+\log_2(L)$) being odd, modifying, by the video decoder, the dequantized transform coefficients such that each respective dequantized transform coefficient of the dequantized transform coefficients is based on the respective dequantized transform coefficient divided by an approximation of $\sqrt{2}$;
   applying, by the video decoder, an inverse transform to the modified dequantized transform coefficients to reconstruct a residual block; and
   reconstructing, by the video decoder, samples of a coding block by adding samples of a predictive block to corresponding samples of the residual block for the TU of the CU.

2. The method of claim 1, wherein applying the inverse transform to the modified dequantized transform coefficients comprises applying, by the video decoder, to the modified dequantized transform coefficients, a transform having size N×N, where $\log_2(N*N)=((\log_2(K)+\log_2(L))>>1)<<1$) and (($\log_2(K)+\log_2(L)$) is odd.

3. The method of claim 1, wherein the method further comprises:
   applying, by the video decoder, the dequantization process to transform coefficients of a second non-square TU of a second CU of the video data, wherein the second non-square TU has a size $K_2 \times L_2$;
   wherein when (($\log_2(K_2)+\log_2(L_2)$) is even, the dequantized transform coefficients of the second non-square TU are not modified such that each respective dequantized transform coefficient of the dequantized transform coefficients of the second non-square TU is based on the respective dequantized transform coefficient divided by the approximation of $\sqrt{2}$.

4. A method of encoding video data, the method comprising:
   receiving, by a video encoder, the video data;
   generating, by the video encoder, a residual block for a non-square transform unit (TU) of a coding unit (CU) such that each residual sample of the residual block indicates a difference between corresponding samples of a coding block of the CU and a predictive block of a prediction unit (PU) of the CU, wherein the non-square TU has a size K×L;
   applying, by the video encoder, a transform to the residual block to generate a block of transform coefficients;
   modifying, by the video encoder, based on (($\log_2(K)+\log_2(L)$) being odd, the transform coefficients such that each respective transform coefficient of the block of transform coefficients is based on the respective transform coefficient multiplied by an approximation of $\sqrt{2}$;
   after modifying the transform coefficients, applying, by the video encoder, a quantization process to the modified transform coefficients of the non-square TU of the CU; and
   including, by the video encoder, in a bitstream comprising an encoded representation of the video data, data based on the quantized transform coefficients.

5. The method of claim 4, wherein applying the transform to the residual block comprises applying, by the video encoder, to the residual block, a transform having size N×N, where $\log_2(N*N)=((\log_2(K)+\log_2(L))>>1)<<1$) and (($\log_2(K)+_2(L)$) is odd.

6. The method of claim 4, further comprising:
   generating, by the video encoder, a second residual block for a second non-square TU of a second CU such that each residual sample of the second residual block indicates a difference between corresponding samples of a coding block of the second CU and a predictive block of a PU of the second CU, wherein the second non-square TU has a size $K_2 \times L_2$; and applying, by the video encoder, the transform to the second residual block to generate a second block of transform coefficients,
wherein when $((\log_2(K_2)+\log_2(L_2))$ is even, transform coefficients of the second block of transform coefficients are not modified such that each respective transform coefficient of the transform coefficients of the second block of transform coefficients is based on the respective transform coefficient multiplied by the approximation of $\sqrt{2}$.

7. An apparatus for decoding video data, the apparatus comprising:
a memory configured to store the video data; and
a video decoder implemented using circuitry, software, or a combination thereof, the video decoder configured to:
apply a dequantization process to transform coefficients of a non-square transform unit (TU) of a coding unit (CU) of the video data, wherein the non-square TU has a size K×L;
after applying the dequantization process to the transform coefficients and based on $((\log_2(K)+\log_2(L))$ being odd, modify the dequantized transform coefficients such that each respective dequantized transform coefficient of the dequantized transform coefficients is based on the respective dequantized transform coefficient divided by an approximation of $\sqrt{2}$;
apply an inverse transform to the modified dequantized transform coefficients to reconstruct a residual block; and
reconstruct samples of a coding block by adding samples of a predictive block to corresponding samples of the residual block for the TU of the CU.

8. The apparatus of claim 7, wherein the video decoder is configured such that, as part of applying the inverse transform to the modified dequantized transform coefficients, the video decoder applies, to the modified dequantized transform coefficients, a transform having size N×N, where $\log_2(N*N)=((\log_2(K)+\log_2(L))>>1)<<1$ and $((\log_2(K)+\log_2(L))$ is odd.

9. The apparatus of claim 7,
wherein the video decoder is configured to apply the dequantization process to transform coefficients of a second non-square TU of a second CU of the video data, wherein the second non-square TU has a size $K_2 \times L_2$,
wherein when $((\log_2(K_2)+\log_2(L_2))$ is even the video decoder does not modify the dequantized transform coefficients of the second non-square TU such that each respective dequantized transform coefficient of the dequantized transform coefficients of the second non-square TU is based on the respective dequantized transform coefficient divided by the approximation of $\sqrt{2}$.

10. An apparatus for encoding video data, the apparatus comprising:
a memory configured to store the video data; and
a video encoder implemented using circuitry, software, or a combination thereof, the video encoder configured to:
generate a residual block for a non-square transform unit (TU) of a coding unit (CU) such that each residual sample of the residual block indicates a difference between corresponding samples of a coding block of the CU and a predictive block of a prediction unit (PU) of the CU, wherein the non-square TU has a size K×L;
apply a transform to the residual block to generate a block of transform coefficients;
modify, based on $((\log_2(K)+\log_2(L))$ being odd, the transform coefficients such that each respective transform coefficient of the block of transform coefficients is based on the respective transform coefficient multiplied by an approximation of $\sqrt{2}$;
after modifying the transform coefficients, apply a quantization process to the modified transform coefficients of the non-square TU of the CU; and
include, in a bitstream comprising an encoded representation of the video data, data based on the quantized transform coefficients.

11. The apparatus of claim 10, wherein the video encoder is configured such that, as part of applying the transform to the residual block, the video encoder applies, to the residual block, a transform having size N×N, where $\log_2(N*N)=((\log_2(K)+\log_2(L))>>1)<<1$ and $((\log_2(K)+\log_2(L))$ is odd.

12. The apparatus of claim 10, wherein the video encoder is configured to:
generate a second residual block for a second non-square TU of a second CU such that each residual sample of the second residual block indicates a difference between corresponding samples of a coding block of the second CU and a predictive block of a PU of the second CU, wherein the second non-square TU has a size $K_2 \times L_2$; and
apply the transform to the second residual block to generate a second block of transform coefficients,
wherein when $((\log_2(K_2)+\log_2(L_2))$ is even, the video encoder does not modify transform coefficients of the second block of transform coefficients such that each respective transform coefficient of the transform coefficients of the second block of transform coefficients is based on the respective transform coefficient multiplied by the approximation of $\sqrt{2}$.

13. An apparatus for decoding video data, the apparatus comprising:
means for receiving a bitstream that comprises an encoded representation of the video data;
means for applying a dequantization process to transform coefficients of a non-square transform unit (TU) of a coding unit (CU) of the video data, wherein the non-square TU has a size K×L;
means for modifying, after applying the dequantization process to the transform coefficients and based on $((\log_2(K)+\log_2(L))$ being odd, the dequantized transform coefficients such that each respective dequantized transform coefficient of the dequantized transform coefficients is based on the respective dequantized transform coefficient divided by an approximation of $\sqrt{2}$;
means for applying an inverse transform to the modified dequantized transform coefficients to reconstruct a residual block; and
means for reconstructing samples of a coding block by adding samples of a predictive block to corresponding samples of the residual block for the TU of the CU.

14. The apparatus of claim 13, wherein the means for applying the inverse transform to the modified dequantized transform coefficients comprises means for applying, to the modified dequantized transform coefficients, a transform having size N×N, where $\log_2(N*N)=((\log_2(K)+\log_2(L))>>1)<<1$ and $((\log_2(K)+\log_2(L))$ is odd.

15. The apparatus of claim 13,
further comprising means for applying the dequantization process to transform coefficients of a second non-square TU of a second CU of the video data, wherein the second non-square TU has a size $K_2 \times L_2$, wherein when $((\log_2(K_2)+\log_2(L_2)))$ is even, the dequantized transform coefficients of the second non-square TU are not modified such that each respective dequantized transform coefficient of the dequantized transform coefficients of the second non-square TU is based on the respective dequantized transform coefficient divided by the approximation of $\sqrt{2}$.

16. An apparatus for encoding video data, the apparatus comprising:
   means for receiving the video data;
   means for generating a residual block for a non-square transform unit (TU) of a coding unit (CU) such that each residual sample of the residual block indicates a difference between corresponding samples of a coding block of the CU and a predictive block of a prediction unit (PU) of the CU, wherein the non-square TU has a size K×L;
   means for applying a transform to the residual block to generate a block of transform coefficients;
   means for modifying, based on $((\log_2(K)+\log_2(L)))$ being odd, the transform coefficients such that each respective transform coefficient of the block of transform coefficients is based on the respective transform coefficient multiplied by an approximation of $\sqrt{2}$;
   means for applying, after modifying the transform coefficients, a quantization process to the modified transform coefficients of the non-square TU of the CU; and
   means for including, in a bitstream comprising an encoded representation of the video data, data based on the quantized transform coefficients.

17. The apparatus of claim 16, wherein the means for applying the transform to the residual block comprises means for applying, to the residual block, a transform having size N×N, where $\log_2(N*N)=((\log_2(K)+\log_2(L))>>1)<<1)$ and $((\log_2(K)+\log_2(L)))$ is odd.

18. The apparatus of claim 16, wherein the apparatus comprises:
   means for generating a second residual block for a second non-square TU of a second CU such that each residual sample of the second residual block indicates a difference between corresponding samples of a coding block of the second CU and a predictive block of a PU of the second CU, wherein the second non-square TU has a size $K_2 \times L_2$; and
   means for applying the transform to the second residual block to generate a second block of transform coefficients,
   wherein when $((\log_2(K_2)+\log_2(L_2)))$ is even, transform coefficients of the second block of transform coefficients are not modified such that each respective transform coefficient of the transform coefficients of the second block of transform coefficients is based on the respective transform coefficient multiplied by the approximation of $\sqrt{2}$.

19. A non-transitory computer-readable medium having instructions stored thereon that, when executed, configure an apparatus for decoding video data to:
   receive a bitstream that comprises an encoded representation of the video data;
   apply a dequantization process to transform coefficients of a non-square transform unit (TU) of a coding unit (CU) of the video data, wherein the non-square TU has a size K×L;
   after applying the dequantization process to the transform coefficients and based on $((\log_2(K)+\log_2(L)))$ being odd,
   modify the dequantized transform coefficients such that each respective dequantized transform coefficient of the dequantized transform coefficients is based on the respective dequantized transform coefficient divided by an approximation of $\sqrt{2}$;
   apply an inverse transform to the modified dequantized transform coefficients to reconstruct a residual block; and
   reconstruct samples of a coding block by adding samples of a predictive block to corresponding samples of the residual block for the TU of the CU.

20. The non-transitory computer-readable medium of claim 19, wherein the instructions configure the apparatus such that, as part of applying the inverse transform to the modified dequantized transform coefficients, the instructions configure the apparatus to apply, to the modified dequantized transform coefficients, a transform having size N×N, where $\log_2(N*N)=((\log_2(K)+\log_2(L))>>1)<<1)$ and $((\log_2(K)+\log_2(L)))$ is odd.

21. The non-transitory computer-readable medium of claim 19,
   wherein the instructions configure the apparatus to apply the dequantization process to transform coefficients of a second non-square TU of a second CU of the video data, wherein the second non-square TU has a size $K_2 \times L_2$, and
   wherein the instructions, when executed, configure the apparatus such that, when $((\log_2(K_2)+\log_2(L_2)))$ is even, the dequantized transform coefficients of the second non-square TU are not modified such that each respective dequantized transform coefficient of the dequantized transform coefficients of the second non-square TU is based on the respective dequantized transform coefficient divided by the approximation of $\sqrt{2}$.

22. A non-transitory computer-readable medium having instructions stored thereon that, when executed, configure an apparatus for encoding video data to:
   receive the video data;
   generate a residual block for a non-square transform unit (TU) of a coding unit (CU) such that each residual sample of the residual block indicates a difference between corresponding samples of a coding block of the CU and a predictive block of a prediction unit (PU) of the CU, wherein the non-square TU has a size K×L;
   apply a transform to the residual block to generate a block of transform coefficients;
   modify, based on $((\log_2(K)+\log_2(L)))$ being odd, the transform coefficients such that each respective transform coefficient of the block of transform coefficients is based on the respective transform coefficient multiplied by an approximation of $\sqrt{2}$;
   after modifying the transform coefficients, apply a quantization process to the modified transform coefficients of the non-square TU of the CU; and
   include, in a bitstream comprising an encoded representation of the video data, data based on the quantized transform coefficients.

23. The non-transitory computer-readable medium of claim 22, wherein the instructions configure the apparatus such that, as part of applying the transform to the residual block, the instructions configure the apparatus to apply, to the residual block, a transform having size N×N, where $\log_2(N*N)=((\log_2(K)+\log_2(L))>>1)<<1)$ and $((\log_2(K)+\log_2(L)))$ is odd.

24. The non-transitory computer-readable medium of claim 22, wherein the instructions, when executed, configure the apparatus to:

generate a second residual block for a second non-square TU of a second CU such that each residual sample of the second residual block indicates a difference between corresponding samples of a coding block of the second CU and a predictive block of a PU of the second CU, wherein the second non-square TU has a size $K_2 \times L_2$, and apply the transform to the second residual block to generate a second block of transform coefficients, wherein the instructions, when executed, configure the apparatus such that, when $((\log_2(K_2)+\log_2(L_2))$ is even, transform coefficients of the second block of transform coefficients are not modified such that each respective transform coefficient of the transform coefficients of the second block of transform coefficients is based on the respective transform coefficient multiplied by the approximation of $\sqrt{2}$.

* * * * *